US010968998B2

(12) United States Patent
Fujita et al.

(10) Patent No.: US 10,968,998 B2
(45) Date of Patent: Apr. 6, 2021

(54) BICYCLE REAR SPROCKET ADAPTER

(71) Applicant: SHIMANO INC., Sakai (JP)

(72) Inventors: Hiroshi Fujita, Sakai (JP); Kazuki Koshiyama, Sakai (JP); Toshinari Oishi, Sakai (JP)

(73) Assignee: SHIMANO INC., Sakai (JP)

( * ) Notice: Subject to any disclaimer, the term of this patent is extended or adjusted under 35 U.S.C. 154(b) by 276 days.

(21) Appl. No.: 15/686,120

(22) Filed: Aug. 24, 2017

(65) Prior Publication Data
US 2019/0063585 A1  Feb. 28, 2019

(51) Int. Cl.
| F16H 57/00 | (2012.01) |
| B60B 27/04 | (2006.01) |
| B60B 27/00 | (2006.01) |
| B60B 27/02 | (2006.01) |
| B62M 9/12 | (2006.01) |

(52) U.S. Cl.
CPC ..... *F16H 57/0025* (2013.01); *B60B 27/0026* (2013.01); *B60B 27/023* (2013.01); *B60B 27/04* (2013.01); *B60B 27/047* (2013.01); *B62M 9/12* (2013.01); *B60B 2900/321* (2013.01); *B60B 2900/531* (2013.01)

(58) Field of Classification Search
CPC ..... B60B 27/023; B60B 27/04; B60B 27/047; B62M 9/10; F16H 55/30; F16H 57/0025
See application file for complete search history.

(56) References Cited

U.S. PATENT DOCUMENTS

| 5,117,736 | A  | * | 6/1992 | Mader ...................... F41A 9/49 89/33.25 |
| 5,394,967 | A  | * | 3/1995 | Bigley ............... B60K 17/3515 192/49 |
| 2005/0009654 | A1 | * | 1/2005 | Kanehisa .............. B60B 27/026 474/152 |
| 2005/0034956 | A1 | * | 2/2005 | Ryner ................. F16F 15/1238 192/213.11 |
| 2005/0209033 | A1 | * | 9/2005 | Ledvina .................... F01L 1/02 474/84 |
| 2009/0042679 | A1 | * | 2/2009 | Valle ........................ B62M 9/10 474/152 |
| 2010/0018356 | A1 | * | 1/2010 | Hu ........................ B25B 13/463 81/63.1 |
| 2010/0031783 | A1 | * | 2/2010 | Hu ........................ B25B 13/463 81/63.1 |

(Continued)

FOREIGN PATENT DOCUMENTS

| JP | 2005-29072 | 2/2005 |
| TW | 201215537 | 4/2012 |

*Primary Examiner* — Michael R Mansen
*Assistant Examiner* — Juan J Campos, Jr.
(74) *Attorney, Agent, or Firm* — Mori & Ward, LLP

(57) ABSTRACT

A bicycle rear sprocket adapter comprises a plurality of external spline teeth and a plurality of internal spline teeth. The plurality of external spline teeth is configured to engage with a bicycle rear sprocket assembly. The plurality of internal spline teeth is configured to engage with a bicycle hub assembly. At least two internal spline teeth of the plurality of internal spline teeth are circumferentially arranged at a first internal pitch angle with respect to a rotational center axis of the bicycle hub assembly. The first internal pitch angle ranges from 10 degrees to 20 degrees.

20 Claims, 49 Drawing Sheets

(56) References Cited

U.S. PATENT DOCUMENTS

| | | | | |
|---|---|---|---|---|
| 2012/0285405 A1* | 11/2012 | Pierik | ............ | F01L 1/34 |
| | | | | 123/90.15 |
| 2012/0297911 A1* | 11/2012 | Geiman | ............ | B21K 1/30 |
| | | | | 74/434 |
| 2015/0202919 A1* | 7/2015 | Koshiyama | ............ | B60B 27/023 |
| | | | | 192/64 |
| 2016/0214707 A1* | 7/2016 | Didey | ............ | B64C 25/405 |
| 2017/0241480 A1* | 8/2017 | Parmeter | ............ | E21B 43/128 |
| 2018/0022415 A1* | 1/2018 | Oishi | ............ | B62M 9/10 |
| | | | | 474/160 |

* cited by examiner

BICYCLE REAR SPROCKET ADAPTER

BACKGROUND OF THE INVENTION

Field of the Invention

The present invention relates to a bicycle rear sprocket adapter.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a drive train.

SUMMARY OF THE INVENTION

In accordance with a first aspect of the present invention, a bicycle rear sprocket adapter comprises a plurality of external spline teeth and a plurality of internal spline teeth. The plurality of external spline teeth is configured to engage with a bicycle rear sprocket assembly. The plurality of internal spline teeth is configured to engage with a bicycle hub assembly. At least two internal spline teeth of the plurality of internal spline teeth are circumferentially arranged at a first internal pitch angle with respect to a rotational center axis of the bicycle hub assembly. The first internal pitch angle ranges from 10 degrees to 20 degrees.

With the bicycle rear sprocket adapter according to the first aspect, it is possible to mount the bicycle rear sprocket assembly on the bicycle hub assembly using the bicycle rear sprocket adapter even if the bicycle rear sprocket assembly has an engagement structure which is not complementary to an engagement structure of the bicycle hub assembly.

In accordance with a second aspect of the present invention, the bicycle rear sprocket adapter according to the first aspect is configured so that the first internal pitch angle ranges from 12 degrees to 15 degrees.

With the bicycle rear sprocket adapter according to the second aspect, the first internal pitch angle can increase a total number of the internal spline teeth. This improves durability of the bicycle rear sprocket adapter and/or improves a degree of freedom of choosing a material of the bicycle rear sprocket adapter without reducing durability of the bicycle rear sprocket adapter.

In accordance with a third aspect of the present invention, the bicycle rear sprocket adapter according to the second aspect is configured so that the first internal pitch angle ranges from 13 degrees to 14 degrees.

With the bicycle rear sprocket adapter according to the third aspect, the first internal pitch angle can further increase a total number of the internal spline teeth. This further improves durability of the bicycle rear sprocket adapter and/or further improves a degree of freedom of choosing a material of the bicycle rear sprocket adapter without reducing durability of the bicycle rear sprocket adapter.

In accordance with a fourth aspect of the present invention, the bicycle rear sprocket adapter according to any one of the first to third aspects is configured so that at least two internal spline teeth of the plurality of internal spline teeth are circumferentially arranged at a second internal pitch angle with respect to the rotational center axis. The second internal pitch angle is different from the first internal pitch angle.

With the bicycle rear sprocket adapter according to the fourth aspect, the difference between the first internal pitch angle and the second internal pitch angle helps the user to correctly mount the bicycle rear sprocket adapter to the bicycle hub assembly.

In accordance with a fifth aspect of the present invention, a bicycle rear sprocket adapter comprises a plurality of external spline teeth and at least one internal spline tooth. The plurality of external spline teeth is configured to engage with a bicycle rear sprocket assembly. At least one internal spline tooth is configured to engage with a bicycle hub assembly. The at least one internal spline tooth has an internal-spline minor diameter equal to or smaller than 30 mm.

With the bicycle rear sprocket adapter according to the fifth aspect, it is possible to mount the bicycle rear sprocket assembly on the bicycle hub assembly using the bicycle rear sprocket adapter even if the bicycle hub assembly has a small external-spline major diameter.

In accordance with a sixth aspect of the present invention, the bicycle rear sprocket adapter according to the fifth aspect is configured so that the internal-spline minor diameter is equal to or larger than 25 mm.

With the bicycle rear sprocket adapter according to the sixth aspect, it is possible to mount the bicycle rear sprocket assembly on the bicycle hub assembly using the bicycle rear sprocket adapter even if the bicycle hub assembly has a small external-spline major diameter.

In accordance with a seventh aspect of the present invention, the bicycle rear sprocket adapter according to the sixth aspect is configured so that the internal-spline minor diameter is equal to or larger than 29 mm.

With the bicycle rear sprocket adapter according to the seventh aspect, it is possible to mount the bicycle rear sprocket assembly on the bicycle hub assembly using the bicycle rear sprocket adapter even if the bicycle hub assembly has a small external-spline major diameter.

In accordance with an eighth aspect of the present invention, the bicycle rear sprocket adapter according to any one of the fifth to seventh aspects is configured so that the at least one internal spline tooth has an internal-spline major diameter equal to or smaller than 28 mm.

With the bicycle rear sprocket adapter according to the eighth aspect, it is possible to mount the bicycle rear sprocket assembly on the bicycle hub assembly using the bicycle rear sprocket adapter even if the bicycle hub assembly has a small external-spline minor diameter.

In accordance with a ninth aspect of the present invention, the bicycle rear sprocket adapter according to any one of the fifth to eighth aspects is configured so that the internal-spline major diameter is equal to or larger than 25 mm.

With the bicycle rear sprocket adapter according to the ninth aspect, it is possible to mount the bicycle rear sprocket assembly on the bicycle hub assembly using the bicycle rear sprocket adapter even if the bicycle hub assembly has a small external-spline minor diameter.

In accordance with a tenth aspect of the present invention, the bicycle rear sprocket adapter according to the ninth aspect is configured so that the internal-spline major diameter is equal to or larger than 27 mm.

With the bicycle rear sprocket adapter according to the tenth aspect, it is possible to mount the bicycle rear sprocket assembly on the bicycle hub assembly using the bicycle rear sprocket adapter even if the bicycle hub assembly has a small external-spline minor diameter.

In accordance with an eleventh aspect of the present invention, the bicycle rear sprocket adapter according to any one of the fifth to tenth aspects is configured so that the at least one internal spline tooth includes a plurality of internal spline teeth including a plurality of internal-spline driving surfaces to transmit a driving rotational force to the bicycle hub assembly during pedaling. The plurality of internal-spline driving surfaces each includes a radially outermost edge, a radially innermost edge, and a radial length defined from the radially outermost edge to the radially innermost edge. A total of the radial lengths of the plurality of internal-spline driving surfaces is equal to or larger than 7 mm.

With the bicycle rear sprocket adapter according to the eleventh aspect, it is possible to increase the radial lengths of the plurality of internal-spline driving surface. This improves strength of the bicycle rear sprocket adapter.

In accordance with a twelfth aspect of the present invention, the bicycle rear sprocket adapter according to the eleventh aspect is configured so that the total of the radial lengths is equal to or larger than 10 mm.

With the bicycle rear sprocket adapter according to the twelfth aspect, it is possible to further increase the radial lengths of the plurality of internal-spline driving surface. This further improves strength of the bicycle rear sprocket adapter.

In accordance with a thirteenth aspect of the present invention, the bicycle rear sprocket adapter according to the eleventh or twelfth aspect is configured so that the total of the radial lengths is equal to or larger than 15 mm.

With the bicycle rear sprocket adapter according to the thirteenth aspect, it is possible to further increase the radial lengths of the plurality of internal-spline driving surface. This further improves strength of the bicycle rear sprocket adapter.

In accordance with a fourteenth aspect of the present invention, a bicycle rear sprocket adapter comprises a plurality of external spline teeth and at least one internal spline tooth. The plurality of external spline teeth is configured to engage with a bicycle rear sprocket assembly. At least one internal spline tooth is configured to engage with a bicycle hub assembly. The at least one internal spline tooth comprises an internal-spline driving surface and an internal-spline non-driving surface. The internal-spline driving surface has a first internal-spline-surface angle defined between the internal-spline driving surface and a first radial line extending from a rotational center axis of the bicycle rear sprocket adapter to a radially outermost edge of the internal-spline driving surface. The internal-spline non-driving surface has a second internal-spline-surface angle defined between the internal-spline non-driving surface and a second radial line extending from the rotational center axis of the sprocket adapter to a radially outermost edge of the internal-spline non-driving surface. The second internal-spline-surface angle is different from the first internal-spline-surface angle.

With the bicycle rear sprocket adapter according to the fourteenth aspect, it is possible to save a weight of the bicycle rear sprocket adapter with ensuring strength of the at least one internal spline teeth of the bicycle rear sprocket adapter.

In accordance with a fifteenth aspect of the present invention, the bicycle rear sprocket adapter according to the fourteenth aspect is configured so that the first internal-spline-surface angle is smaller than the second internal-spline-surface angle.

With the bicycle rear sprocket adapter according to the fifteenth aspect, it is possible to effectively save a weight of the bicycle rear sprocket adapter with ensuring strength of the at least one internal spline teeth of the bicycle rear sprocket adapter.

In accordance with a sixteenth aspect of the present invention, the bicycle rear sprocket adapter according to the fourteenth aspect is configured so that the first internal-spline-surface angle ranges from 0 degree to 10 degrees.

With the bicycle rear sprocket adapter according to the sixteenth aspect, the first internal-spline-surface angle ensures strength of the internal-spline driving surface.

In accordance with a seventeenth aspect of the present invention, the bicycle rear sprocket adapter according to any one of the fourteenth to sixteenth aspects is configured so that the second internal-spline-surface angle ranges from 0 degree to 60 degrees.

With the bicycle rear sprocket adapter according to the seventeenth aspect, the second internal-spline-surface angle saves a weight of the bicycle rear sprocket adapter.

In accordance with an eighteenth aspect of the present invention, the bicycle rear sprocket adapter according to any one of the first to seventeenth aspects further comprises an indicator to indicate a circumferential position of the bicycle rear sprocket adapter.

With the bicycle rear sprocket adapter according to the eighteenth aspect, the indicator makes it easy to mount the bicycle rear sprocket adapter to the bicycle hub assembly and/or mount the bicycle rear sprocket assembly to the bicycle rear sprocket adapter.

In accordance with a nineteenth aspect of the present invention, the bicycle rear sprocket adapter according to the eighteenth aspect further comprises an axial end surface. The indicator is provided on the axial end surface.

With the bicycle rear sprocket adapter according to the nineteenth aspect, the indicator makes it easier to mount the bicycle rear sprocket adapter to the bicycle hub assembly and/or mount the bicycle rear sprocket assembly to the bicycle rear sprocket adapter.

In accordance with a twentieth aspect of the present invention, the bicycle rear sprocket adapter according to any one of the first to nineteenth aspects is configured so that a total number of the plurality of external spline teeth is equal to or smaller than nine.

With the bicycle rear sprocket adapter according to the twentieth aspect, it is possible to reduce a weight of the bicycle rear sprocket adapter.

In accordance with a twenty-first aspect of the present invention, the bicycle rear sprocket adapter according to any one of the first to twentieth aspects is configured so that at least one of the plurality of external spline teeth having an external-spline major diameter larger than 34 mm and smaller than 35 mm.

With the bicycle rear sprocket adapter according to the twenty-first aspect, it is possible to mount the bicycle rear sprocket assembly on the bicycle hub assembly using the bicycle rear sprocket adapter even if the bicycle rear sprocket assembly has a larger internal-spline minor diameter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
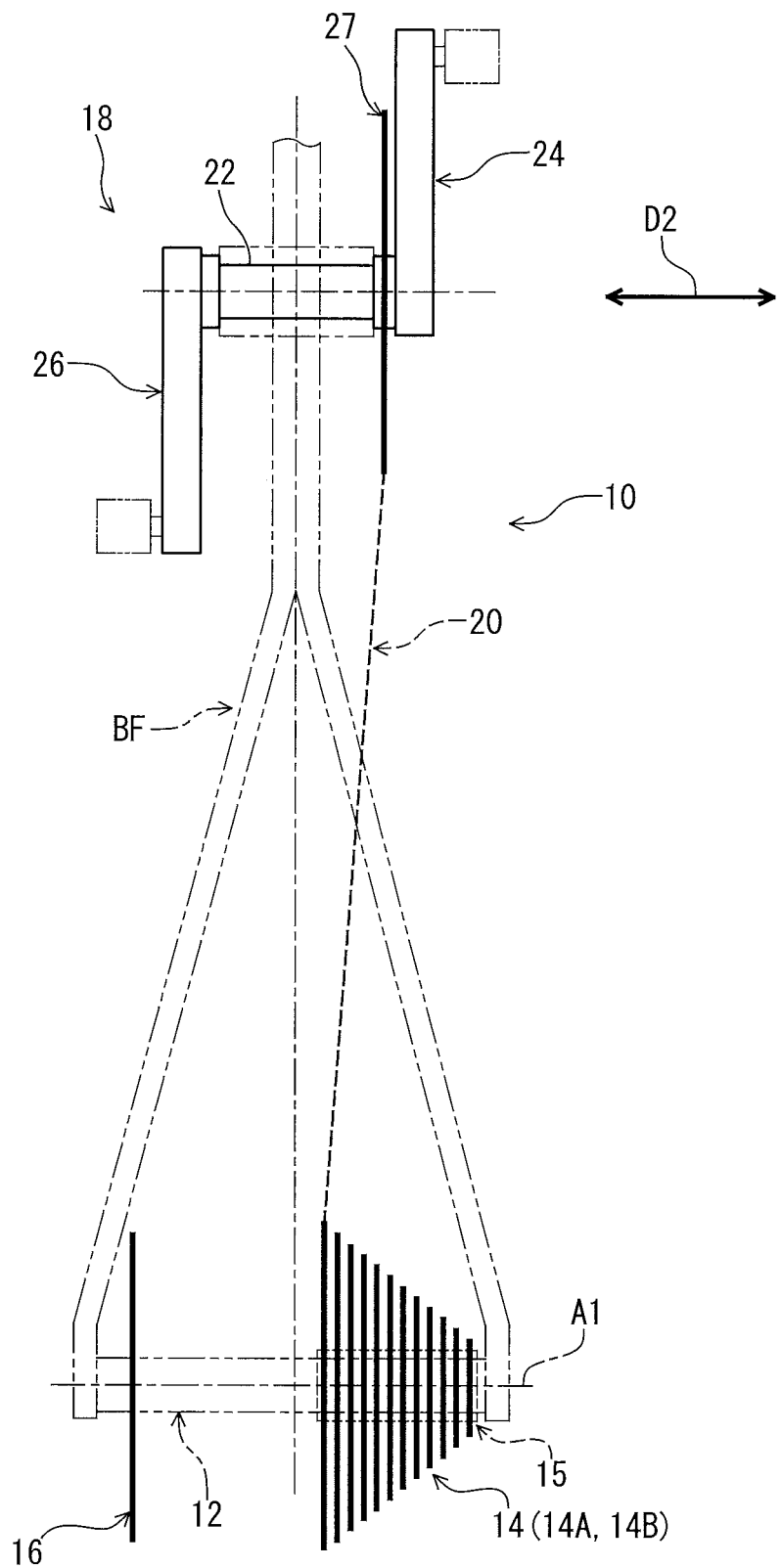
FIG. 1 is a schematic diagram of a bicycle drive train including a bicycle rear sprocket adapter in accordance with an embodiment.

The embodiment(s) will now be described with reference to the accompanying drawings, wherein like reference numerals designate corresponding or identical elements throughout the various drawings.

Referring initially to FIG. 1, a bicycle drive train 10 comprises a bicycle hub assembly 12, a bicycle rear sprocket assembly 14, and a bicycle rear sprocket adapter 15 in accordance with an embodiment. The bicycle hub assembly 12 is secured to a bicycle frame BF. The bicycle rear sprocket assembly 14 is mounted on the bicycle hub assembly 12. A bicycle brake rotor 16 is mounted on the bicycle hub assembly 12.

The bicycle drive train 10 further comprises a crank assembly 18 and a bicycle chain 20. The crank assembly 18 includes a crank axle 22, a right crank arm 24, a left crank arm 26, and a front sprocket 27. The right crank arm 24 and the left crank arm 26 are secured to the crank axle 22. The front sprocket 27 is secured to at least one of the crank axle 22 and the right crank arm 24. The bicycle chain 20 is engaged with the front sprocket 27 and the bicycle rear sprocket assembly 14 to transmit a pedaling force from the front sprocket 27 to the bicycle rear sprocket assembly 14. The crank assembly 18 includes the front sprocket 27 as a single sprocket in the illustrated embodiment. However, the crank assembly 18 can include a plurality of front sprockets. The bicycle rear sprocket assembly 14 is a rear sprocket assembly. However, structures of the bicycle rear sprocket assembly 14 can be applied to the front sprocket.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle while facing a handlebar (not shown). Accordingly, these terms, as utilized to describe the bicycle drive train 10, the bicycle hub assembly 12, or the bicycle rear sprocket assembly 14, should be interpreted relative to the bicycle equipped with the bicycle drive train 10, the bicycle hub assembly 12, or the bicycle rear sprocket assembly 14 as used in an upright riding position on a horizontal surface.

Figure 2:
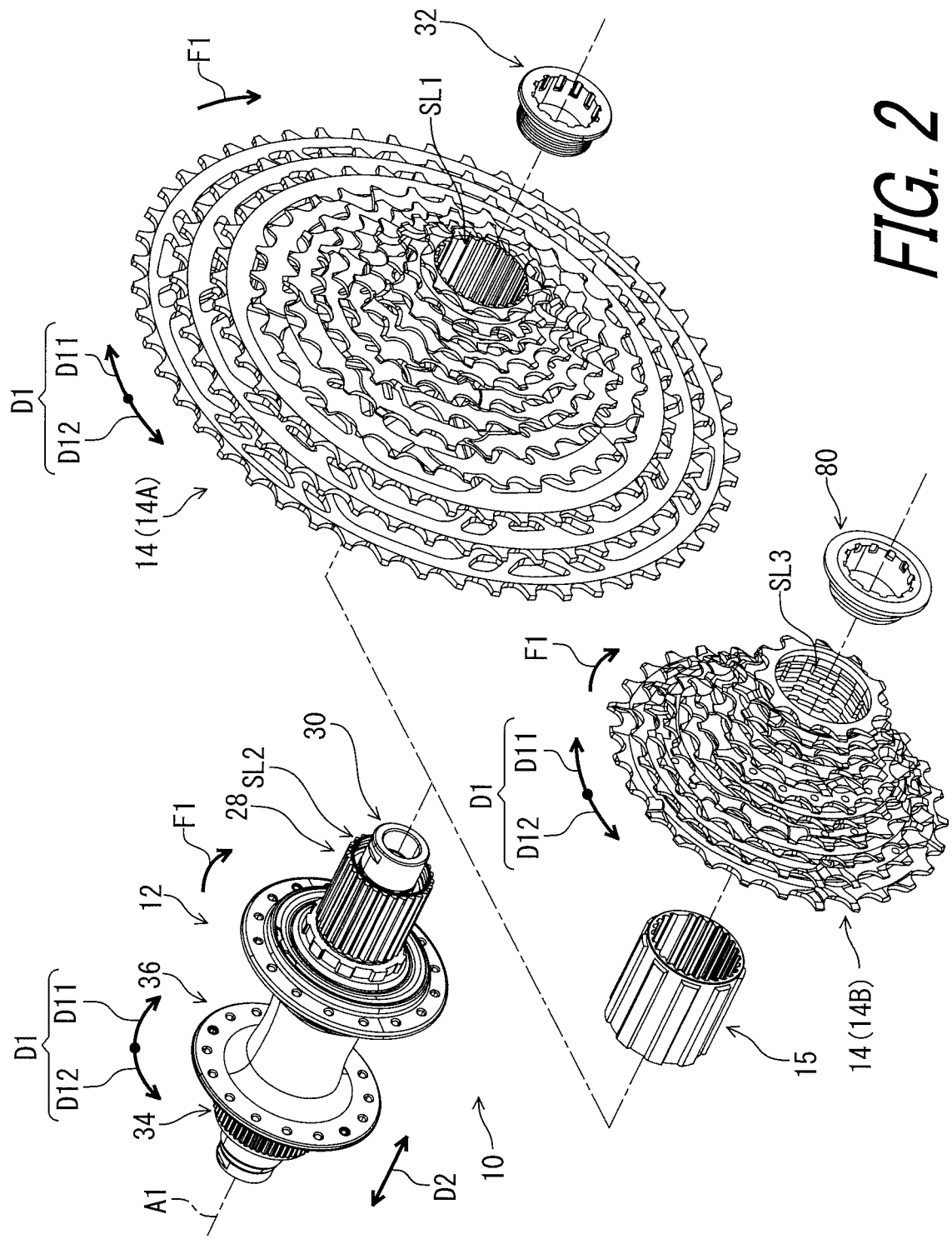
FIG. 2 is an exploded perspective view of a bicycle hub assembly and bicycle rear sprocket assemblies of the bicycle drive train illustrated in FIG. 1.

As seen in FIG. 2, examples of the bicycle rear sprocket assembly 14 includes a bicycle rear sprocket assembly 14A and a bicycle rear sprocket assembly 14B. The bicycle rear sprocket assembly 14A has a structure different from a structure of the bicycle rear sprocket assembly 14B. The bicycle rear sprocket assembly 14A is mountable on the bicycle hub assembly 12 since the bicycle rear sprocket assembly 14A has an internal spline SL1 having a cross-sectional shape complementary to a cross-sectional shape of an external spline SL2 of the bicycle hub assembly 12. The bicycle rear sprocket assembly 14B is not mountable directly to the bicycle hub assembly 12 since the bicycle rear sprocket assembly 14B has an internal spline SL3 having a cross-sectional shape which is not complementary to the cross-sectional shape of the external spline SL2 of the bicycle hub assembly 12. However, the bicycle rear sprocket assembly 14B is mountable to the bicycle hub assembly 12 using the bicycle rear sprocket adapter 15 even though the bicycle rear sprocket assembly 14B has the internal spline SL3 having the cross-sectional shape which is not complementary to the cross-sectional shape of the external spline SL2 of the bicycle hub assembly 12.

Figure 3:
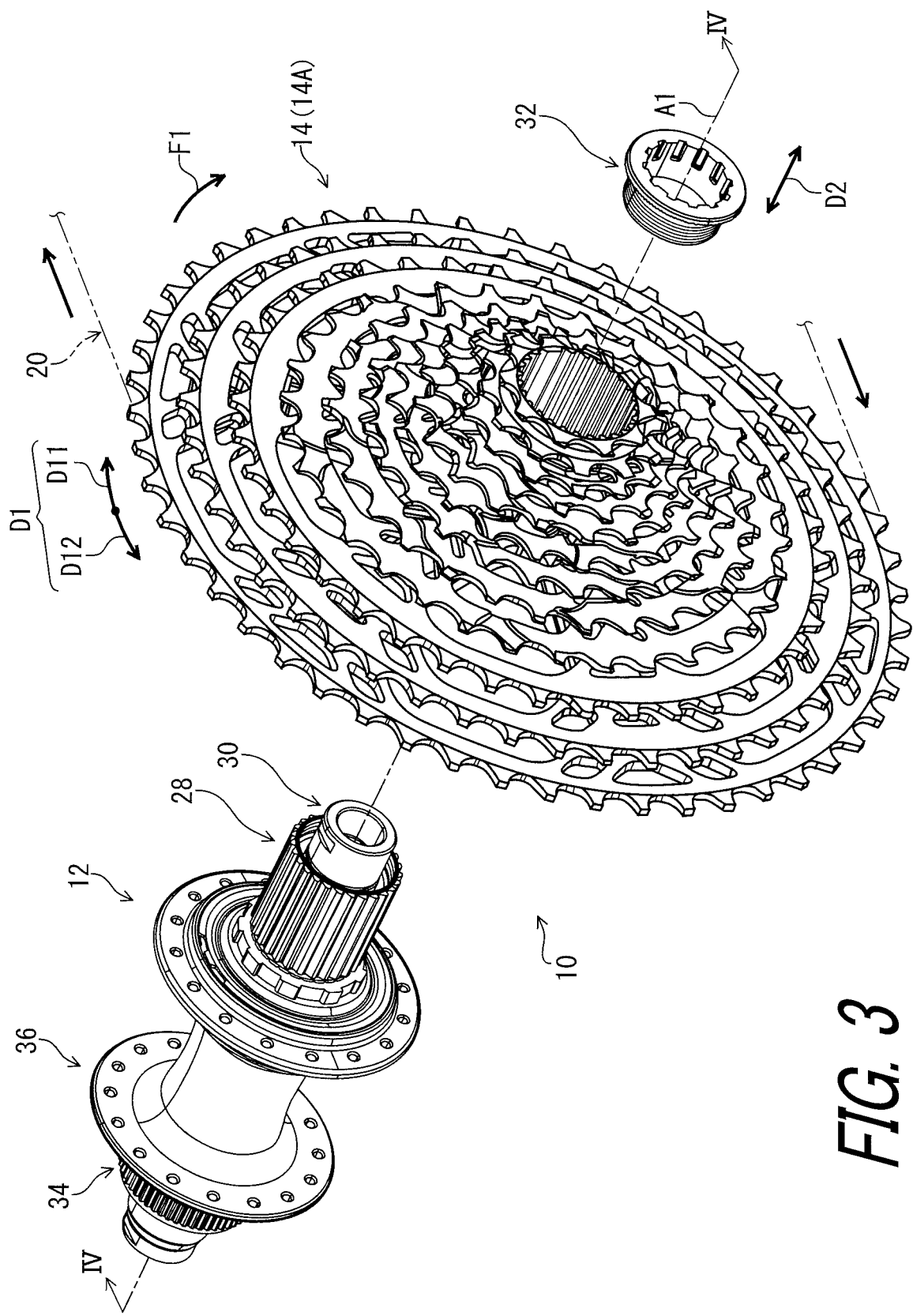
FIG. 3 is an exploded perspective view of the bicycle hub assembly and the bicycle rear sprocket assembly of the bicycle drive train illustrated in FIG. 1.

As seen in FIGS. 2 and 3, the bicycle hub assembly 12, the bicycle rear sprocket assembly 14A, and the bicycle rear sprocket assembly 14B have a rotational center axis A1. The bicycle rear sprocket assembly 14A or 14B is rotatably supported by the bicycle hub assembly 12 relative to the bicycle frame BF (FIG. 1) about the rotational center axis A1. The bicycle rear sprocket assembly 14A or 14B is configured to be engaged with the bicycle chain 20 to transmit a driving rotational force F1 between the bicycle chain 20 and the bicycle rear sprocket assembly 14A or 14B during pedaling. The bicycle rear sprocket assembly 14A or 14B is rotated about the rotational center axis A1 in a driving rotational direction D11 during pedaling. The driving rotational direction D11 is defined along a circumferential direction D1 of the bicycle hub assembly 12 or the bicycle rear sprocket assembly 14A or 14B. A reverse rotational direction D12 is an opposite direction of the driving rotational direction D11 and is defined along the circumferential direction D1.

As seen in FIG. 3, the bicycle hub assembly 12 comprises a sprocket support body 28. The bicycle rear sprocket assembly 14A is mounted on the sprocket support body 28 without the bicycle rear sprocket adapter 15 (FIG. 2) to transmit the driving rotational force F1 between the sprocket support body 28 and the bicycle rear sprocket assembly 14A. The bicycle hub assembly 12 comprises a hub axle 30. The sprocket support body 28 is rotatably mounted on the hub axle 30 about the rotational center axis A1. The bicycle hub assembly 12 comprises a lock ring 32. The lock ring 32 is secured to the sprocket support body 28 to hold the bicycle rear sprocket assembly 14A relative to the sprocket support body 28 in an axial direction D2 parallel to the rotational center axis A1.

Figure 4:
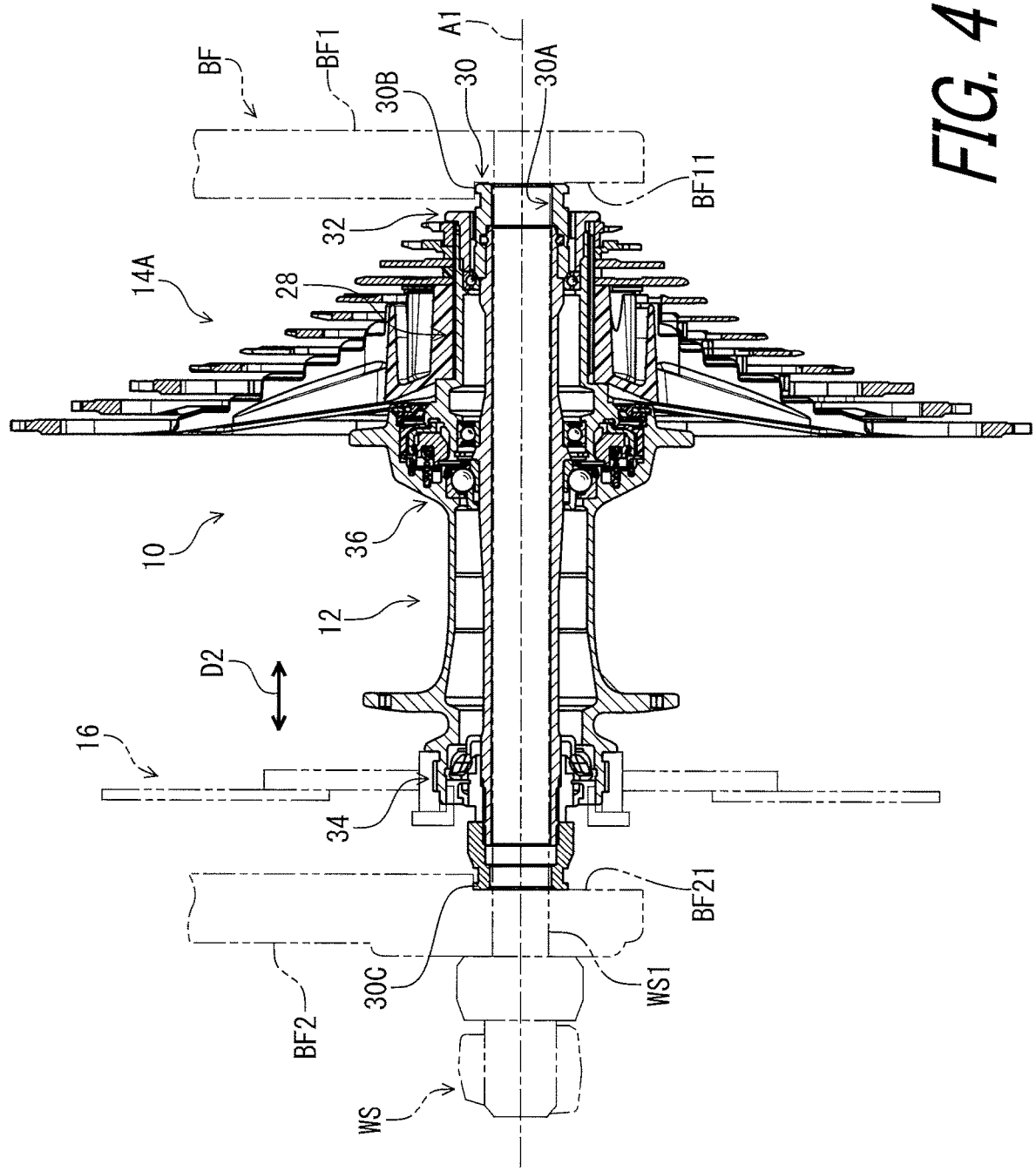
FIG. 4 is a cross-sectional view of the bicycle drive train taken along line IV-IV of FIG. 3.

As seen in FIG. 4, the bicycle hub assembly 12 is secured to the bicycle frame BF with a wheel securing structure WS. The hub axle 30 has a through hole 30A. A securing rod WS1 of the wheel securing structure WS extends through the through hole 30A of the hub axle 30. The hub axle 30 includes a first axle end 30B and a second axle end 30C. The hub axle 30 extends between the first axle end 30B and the second axle end 30C along the rotational center axis A1. The first axle end 30B is provided in a first recess BF11 of a first frame BF1 of the bicycle frame BF. The second axle end 30C is provided in a second recess BF21 of a second frame BF2 of the bicycle frame BF. The hub axle 30 is held between the first frame BF1 and the second frame BF2 with the wheel securing structure WS. The wheel securing structure WS includes a structure which has been known in the bicycle field. Thus, it will not be described in detail here for the sake of brevity.

Figure 5:
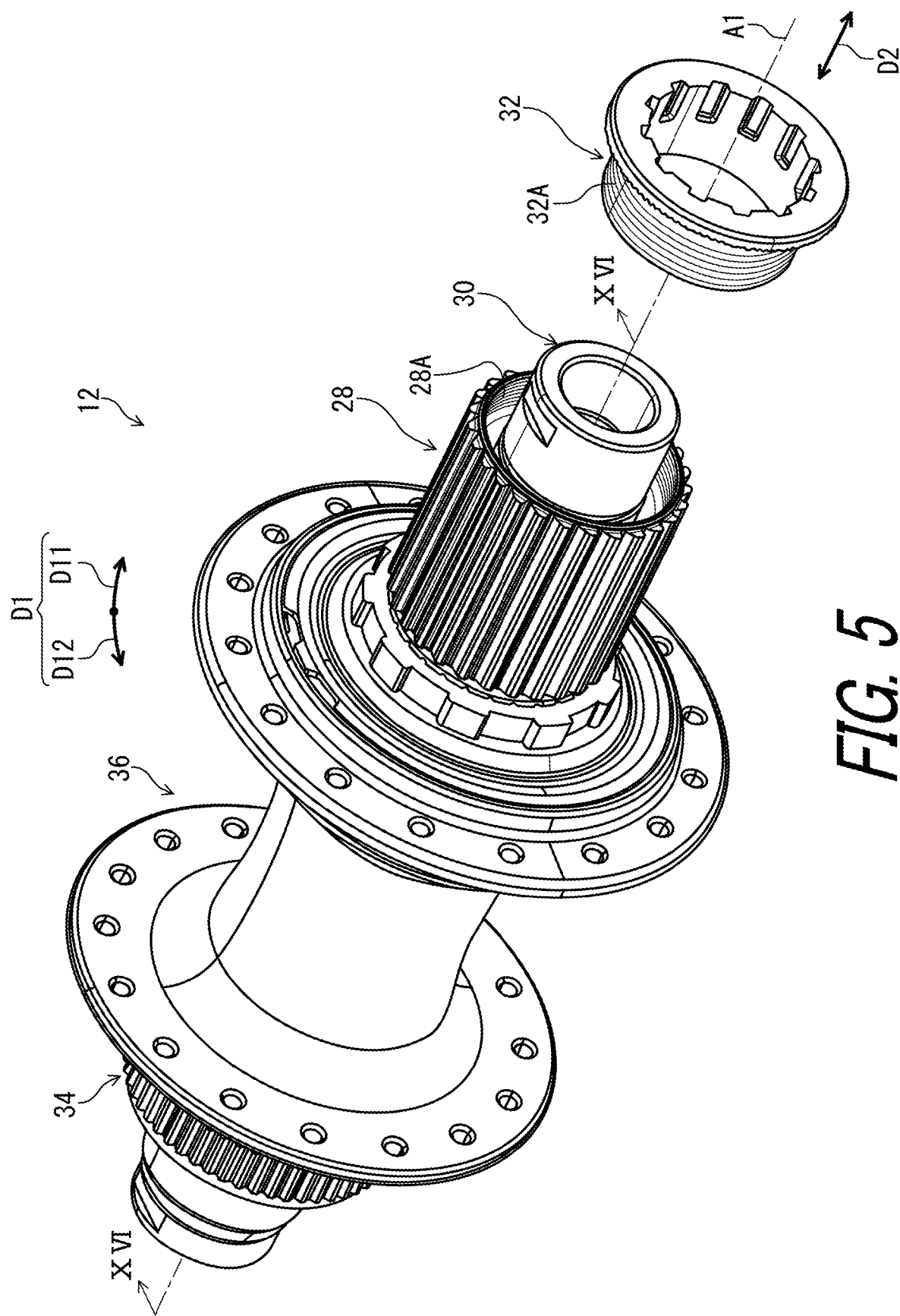
FIG. 5 is an exploded perspective view of a bicycle hub assembly of the bicycle drive train illustrated in FIG. 3.

As seen in FIGS. 4 and 5, the bicycle hub assembly 12 further comprises a brake-rotor support body 34. The brake-rotor support body 34 is rotatably mounted on the hub axle 30 about the rotational center axis A1. The brake-rotor support body 34 is coupled to the bicycle brake rotor 16 (FIG. 1) to transmit a braking rotational force from the bicycle brake rotor 16 to the brake-rotor support body 34.

As seen in FIG. 5, the bicycle hub assembly 12 comprises a hub body 36. The hub body 36 is rotatably mounted on the hub axle 30 about the rotational center axis A1 of the bicycle hub assembly 12. In this embodiment, the sprocket support body 28 is a separate member from the hub body 36. The brake-rotor support body 34 is integrally provided with the hub body 36 as a one-piece unitary member. However, the sprocket support body 28 can be integrally provided with the hub body 36. The brake-rotor support body 34 can be a separate member from the hub body 36.

The lock ring 32 includes an externally threaded part 32A. The sprocket support body 28 includes an internally threaded part 28A. The externally threaded part 32A is threadedly engaged with the internally threaded part 28A in a state where the lock ring 32 is secured to the sprocket support body 28.

Figure 6:
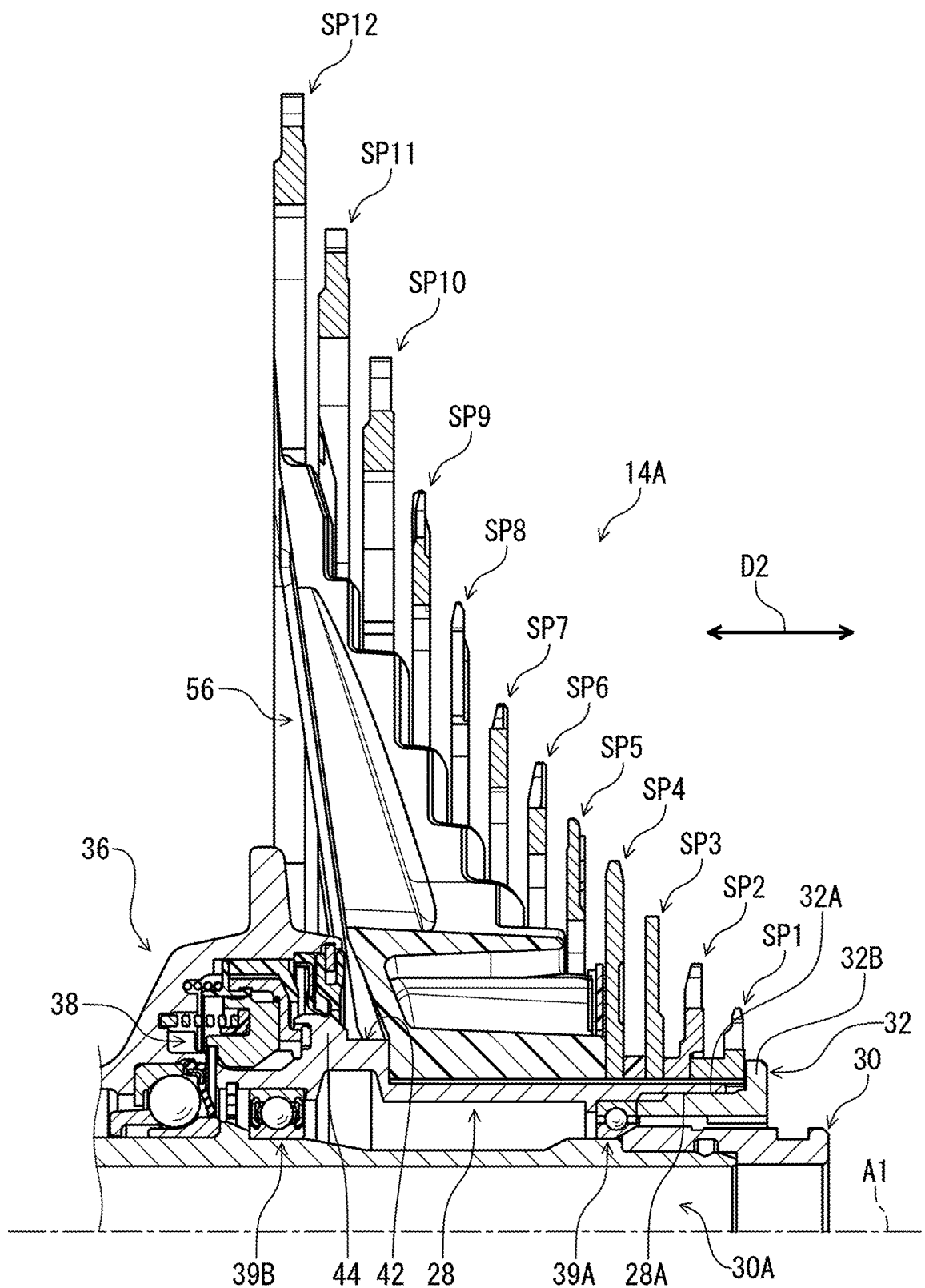
FIG. 6 is an enlarged cross-sectional view of the bicycle drive train illustrated in FIG. 4.

As seen in FIG. 6, the bicycle hub assembly 12 comprises a freewheel structure 38. The sprocket support body 28 is operatively coupled to the hub body 36 with the freewheel structure 38. The freewheel structure 38 is configured to couple the sprocket support body 28 to the hub body 36 to rotate the sprocket support body 28 along with the hub body 36 in the driving rotational direction D11 (FIG. 5) during pedaling. The freewheel structure 38 is configured to allow the sprocket support body 28 to rotate relative to the hub body 36 in the reverse rotational direction D12 (FIG. 5)

during coasting. Accordingly, the freewheel structure 38 may be paraphrased into a one-way clutch structure 38. The freewheel structure 38 will be described in detail later.

The bicycle hub assembly 12 includes a first bearing 39A and a second bearing 39B. The first bearing 39A and the second bearing 39B are provided between the sprocket support body 28 and the hub axle 30 to rotatably support the sprocket support body 28 relative to the hub axle 30 about the rotational center axis A1.

In this embodiment, each of the sprocket support body 28, the brake-rotor support body 34, and the hub body 36 is made of a metallic material such as aluminum, iron, or titanium. However, at least one of the sprocket support body 28, the brake-rotor support body 34, and the hub body 36 can be made of a non-metallic material.

Figure 7:
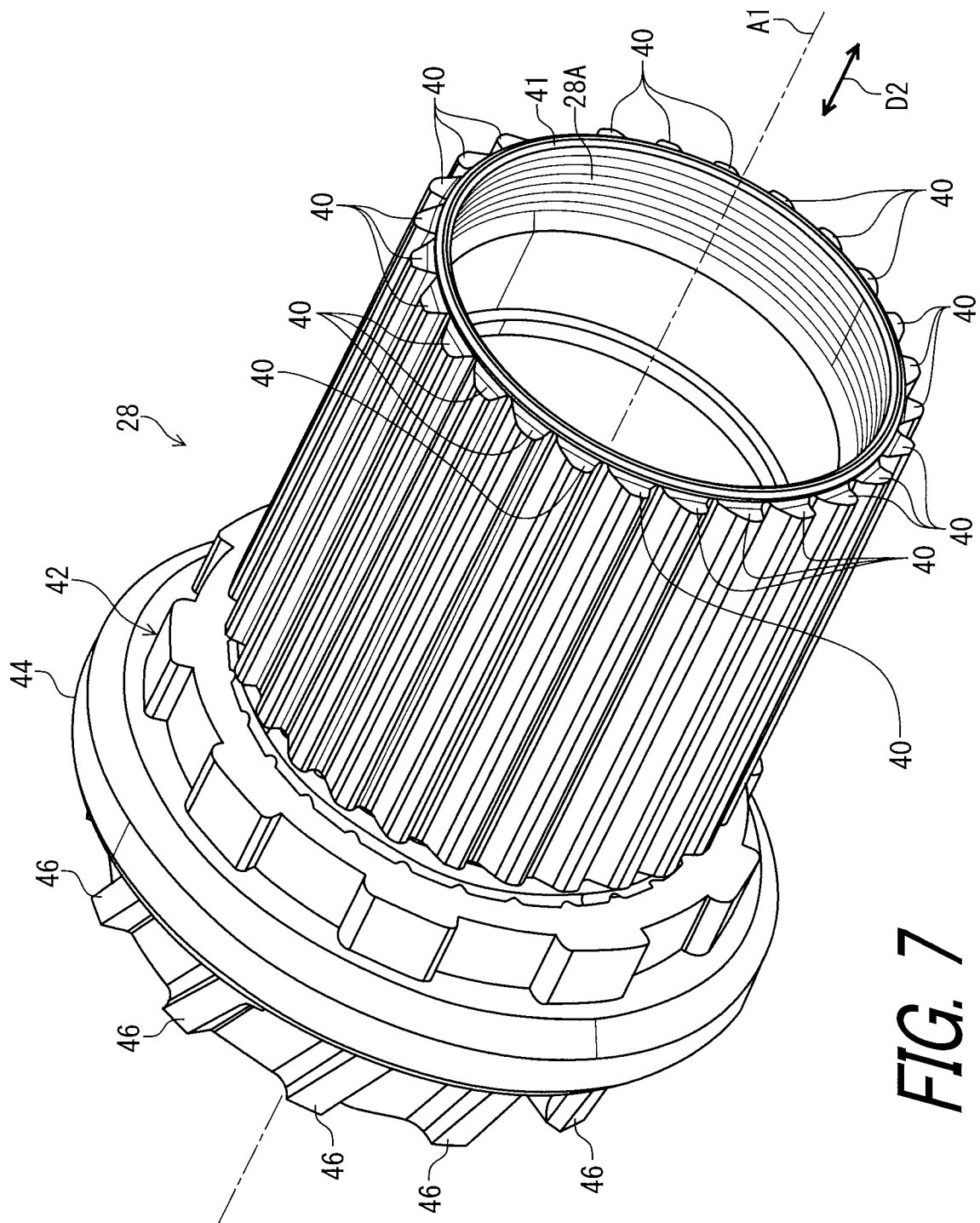
FIG. 7 is a perspective view of a sprocket support body of the bicycle hub assembly of the bicycle drive train illustrated in FIG. 3.
Figure 8:
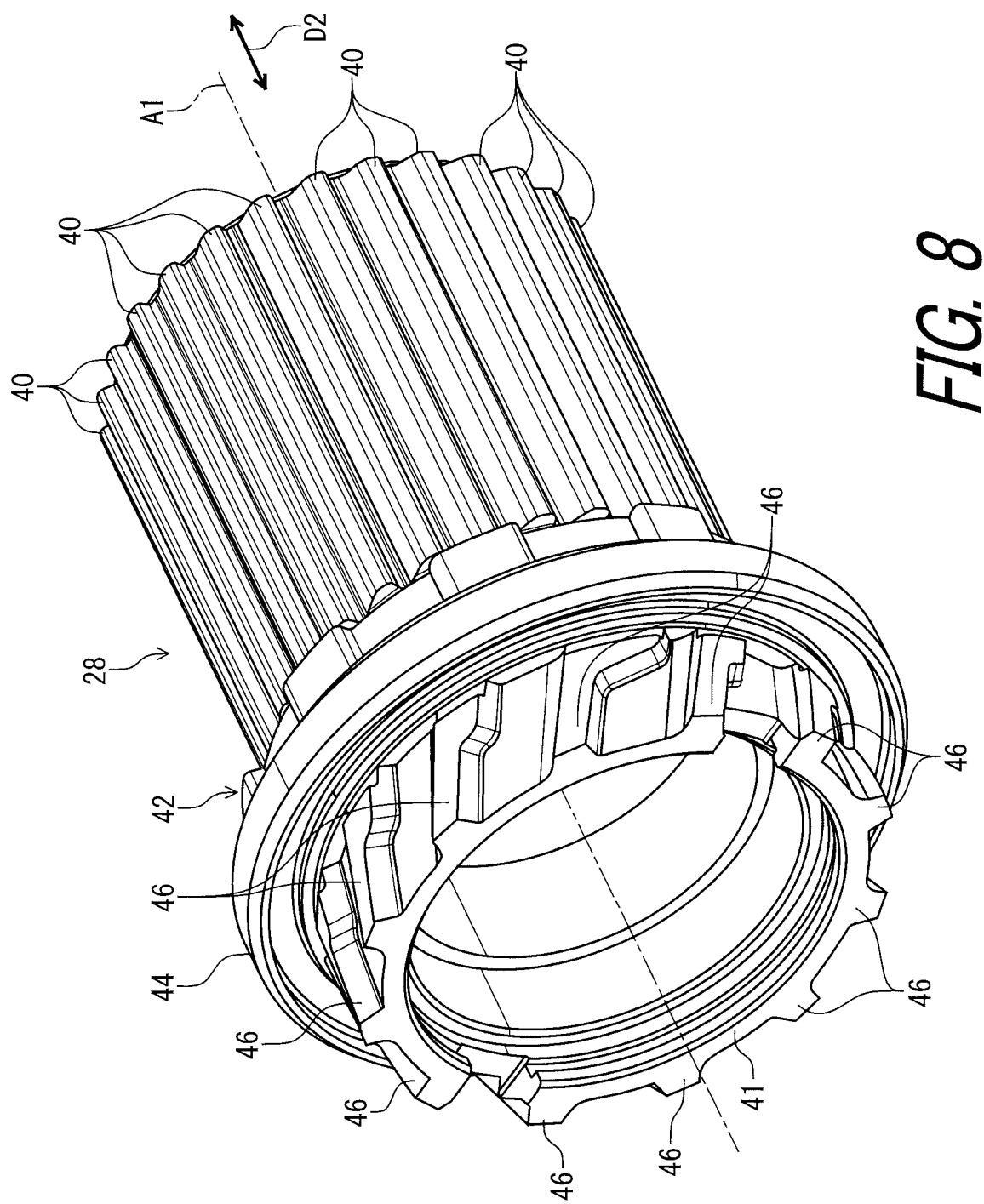
FIG. 8 is another perspective view of the sprocket support body of the bicycle hub assembly of the bicycle drive train illustrated in FIG. 3.

As seen in FIGS. 7 and 8, the sprocket support body 28 includes at least one external spline tooth 40 configured to engage with the bicycle rear sprocket assembly 14A (FIG. 6). The sprocket support body 28 includes a plurality of external spline teeth 40 configured to engage with the bicycle rear sprocket assembly 14A (FIG. 6). Namely, the at least one external spline tooth 40 includes a plurality of external spline teeth 40. The sprocket support body 28 includes at least nine external spline teeth 40 configured to engage with the bicycle rear sprocket assembly 14A (FIG. 6). The sprocket support body 28 includes at least ten external spline teeth 40 configured to engage with the bicycle rear sprocket assembly 14A (FIG. 6).

The sprocket support body 28 includes a base support 41 having a tubular shape. The base support 41 extends along the rotational center axis A1. The external spline tooth 40 extends radially outwardly from the base support 41. The sprocket support body 28 includes a larger-diameter part 42, a flange 44, and a plurality of helical external spline teeth 46. The larger-diameter part 42 and the flange 44 extend radially outwardly from the base support 41. The larger-diameter part 42 is provided between the plurality of external spline teeth 40 and the flange 44 in the axial direction D2. The larger-diameter part 42 and the flange are provided between the plurality of external spline teeth 40 and the plurality of helical external spline teeth 46 in the axial direction D2. As seen in FIG. 6, the bicycle rear sprocket assembly 14A is held between the larger-diameter part 42 and a lock flange 32B of the lock ring 32 in the axial direction D2. The larger-diameter part 42 may have an interior cavity so that a drive structure such as a one-way clutch structure can be contained within the interior cavity. The larger-diameter part 42 can be omitted from the bicycle hub assembly 12 if needed and/or desired.

Figure 9:
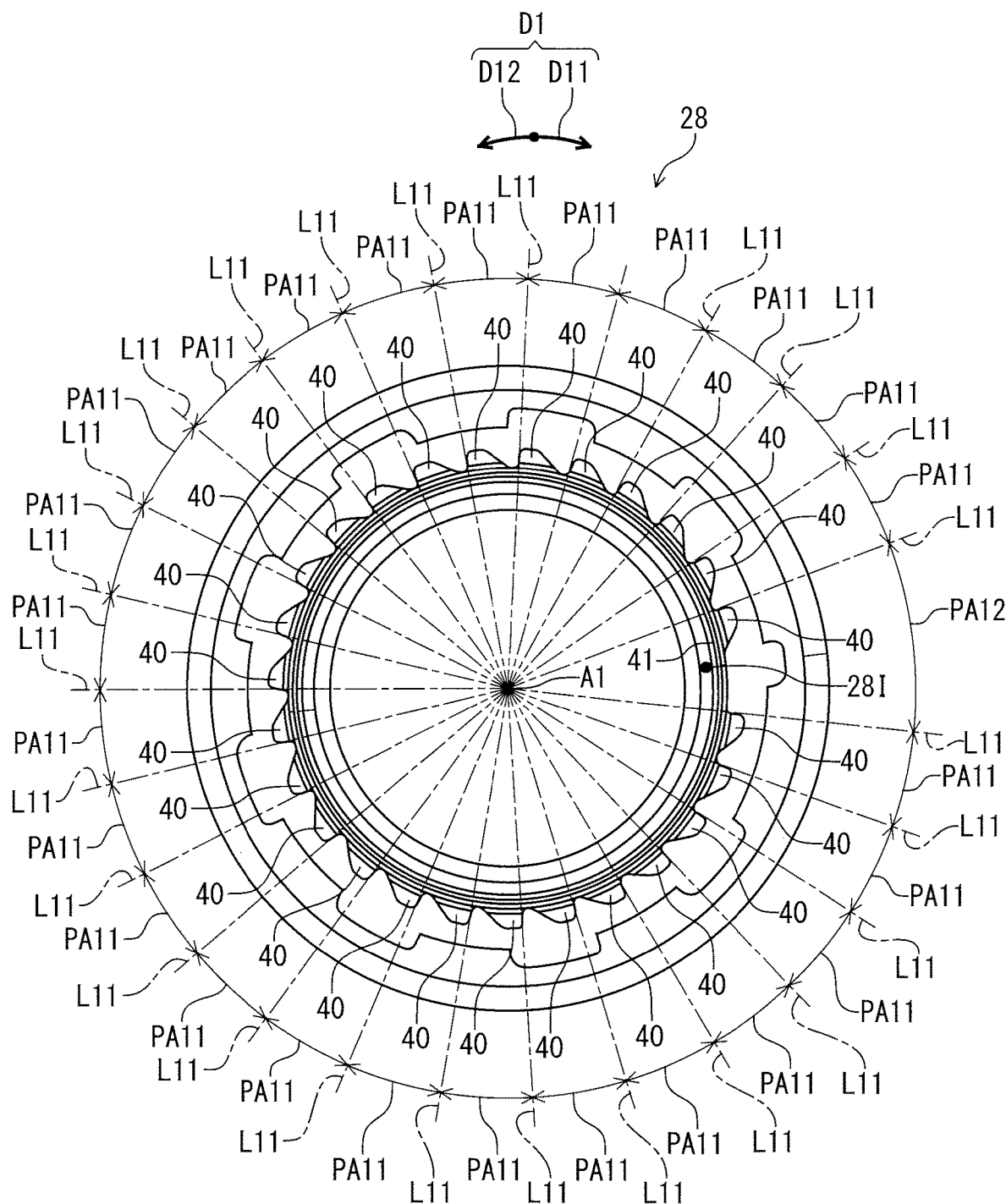
FIG. 9 is a side elevational view of the sprocket support body illustrated in FIG. 7.

As seen in FIG. 9, a total number of the at least ten external spline teeth 40 is equal to or larger than 20. The total number of the at least ten external spline teeth 40 is equal to or larger than 25. In this embodiment, the total number of the at least ten external spline teeth 40 is 26. However, a total number of the external spline teeth 40 is not limited to this embodiment and the above ranges.

The at least ten external spline teeth 40 have a first external pitch angle PA11 and a second external pitch angle PA12. At least two external spline teeth of the at least ten external spline teeth 40 are circumferentially arranged at the first external pitch angle PA11 with respect to the rotational center axis A1 of the bicycle hub assembly 12. In other words, at least two of the plurality of external spline teeth 40 are circumferentially arranged at the first external pitch angle PA11 with respect to the rotational center axis A1 of the bicycle hub assembly 12. At least two external spline teeth of the at least ten external spline teeth 40 are circumferentially arranged at the second external pitch angle PA12 with respect to the rotational center axis A1 of the bicycle hub assembly 12. In other words, at least two of the plurality of external spline teeth 40 are circumferentially arranged at the second external pitch angle PA12 with respect to the rotational center axis A1 of the bicycle hub assembly 12. In this embodiment, the second external pitch angle PA12 is different from the first external pitch angle PA11. However, the second external pitch angle PA12 can be substantially equal to the first external pitch angle PA11.

In this embodiment, the external spline teeth 40 are arranged at the first external pitch angle PA11 in the circumferential direction D1. Two external spline teeth of the external spline teeth 40 are arranged at the second external pitch angle PA12 in the circumferential direction D1. However, at least two external spline teeth of the external spline teeth 40 can be arranged at another external pitch angle in the circumferential direction D1.

The first external pitch angle PA11 ranges from 10 degrees to 20 degrees. The first external pitch angle PA11 ranges from 12 degrees to 15 degrees. The first external pitch angle PA11 ranges from 13 degrees to 14 degrees. In this embodiment, the first external pitch angle PA11 is 13.3 degrees. However, the first external pitch angle PA11 is not limited to this embodiment and the above ranges.

The second external pitch angle PA12 ranges from 5 degrees to 30 degrees. In this embodiment, the second external pitch angle PA12 is 26 degrees. However, the second external pitch angle PA12 is not limited to this embodiment and the above range.

Figure 10:
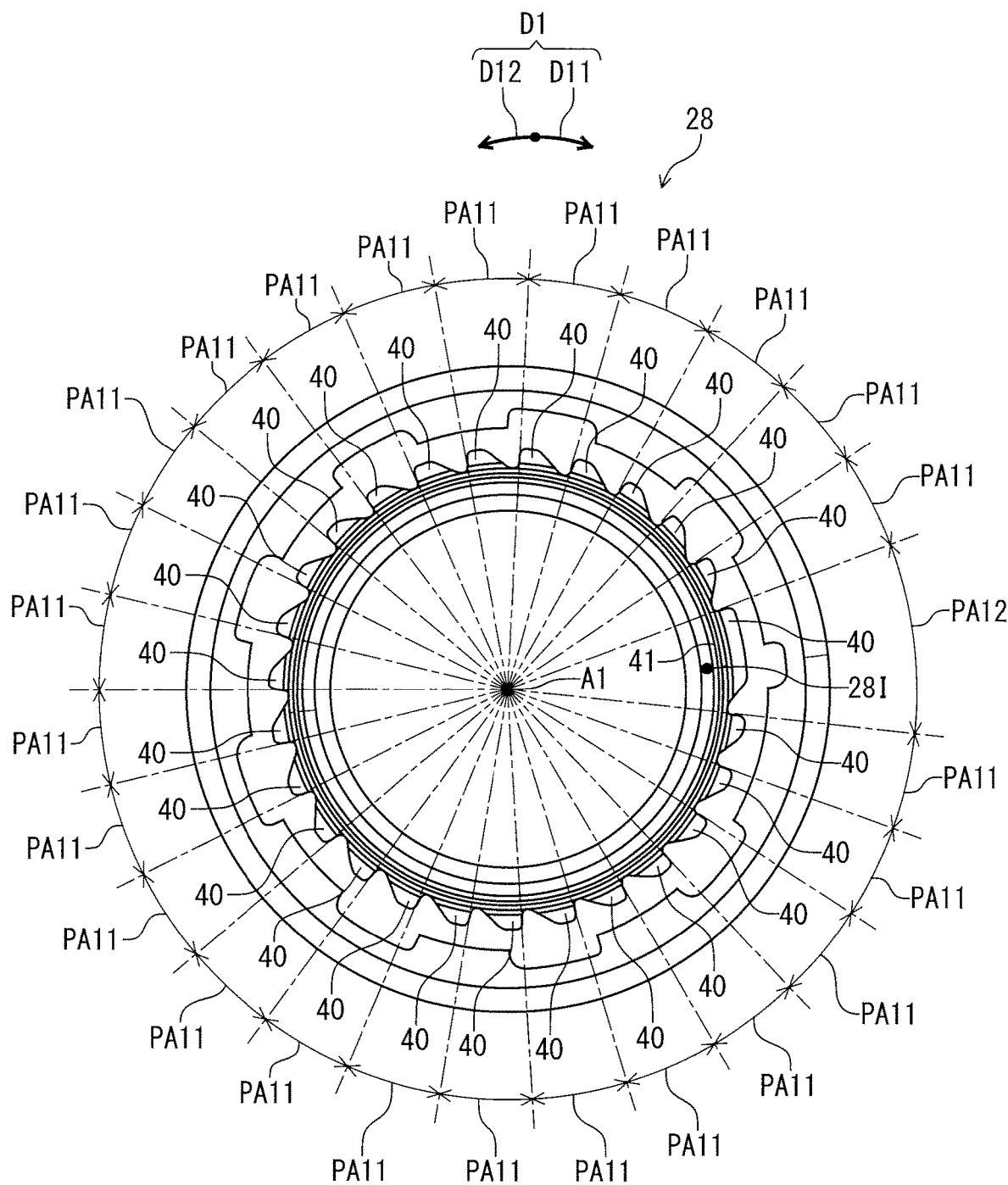
FIG. 10 is a side elevational view of a sprocket support body of the bicycle hub assembly in accordance with a modification.

The external spline teeth 40 have substantially the same shape as each other. The external spline teeth 40 have substantially the same spline size as each other. The external spline teeth 40 have substantially the same profile as each other when viewed along the rotational center axis A1. As seen in FIG. 10, however, at least one of the at least ten external spline teeth 40 can have a first spline shape different from a second spline shape of another of the at least ten external spline teeth 40. At least one of the at least ten external spline teeth 40 can have a first spline size different from a second spline size of another of the at least ten external spline teeth 40. At least one of the at least ten external spline teeth 40 can have a profile different from a profile of another of the at least ten external spline teeth 40 when viewed along the rotational center axis A1. In FIG. 10, one of the external spline teeth 40 has a spline shape different from a spline shape of the other teeth of the external spline teeth 40. One of the external spline teeth 40 has a spline size different from a spline size of the other teeth of the external spline teeth 40. One of the external spline teeth 40 has a profile different from a profile of the other teeth of the external spline teeth 40 when viewed along the rotational center axis A1.

Figure 11:
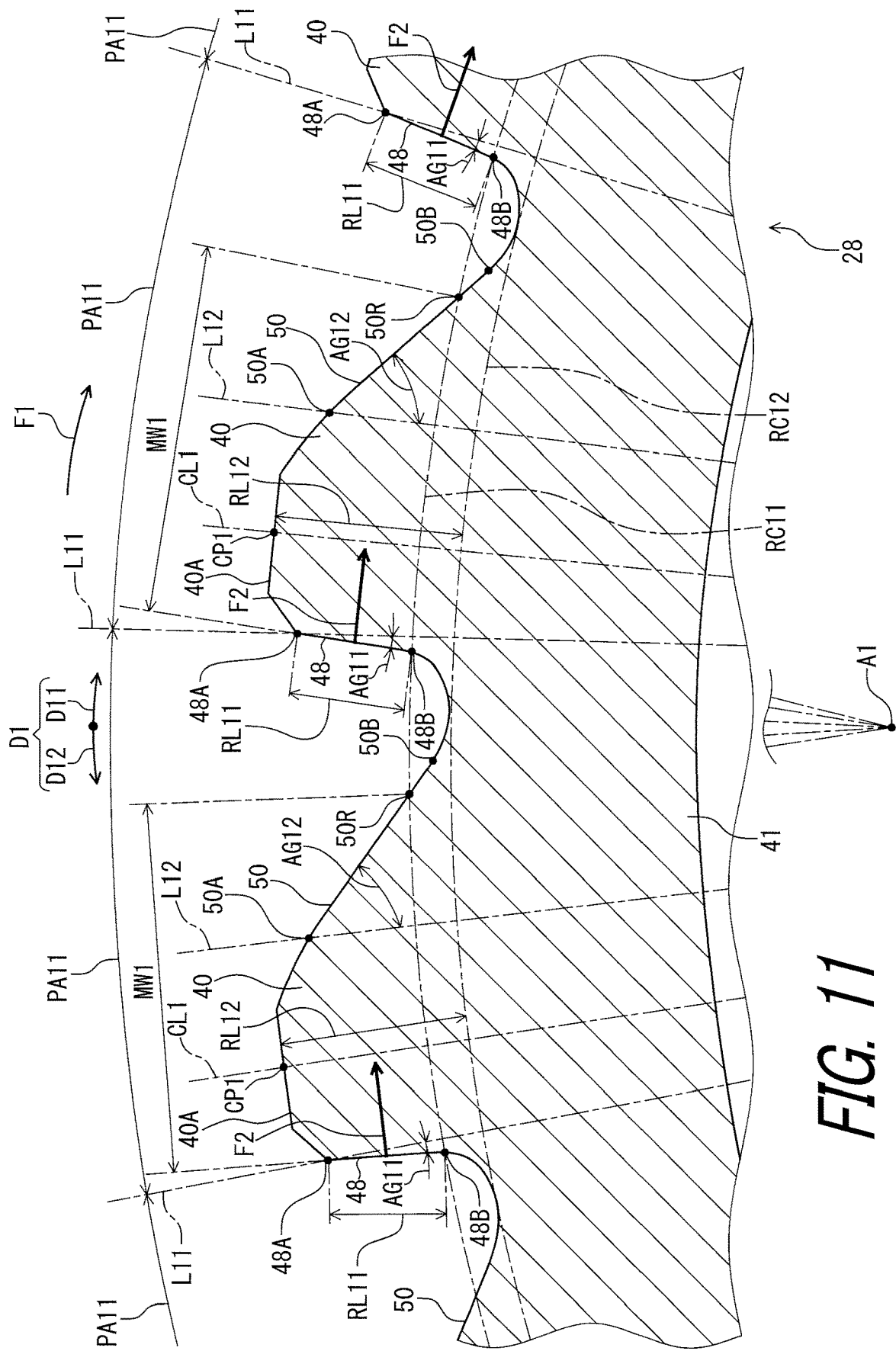
FIG. 11 is an enlarged cross-sectional view of the sprocket support body illustrated in FIG. 7.

As seen in FIG. 11, each of the at least ten external spline teeth 40 has an external-spline driving surface 48 and an external-spline non-driving surface 50. The plurality of external spline teeth 40 includes a plurality of external-spline driving surfaces 48 to receive the driving rotational force F1 from the bicycle rear sprocket assembly 14A (FIG. 6) during pedaling. The plurality of external spline teeth 40 includes a plurality of external-spline non-driving surfaces 50. The external-spline driving surface 48 is contactable with the bicycle rear sprocket assembly 14A to receive the driving rotational force F1 from the bicycle rear sprocket assembly 14A (FIG. 6) during pedaling. The external-spline driving surface 48 faces in the reverse rotational direction D12. The external-spline driving surface 48 faces an internal-spline driving surface of the bicycle rear sprocket assembly 14A in a state where the bicycle rear sprocket assembly 14A is mounted to the bicycle hub assembly 12. The external-spline non-driving surface 50 is provided on a reverse side of the external-spline driving surface 48 in the circumferential direction D1. The external-spline non-driving surface 50 faces in the driving rotational direction D11 not to receive the driving rotational force F1 from the bicycle rear sprocket assembly 14A during pedaling. The external-spline non-driving surface 50 faces an internal-spline non-driving surface of the bicycle rear sprocket assembly 14A in a state where the bicycle rear sprocket assembly 14A is mounted to the bicycle hub assembly 12.

The at least ten external spline teeth 40 respectively have circumferential maximum widths MW1. The external spline teeth 40 respectively have circumferential maximum widths MW1. The circumferential maximum width MW1 is defined as a maximum width to receive a thrust force F2 applied to the external spline tooth 40. The circumferential maximum width MW1 is defined as a straight distance based on the external-spline driving surface 48.

The plurality of external-spline driving surfaces 48 each includes a radially outermost edge 48A and a radially innermost edge 48B. The external-spline driving surface 48 extends from the radially outermost edge 48A to the radially innermost edge 48B. A first reference circle RC11 is defined on the radially innermost edge 48B and is centered at the rotational center axis A1. The first reference circle RC11 intersects with the external-spline non-driving surface 50 at a reference point 50R. The circumferential maximum width MW1 extends straight from the radially innermost edge 48B to the reference point 50R in the circumferential direction D1.

The plurality of external-spline non-driving surfaces 50 each includes a radially outermost edge 50A and a radially innermost edge 50B. The external-spline non-driving surface 50 extends from the radially outermost edge 50A to the radially innermost edge 50B. The reference point 50R is provided between the radially outermost edge 50A and the radially innermost edge 50B. However, the reference point 50R can coincide with the radially innermost edge 50B.

A total of the circumferential maximum widths MW1 is equal to or larger than 55 mm. The total of the circumferential maximum widths MW1 is equal to or larger than 60 mm. The total of the circumferential maximum widths MW1 is equal to or larger than 65 mm. In this embodiment, the total of the circumferential maximum widths MW1 is 68 mm. However, the total of the circumferential maximum widths MW1 is not limited to this embodiment and the above ranges.

Figure 12:
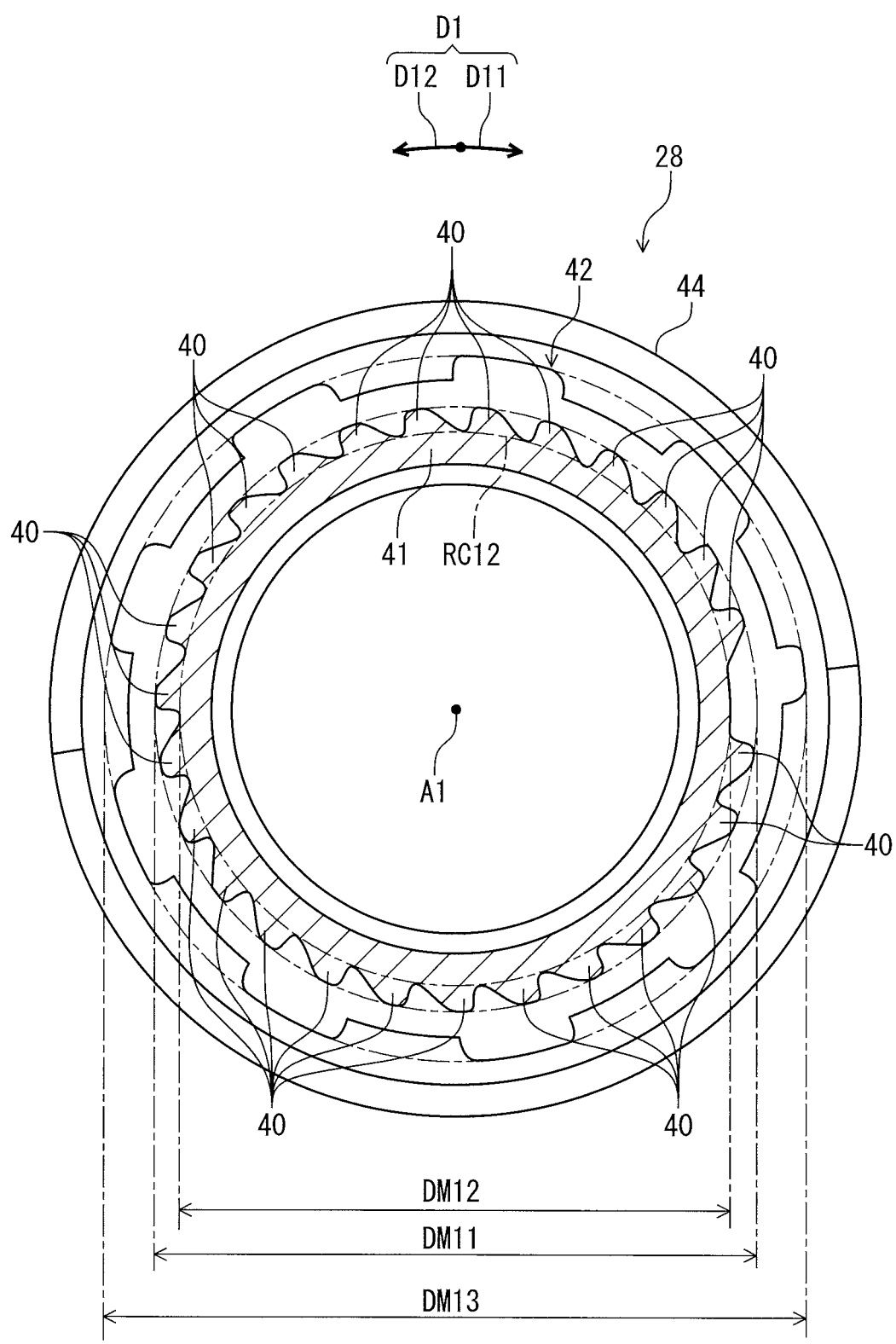
FIG. 12 is a cross-sectional view of the sprocket support body illustrated in FIG. 7.

As seen in FIG. 12, the at least one external spline tooth 40 has an external-spline major diameter DM11. The external-spline major diameter DM11 is equal to or larger than 25 mm. The external-spline major diameter DM11 is equal to or larger than 29 mm. The external-spline major diameter DM11 is equal to or smaller than 30 mm. In this embodiment, the external-spline major diameter DM11 is 29.6 mm. However, the external-spline major diameter DM11 is not limited to this embodiment and the above ranges. For example, the external-spline major diameter DM11 can be larger than 34 mm and smaller than 35 mm. An example of the external-spline major diameter DM11 includes 34.55 mm.

The at least one external spline tooth 40 has an external-spline minor diameter DM12. The at least one external spline tooth 40 has an external-spline root circle RC12 having the external-spline minor diameter DM12. However, the external-spline root circle RC12 can have another diameter different from the external-spline minor diameter DM12. The external-spline minor diameter DM12 is equal to or smaller than 28 mm. The external-spline minor diameter DM12 is equal to or larger than 25 mm. The external-spline minor diameter DM12 is equal to or larger than 27 mm. In this embodiment, the external-spline minor diameter DM12 is 27.2 mm. However, the external-spline minor diameter DM12 is not limited to this embodiment and the above ranges.

The larger-diameter part 42 has an outer diameter DM13 larger than the external-spline major diameter DM11. The outer diameter DM13 ranges from 32 mm to 40 mm. In this embodiment, the outer diameter DM13 is 35 mm. However, the outer diameter DM13 is not limited to this embodiment.

As seen in FIG. 11, the plurality of external-spline driving surfaces 48 each includes a radial length RL11 defined from the radially outermost edge 48A to the radially innermost edge 48B. A total of the radial lengths RL11 of the plurality of external-spline driving surfaces 48 is equal to or larger than 7 mm. The total of the radial lengths RL11 is equal to or larger than 10 mm. The total of the radial lengths RL11 is equal to or larger than 15 mm. In this embodiment, the total of the radial lengths RL11 is 19.5 mm. However, the total of the radial lengths RL11 is not limited to this embodiment.

The plurality of external spline tooth 40 has an additional radial length RL12. The additional radial lengths RL12 are respectively defined from the external-spline root circle RC12 to radially outermost ends 40A of the plurality of external spline teeth 40. A total of the additional radial lengths RL12 is equal to or larger than 12 mm. In this embodiment, the total of the additional radial lengths RL12 is 31.85 mm. However, the total of the additional radial lengths RL12 is not limited to this embodiment.

At least one of the at least nine external spline teeth 40 has an asymmetric shape with respect to a circumferential tooth-tip center line CL1. The circumferential tooth-tip center line CL1 is a line connecting the rotational center axis A1 and a circumferential center point CP1 of the radially outermost end 40A of the external spline tooth 40. However, at least one of the external spline teeth 40 can have a symmetric shape with respect to the circumferential tooth-tip center line CL1. The at least one of the at least nine external spline teeth 40 comprises the external-spline driving surface 48 and the external-spline non-driving surface 50.

The external-spline driving surface 48 has a first external-spline-surface angle AG11. The first external-spline-surface angle AG11 is defined between the external-spline driving surface 48 and a first radial line L11. The first radial line L11 extends from the rotational center axis A1 of the bicycle hub assembly 12 to the radially outermost edge 48A of the external-spline driving surface 48. The first external pitch angle PA11 or the second external pitch angle PA12 is defined between the first radial lines L11 (see, e.g., FIG. 9).

The external-spline non-driving surface 50 has a second external-spline-surface angle AG12. The second external-spline-surface angle AG12 is defined between the external-spline non-driving surface 50 and a second radial line L12. The second radial line L12 extends from the rotational center axis A1 of the bicycle hub assembly 12 to the radially outermost edge 50A of the external-spline non-driving surface 50.

In this embodiment, the second external-spline-surface angle AG12 is different from the first external-spline-surface angle AG11. The first external-spline-surface angle AG11 is smaller than the second external-spline-surface angle AG12. However, the first external-spline-surface angle AG11 can be equal to or larger than the second external-spline-surface angle AG12.

The first external-spline-surface angle AG11 ranges from 0 degree to 10 degrees. The second external-spline-surface angle AG12 ranges from 0 degree to 60 degrees. In this embodiment, the first external-spline-surface angle AG11 is 5 degrees. The second external-spline-surface angle AG12 is 45 degrees. However, the first external-spline-surface angle AG11 and the second external-spline-surface angle AG12 are not limited to this embodiment and the above ranges.

Figure 13:
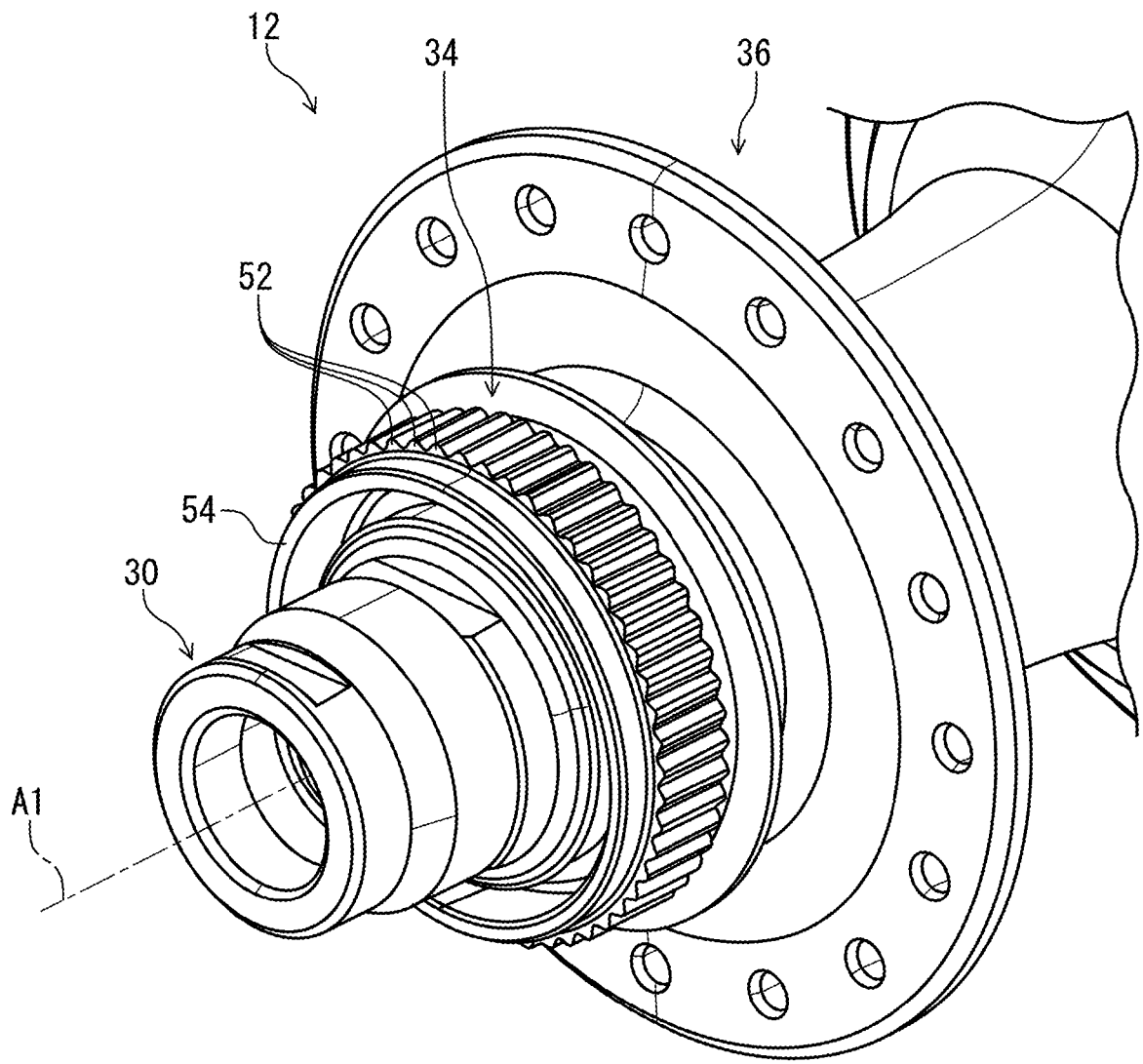
FIG. 13 is a perspective view of the bicycle hub assembly of the bicycle drive train illustrated in FIG. 3.

As seen in FIG. 13, the brake-rotor support body 34 includes at least one additional external spline tooth 52 configured to engage with the bicycle brake rotor 16 (FIG. 4). In this embodiment, the brake-rotor support body 34 includes an additional base support 54 and a plurality of additional external spline teeth 52. The additional base support 54 has a tubular shape and extends from the hub body 36 along the rotational center axis A1. The additional external spline tooth 52 extends radially outwardly from additional base support 54.

Figure 14:
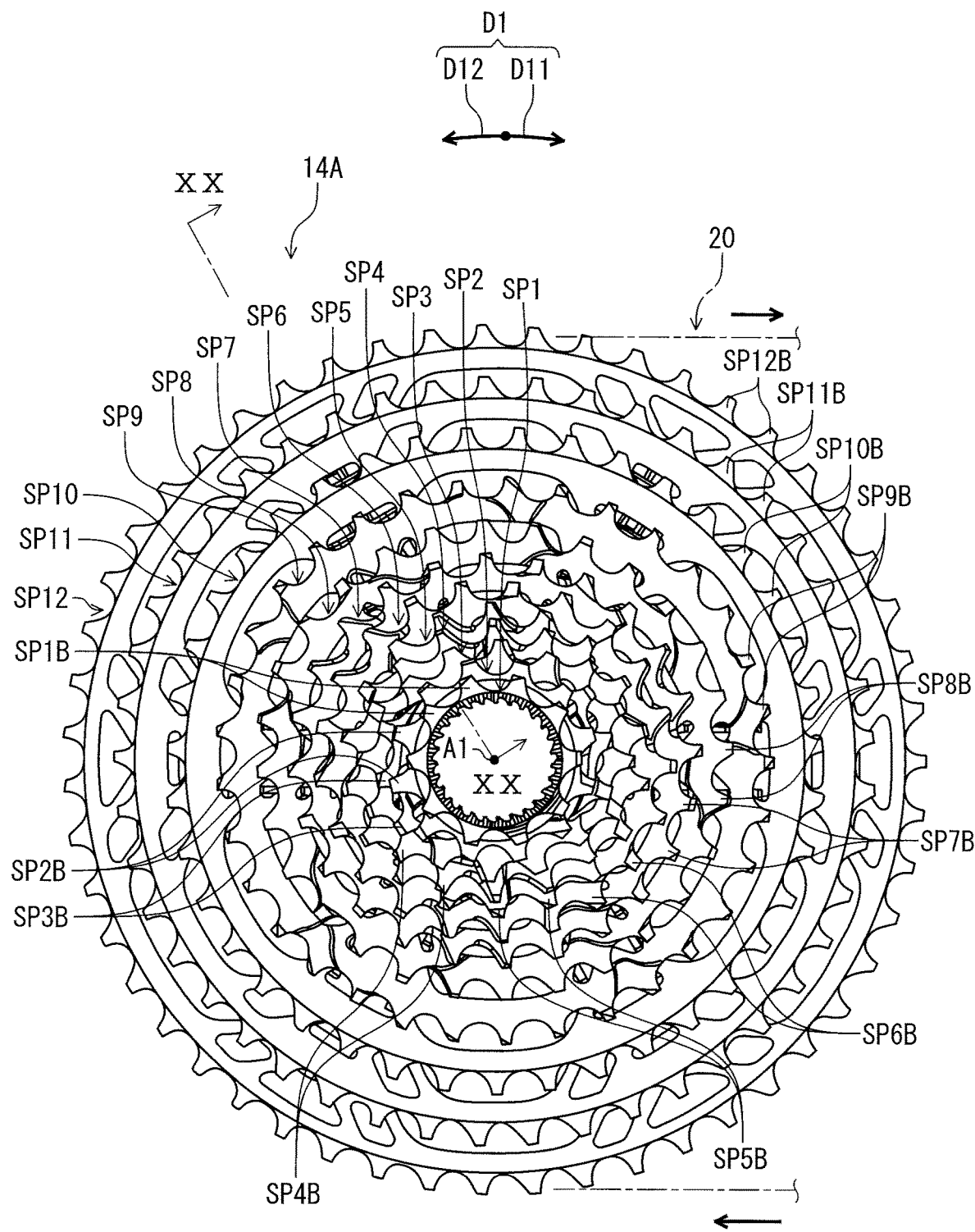
FIG. 14 is a side elevational view of the bicycle rear sprocket assembly of the bicycle drive train illustrated in FIG. 3.

As seen in FIG. 14, the bicycle rear sprocket assembly 14A comprises at least one sprocket. The at least one sprocket includes a smallest sprocket SP1 and a largest sprocket SP12. The smallest sprocket SP1 can also be referred to as a sprocket SP1. The largest sprocket SP12 can also be referred to as a sprocket SP12. In this embodiment, the at least one sprocket further includes sprockets SP2 to SP11. The sprocket SP1 corresponds to top gear. The sprocket SP12 corresponds to low gear. A total number of the sprockets of the bicycle rear sprocket assembly 14A is not limited to this embodiment.

The smallest sprocket SP1 includes at least one sprocket tooth SP1B. A total number of the at least one sprocket tooth SP1B of the smallest sprocket SP1 is equal to or smaller than 10. In this embodiment, the total number of the at least one sprocket tooth SP1B of the smallest sprocket SP1 is 10. However, the total number of the at least one sprocket tooth SP1B of the smallest sprocket SP1 is not limited to this embodiment and the above range.

The largest sprocket SP12 includes at least one sprocket tooth SP12B. A total number of the at least one sprocket tooth SP12B of the largest sprocket SP12 is equal to or larger than 46. The total number of the at least one sprocket tooth SP12B of the largest sprocket SP12 is equal to or larger than 50. In this embodiment, the total number of the at least one sprocket tooth SP12B of the largest sprocket SP12 is 51. However, the total number of the at least one sprocket tooth SP12B of the largest sprocket SP12 is not limited to this embodiment and the above ranges.

The sprocket SP2 includes at least one sprocket tooth SP2B. The sprocket SP3 includes at least one sprocket tooth SP3B. The sprocket SP4 includes at least one sprocket tooth SP4B. The sprocket SP5 includes at least one sprocket tooth SP5B. The sprocket SP6 includes at least one sprocket tooth SP6B. The sprocket SP7 includes at least one sprocket tooth SP7B. The sprocket SP8 includes at least one sprocket tooth SP8B. The sprocket SP9 includes at least one sprocket tooth SP9B. The sprocket SP10 includes at least one sprocket tooth SP10B. The sprocket SP11 includes at least one sprocket tooth SP11B.

A total number of the at least one sprocket tooth SP2B is 12. A total number of the at least one sprocket tooth SP3B is 14. A total number of the at least one sprocket tooth SP4B is 16. A total number of the at least one sprocket tooth SP5B is 18. A total number of the at least one sprocket tooth SP6B is 21. A total number of the at least one sprocket tooth SP7B is 24. A total number of the at least one sprocket tooth SP8B is 28. A total number of the at least one sprocket tooth SP9B is 33. A total number of the at least one sprocket tooth SP10B is 39. A total number of the at least one sprocket tooth SP11B is 45. The total number of the sprocket teeth of each of the sprockets SP2 to SP11 is not limited to this embodiment.

Figure 15:
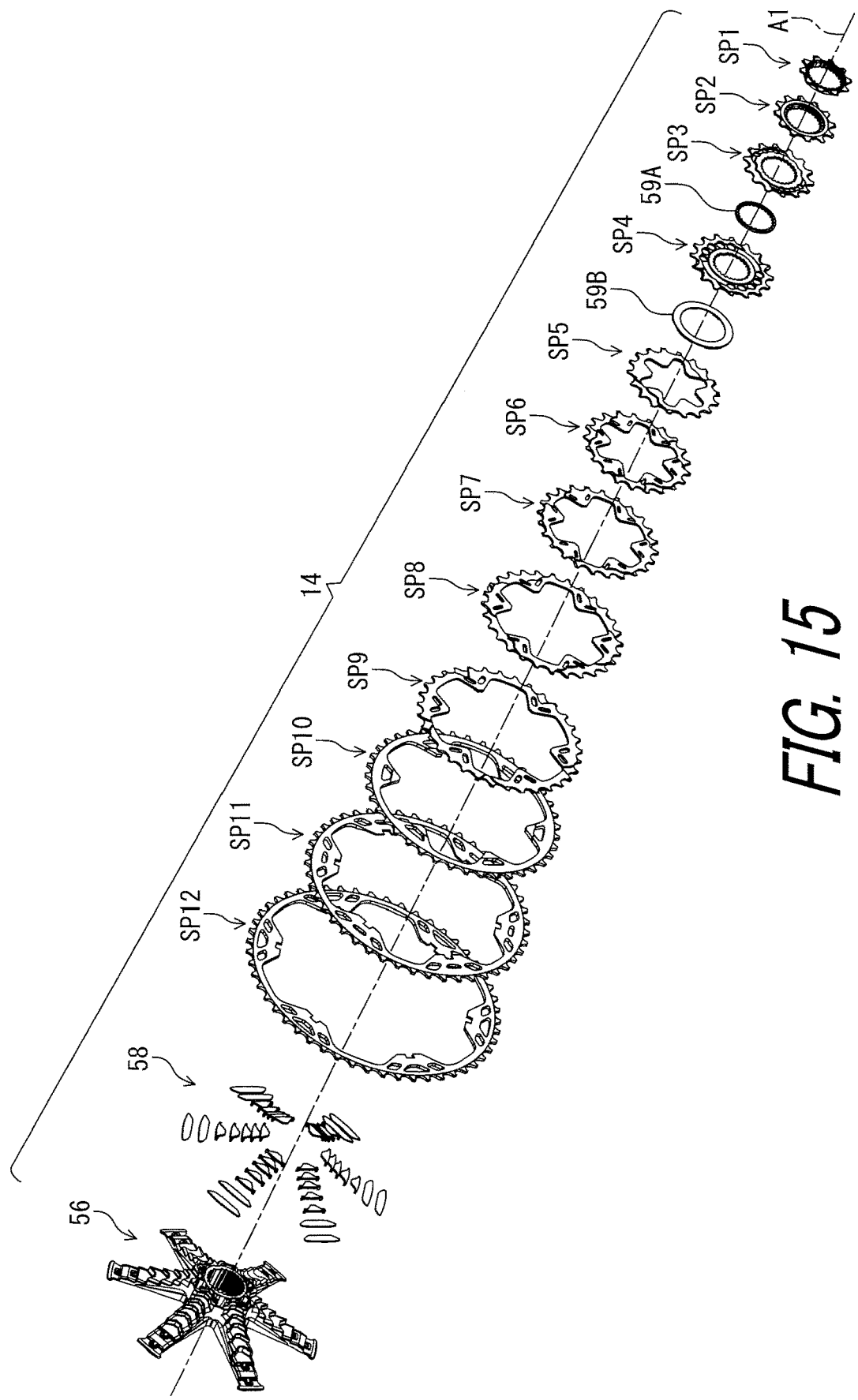
FIG. 15 is an exploded perspective view of the bicycle rear sprocket assembly illustrated in FIG. 14.

As seen in FIG. 15, the sprockets SP1 to SP12 are separate members from each other. However, at least one of the sprockets SP1 to SP12 can be at least partly provided integrally with another of the sprockets SP1 to SP12. The bicycle rear sprocket assembly 14A comprises a sprocket support 56, a plurality of spacers 58, a first ring 59A, and a second ring 59B. The sprockets SP1 to SP12 are attached to the sprocket support 56 in the illustrated embodiment. For example, the sprockets SP1 to SP12 are attached to the sprocket support 56 with a bonding structure such as an adhesive agent so that weight of the bicycle rear sprocket assembly 14A can be saved due to no metallic fastening member being used.

Figure 16:
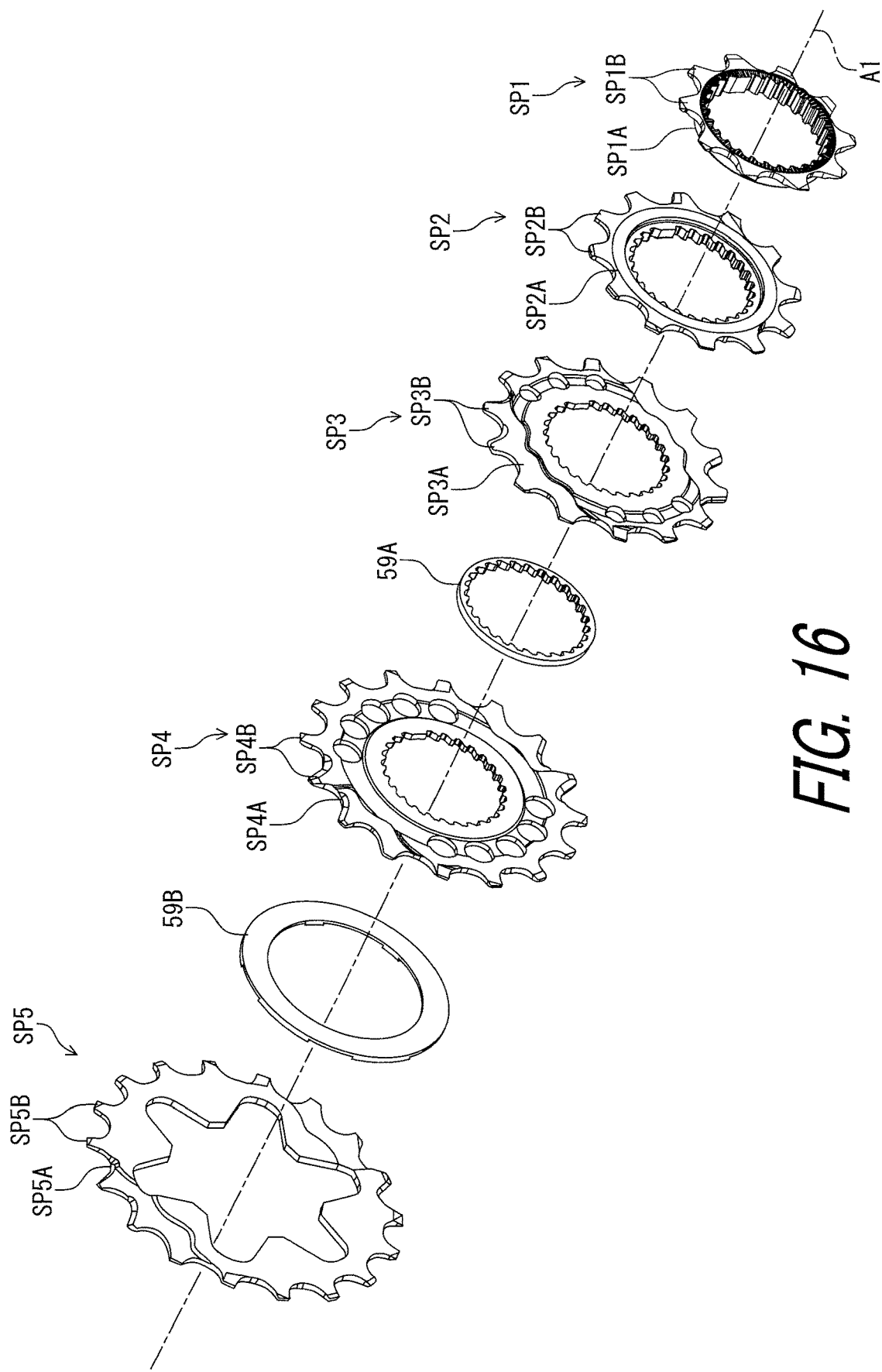
FIG. 16 is a partial exploded perspective view of the bicycle rear sprocket assembly illustrated in FIG. 14.

As seen in FIG. 16, the sprocket SP1 includes a sprocket body SP1A and the plurality of sprocket teeth SP1B. The plurality of sprocket teeth SP1B extends radially outwardly from the sprocket body SP1A. The sprocket SP2 includes a sprocket body SP2A and the plurality of sprocket teeth SP2B. The plurality of sprocket teeth SP2B extends radially outwardly from the sprocket body SP2A. The sprocket SP3 includes a sprocket body SP3A and the plurality of sprocket teeth SP3B. The plurality of sprocket teeth SP3B extends radially outwardly from the sprocket body SP3A. The sprocket SP4 includes a sprocket body SP4A and the plurality of sprocket teeth SP4B. The plurality of sprocket teeth SP4B extends radially outwardly from the sprocket body SP4A. The sprocket SP5 includes a sprocket body SP5A and the plurality of sprocket teeth SP5B. The plurality of sprocket teeth SP5B extends radially outwardly from the sprocket body SP5A. The first ring 59A is provided between the sprockets SP3 and SP4. The second ring 59B is provided between the sprockets SP4 and SP5.

Figure 17:
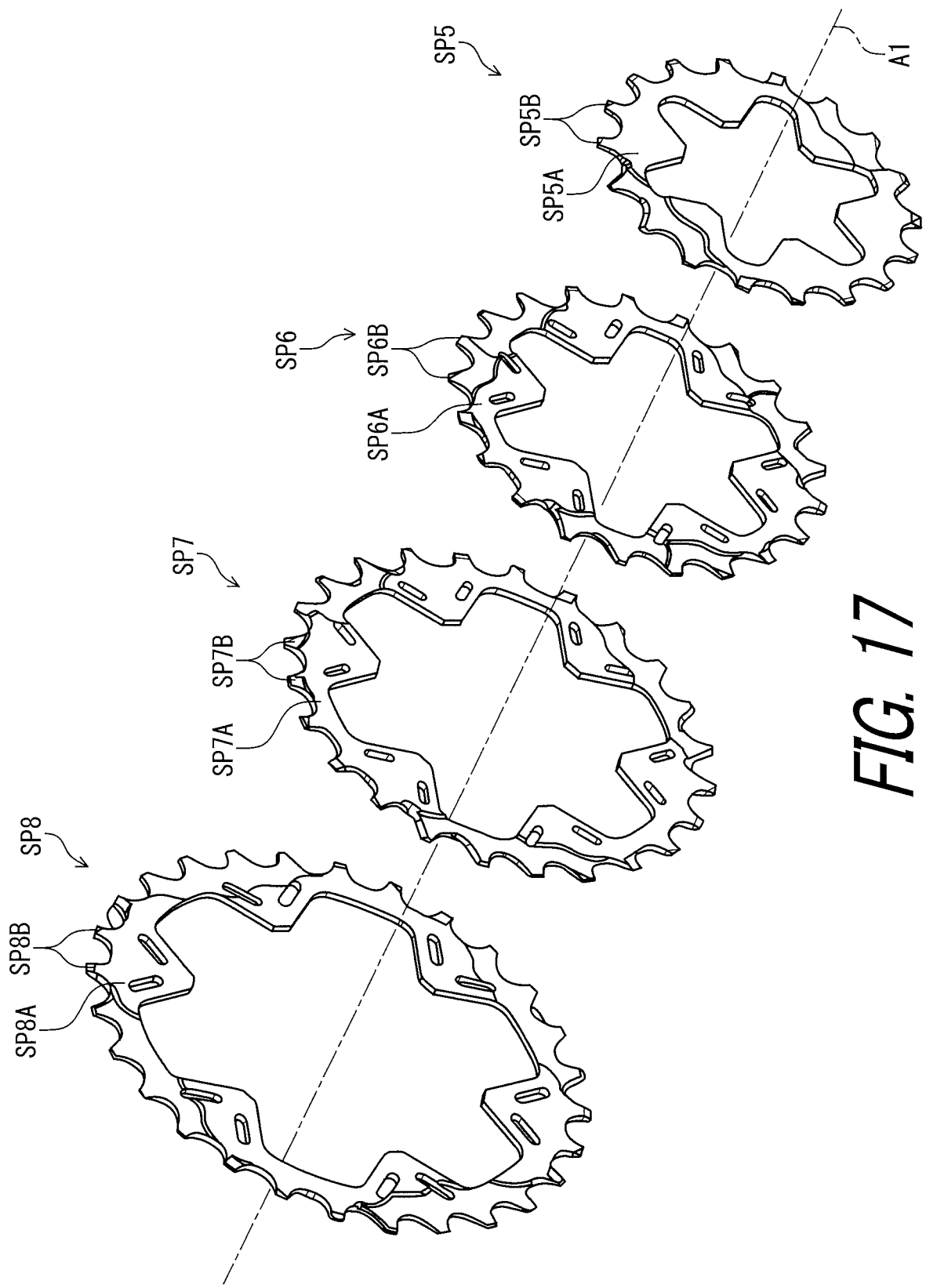
FIG. 17 is another partial exploded perspective view of the bicycle rear sprocket assembly illustrated in FIG. 14.

As seen in FIG. 17, the sprocket SP6 includes a sprocket body SP6A and the plurality of sprocket teeth SP6B. The plurality of sprocket teeth SP6B extends radially outwardly from the sprocket body SP6A. The sprocket SP7 includes a sprocket body SP7A and the plurality of sprocket teeth SP7B. The plurality of sprocket teeth SP7B extends radially outwardly from the sprocket body SP7A. The sprocket SP8 includes a sprocket body SP8A and the plurality of sprocket teeth SP8B. The plurality of sprocket teeth SP8B extends radially outwardly from the sprocket body SP8A.

Figure 18:
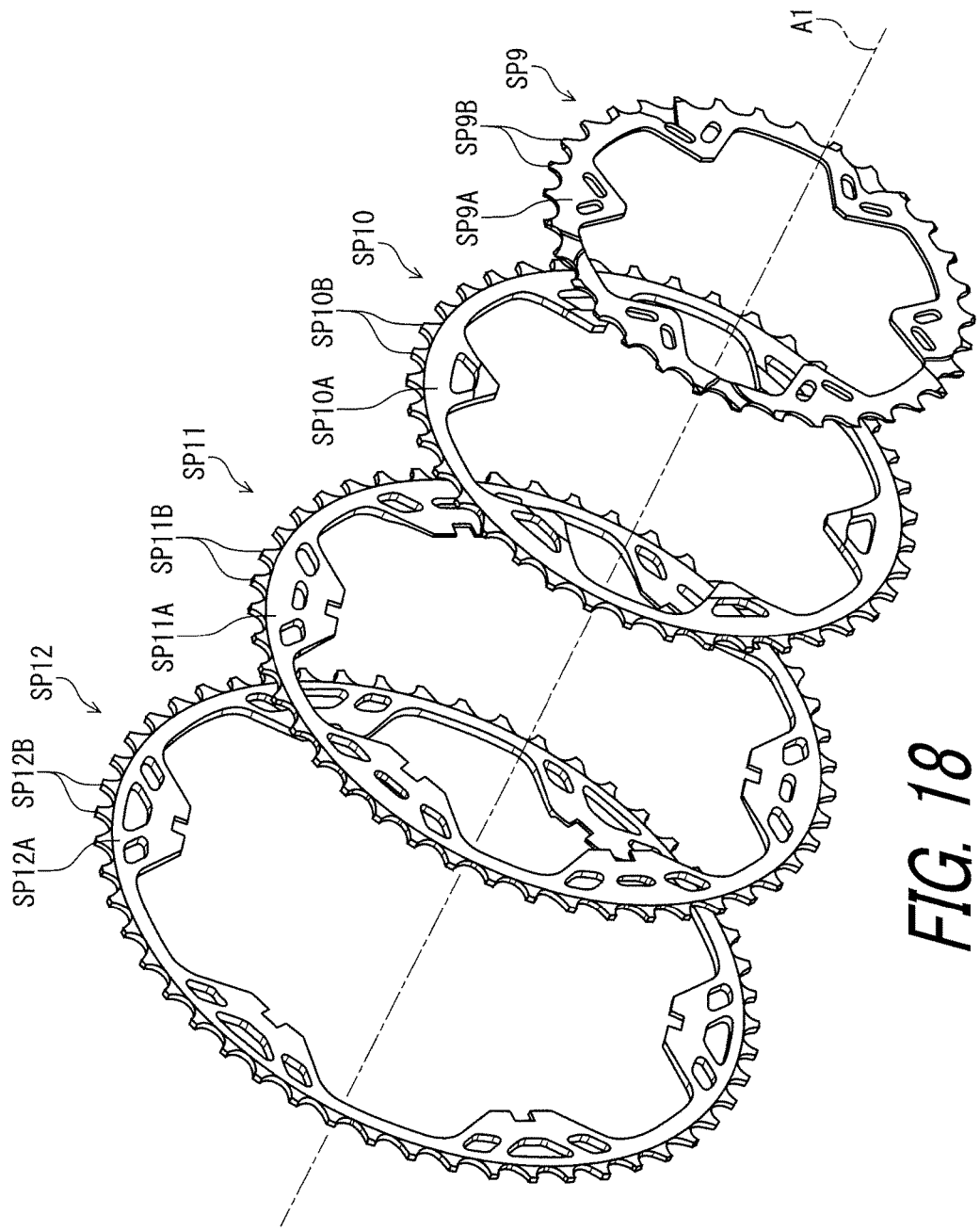
FIG. 18 is another partial exploded perspective view of the bicycle rear sprocket assembly illustrated in FIG. 14.

As seen in FIG. 18, the sprocket SP9 includes a sprocket body SP9A and the plurality of sprocket teeth SP9B. The plurality of sprocket teeth SP9B extends radially outwardly from the sprocket body SP9A. The sprocket SP10 includes a sprocket body SP10A and the plurality of sprocket teeth SP10B. The plurality of sprocket teeth SP10B extends radially outwardly from the sprocket body SP10A. The sprocket SP11 includes a sprocket body SP11A and the plurality of sprocket teeth SP11B. The plurality of sprocket teeth SP11B extends radially outwardly from the sprocket body SP11A. The sprocket SP12 includes a sprocket body SP12A and the plurality of sprocket teeth SP12B. The plurality of sprocket teeth SP12B extends radially outwardly from the sprocket body SP12A.

Figure 19:
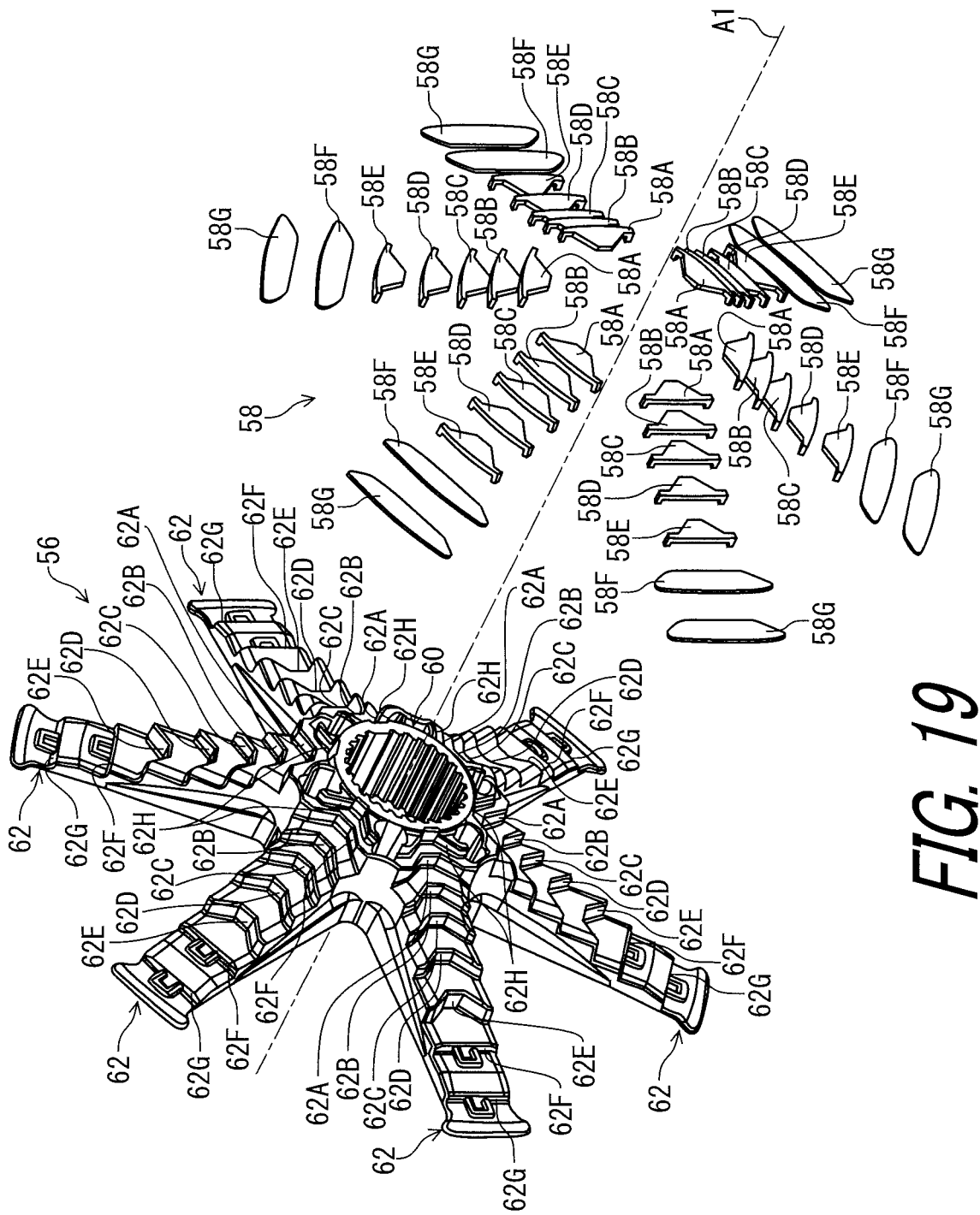
FIG. 19 is another partial exploded perspective view of the bicycle rear sprocket assembly illustrated in FIG. 14.

As seen in FIG. 19, the sprocket support 56 includes a hub engagement part 60 and a plurality of support arms 62. The plurality of support arms 62 extends radially outwardly from the hub engagement part 60. The support arm 62 includes first to eighth attachment parts 62A to 62H. The plurality of spacers 58 includes a plurality of first spacers 58A, a plurality of second spacers 58B, a plurality of third spacers 58C, a plurality of fourth spacers 58D, a plurality of fifth spacers 58E, a plurality of sixth spacers 58F, and a plurality of seventh spacers 58G.

Figure 20:
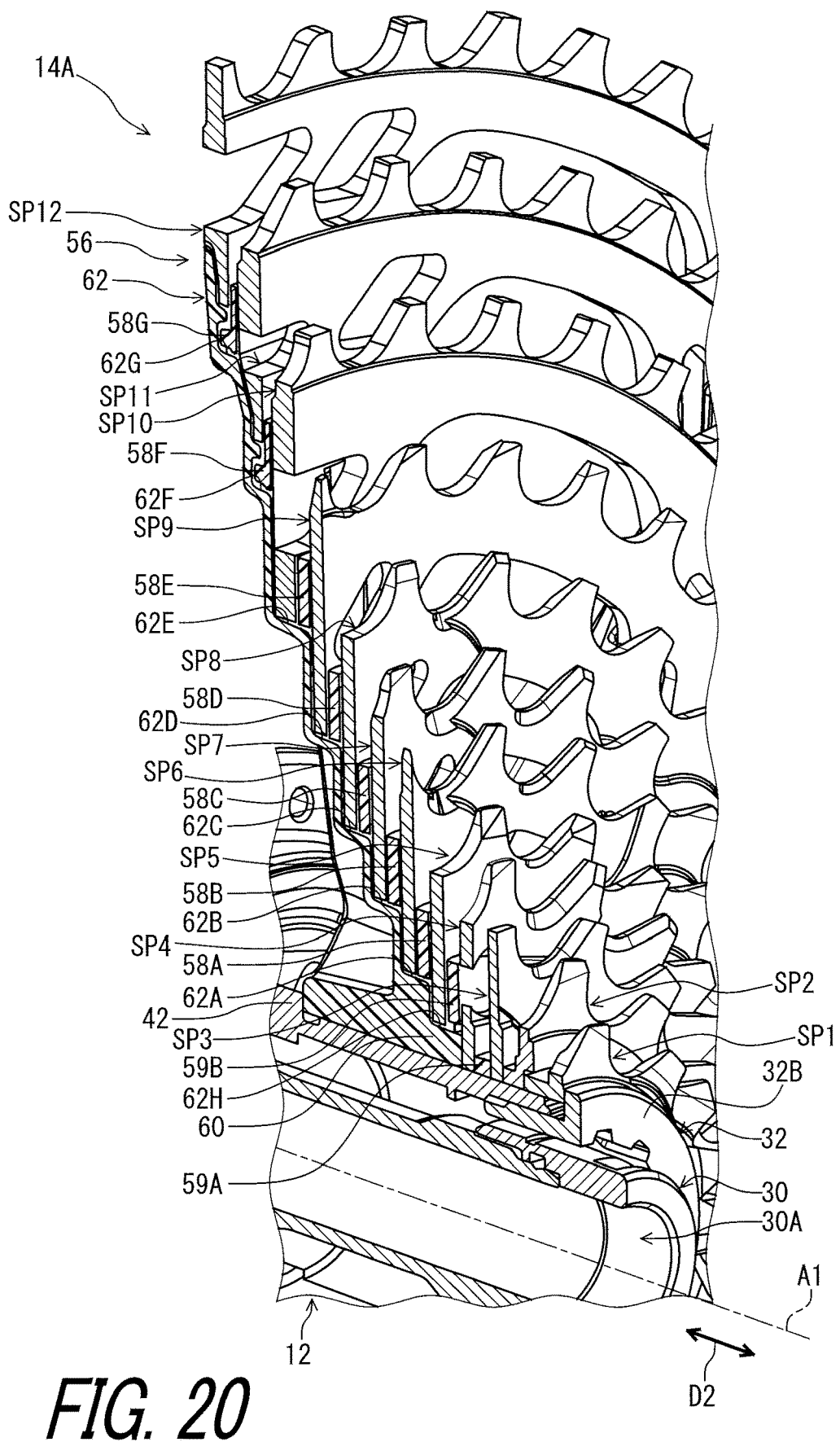
FIG. 20 is a perspective cross-sectional view of the bicycle rear sprocket assembly taken along line XX-XX of FIG. 14.

As seen in FIG. 20, the first spacers 58A are provided between the sprockets SP5 and SP6. The second spacers 58B are provided between the sprockets SP6 and SP7. The third spacers 58C are provided between the sprockets SP7 and SP8. The fourth spacers 58D are provided between the sprockets SP8 and SP9. The fifth spacers 58E are provided between the sprockets SP9 and SP10. The sixth spacers 58F are provided between the sprockets SP10 and SP11. The seventh spacers 58G are provided between the sprockets SP11 and SP12.

The sprocket SP6 and the first spacer 58A are attached to the first attachment part 62A with a bonding structure such as an adhesive agent. The sprocket SP7 and the second spacer 58B are attached to the second attachment part 62B with a bonding structure such as an adhesive agent. The sprocket SP8 and the third spacer 58C are attached to the third attachment part 62C with a bonding structure such as an adhesive agent. The sprocket SP9 and the fourth spacer 58D are attached to the fourth attachment part 62D with a bonding structure such as an adhesive agent. The sprocket SP10 and the fifth spacer 58E are attached to the fifth attachment part 62E with a bonding structure such as an adhesive agent. The sprocket SP11 and the sixth spacer 58F are attached to the sixth attachment part 62F with a bonding structure such as an adhesive agent. The sprocket SP12 and the seventh spacer 58G are attached to the seventh attachment part 62G with a bonding structure such as an adhesive agent. The sprocket SP5 and the second ring 59B are attached to the eighth attachment part 62H with a bonding structure such as an adhesive agent. The hub engagement part 60, the sprockets SP1 to SP4, the first ring 59A, and the second ring 59B are held between the larger-diameter part 42 and the lock flange 32B of the lock ring 32 in the axial direction D2.

In this embodiment, each of the sprockets SP1 to SP12 is made of a metallic material such as aluminum, iron, or titanium. Each of the sprocket support 56, the first to seventh spacers 58A to 58G, the first ring 59A, and the second ring 59B is made of a non-metallic material such as a resin material. However, at least one of the sprockets SP1 to SP12 can be at least partly made of a non-metallic material. At least one of the sprocket support 56, the first to seventh spacers 58A to 58G, the first ring 59A, and the second ring 59B can be at least partly made of a metallic material such as aluminum, iron, or titanium.

Figure 21:
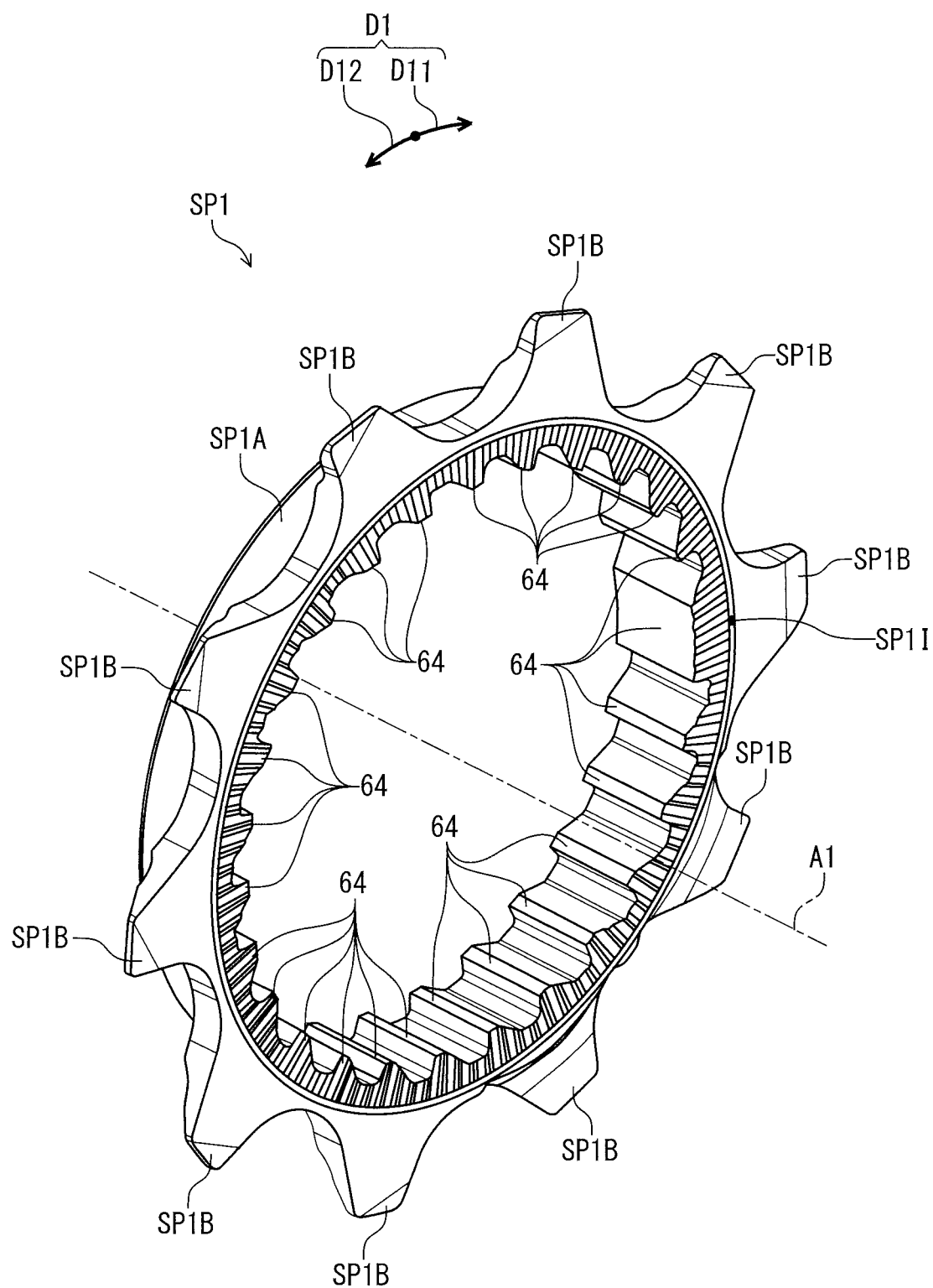
FIG. 21 is a perspective view of a smallest sprocket of the bicycle rear sprocket assembly illustrated in FIG. 14.
Figure 22:
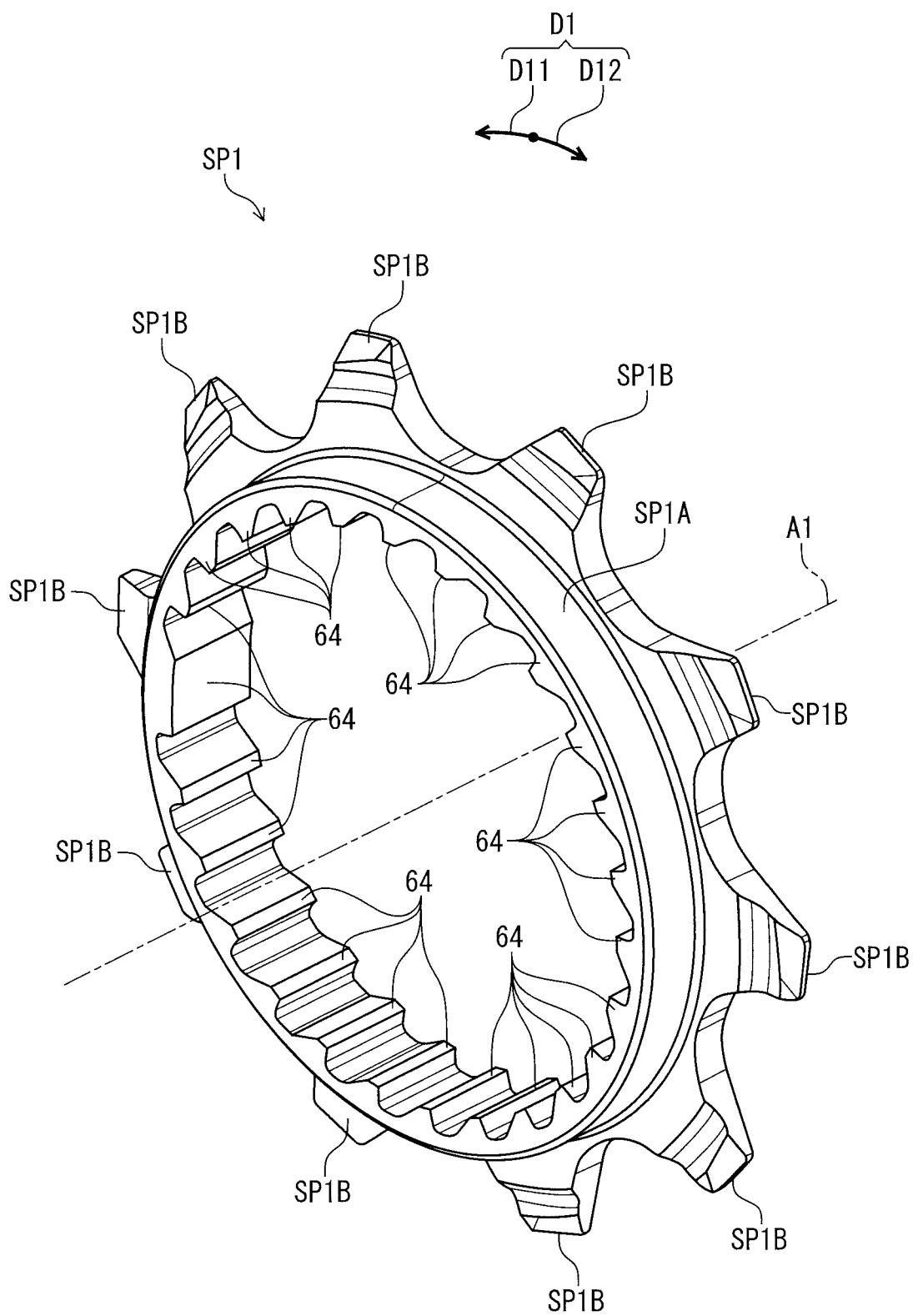
FIG. 22 is another perspective view of the smallest sprocket of the bicycle rear sprocket assembly illustrated in FIG. 14.

The at least one sprocket includes at least one internal spline tooth configured to engage with the bicycle hub assembly 12. As seen in FIGS. 21 and 22, the at least one sprocket includes at least ten internal spline teeth configured to engage with the bicycle hub assembly 12. The at least one internal spline tooth includes a plurality of internal spline teeth. Thus, the at least one sprocket includes a plurality of internal spline teeth configured to engage with the bicycle hub assembly 12. In this embodiment, the sprocket SP1 includes at least ten internal spline teeth 64 configured to engage with the bicycle hub assembly 12. In this embodiment, the sprocket SP1 includes the internal spline teeth 64 configured to mesh with the external spline teeth 40 of the sprocket support body 28 of the bicycle hub assembly 12.

The sprocket body SP1A has an annular shape. The internal spline teeth 64 extend radially inwardly from the sprocket body SP1A.

Figure 23:
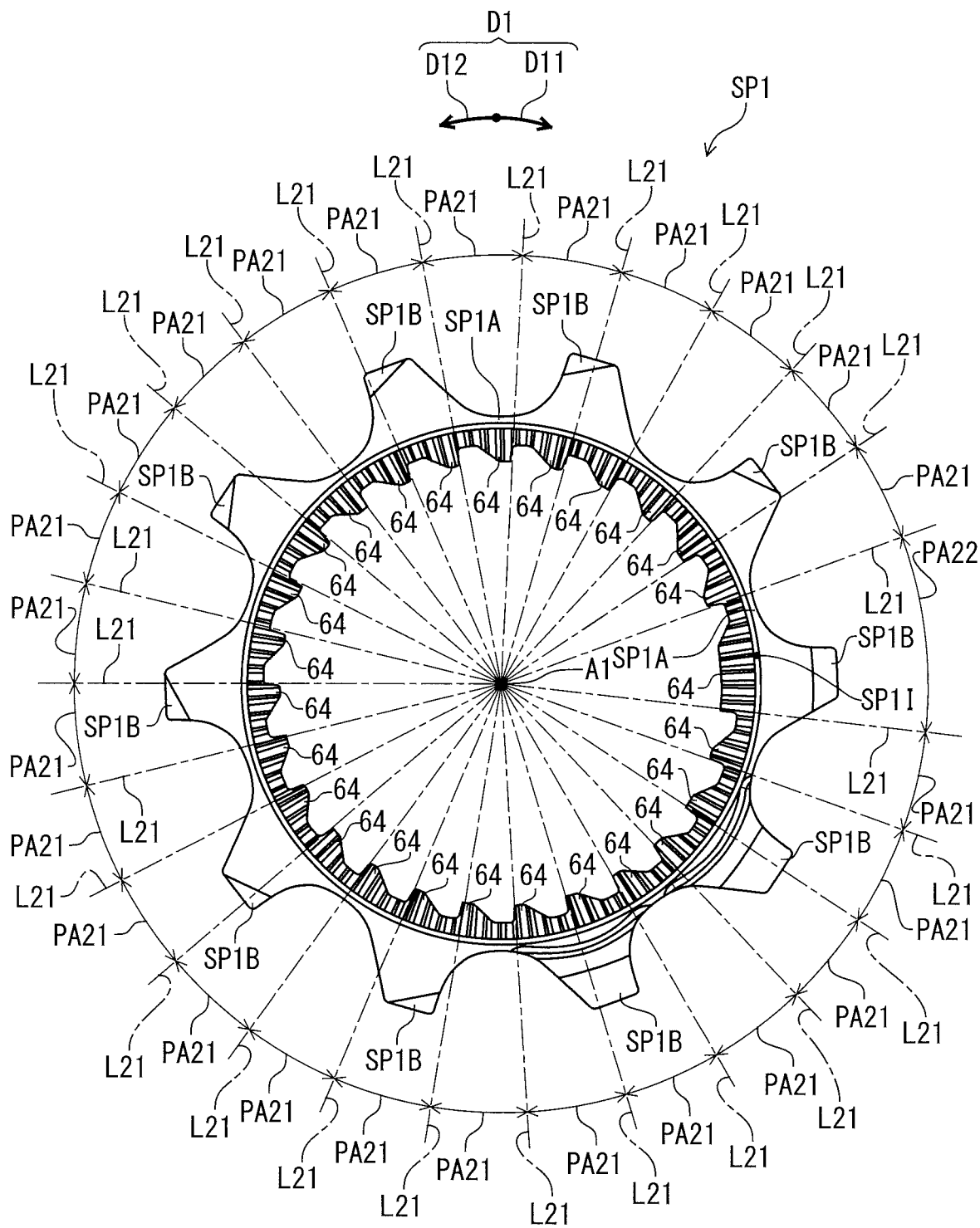
FIG. 23 is a side elevational view of the smallest sprocket of the bicycle rear sprocket assembly illustrated in FIG. 14.

As seen in FIG. 23, a total number of the at least ten internal spline teeth 64 is equal to or larger than 20. The total number of the at least ten internal spline teeth 64 is equal to or larger than 25. In this embodiment, the total number of the internal spline teeth 64 is 26. However, the total number of the internal spline teeth 64 is not limited to this embodiment and the above ranges.

The at least ten internal spline teeth 64 have a first internal pitch angle PA21 and a second internal pitch angle PA22. At least two internal spline teeth of the plurality of internal spline teeth 64 is circumferentially arranged at a first internal pitch angle PA21 with respect to the rotational center axis A1 of the bicycle rear sprocket assembly 14A. At least two internal spline teeth of the plurality of internal spline teeth 64 is circumferentially arranged at a second internal pitch angle PA22 with respect to the rotational center axis A1. In this embodiment, the second internal pitch angle PA22 is different from the first internal pitch angle PA21. However, the second internal pitch angle PA22 can be substantially equal to the first internal pitch angle PA21.

In this embodiment, the internal spline teeth 64 are circumferentially arranged at the first internal pitch angle PA21 in the circumferential direction D1. Two internal spline teeth of the internal spline teeth 64 is arranged at the second internal pitch angle PA22 in the circumferential direction D1. However, at least two internal spline teeth of the internal spline teeth 64 can be arranged at another internal pitch angle in the circumferential direction D1.

The first internal pitch angle PA21 ranges from 10 degrees to 20 degrees. The first internal pitch angle PA21 ranges from 12 degrees to 15 degrees. The first internal pitch angle PA21 ranges from 13 degrees to 14 degrees. In this embodiment, the first internal pitch angle PA21 is 13.3 degrees. However, the first internal pitch angle PA21 is not limited to this embodiment and the above ranges.

The second internal pitch angle PA22 ranges from 5 degrees to 30 degrees. In this embodiment, the second internal pitch angle PA22 is 26 degrees. However, the second internal pitch angle PA22 is not limited to this embodiment and the above range.

Figure 24:
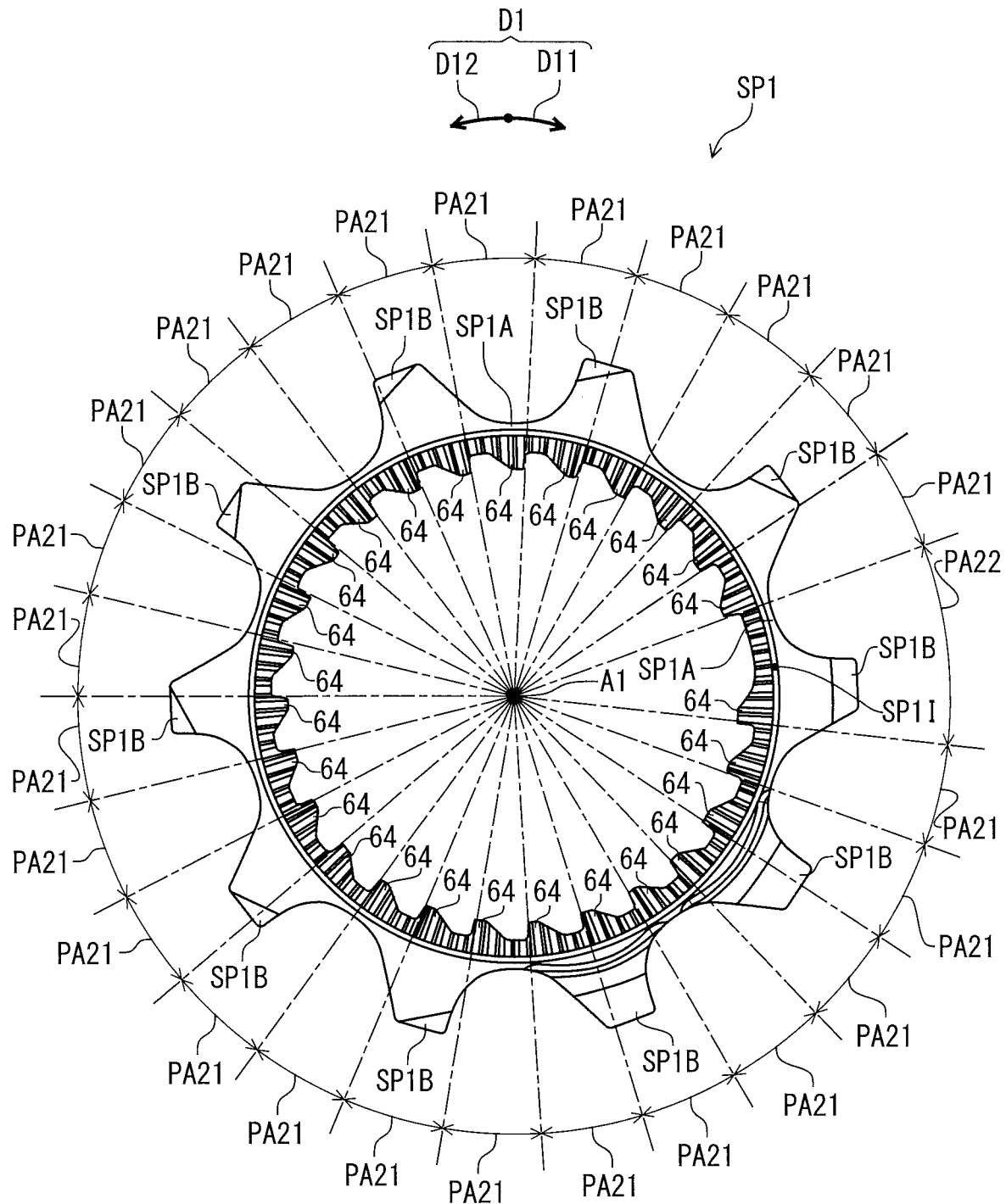
FIG. 24 is a side elevational view of a smallest sprocket in accordance with a modification.

At least one of the at least ten internal spline teeth 64 has a first spline shape different from a second spline shape of another of the at least ten internal spline teeth 64. At least one of the at least ten internal spline teeth 64 has a first spline size different from a second spline size of another of the at least ten internal spline teeth 64. At least one of the at least ten internal spline teeth 64 has a cross-sectional shape different from a cross-sectional shape of another of the at least ten internal spline teeth 64. As seen in FIG. 24, however, the internal spline teeth 64 can have the same shape as each other. The internal spline teeth 64 can have the same size as each other. The internal spline teeth 64 can have the same cross-sectional shape as each other.

Figure 25:
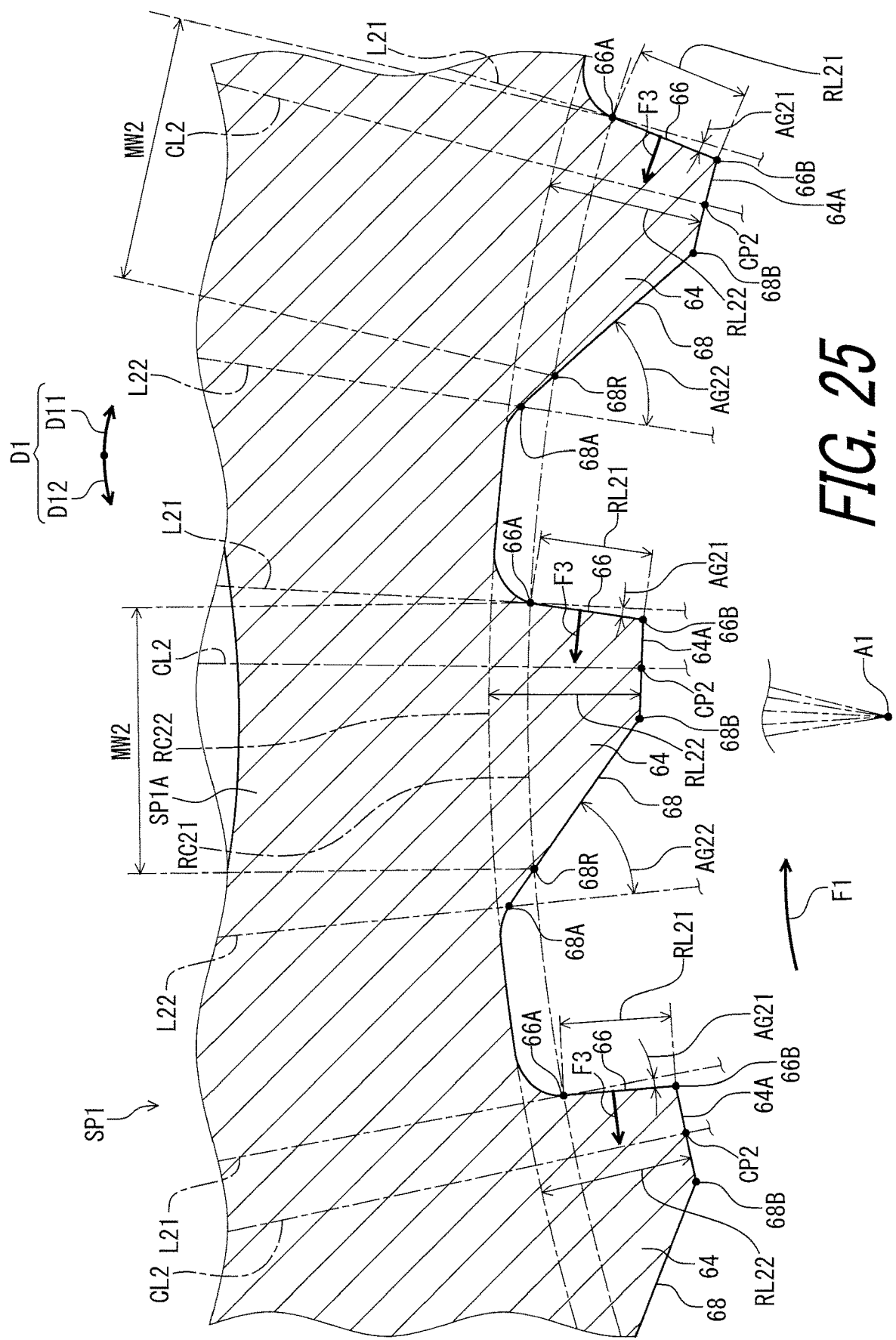
FIG. 25 is an enlarged cross-sectional view of the smallest sprocket illustrated in FIG. 21.

As seen in FIG. 25, the at least one internal spline tooth 64 comprises an internal-spline driving surface 66 and an internal-spline non-driving surface 68. The at least one internal spline tooth 64 includes a plurality of internal spline teeth 64. The plurality of internal spline teeth 64 includes a plurality of internal-spline driving surfaces 66 to receive the driving rotational force F1 from the bicycle hub assembly 12 (FIG. 6) during pedaling. The plurality of internal spline teeth 64 includes a plurality of internal-spline non-driving surfaces 68. The internal-spline driving surface 66 is contactable with the sprocket support body 28 to transmit the driving rotational force F1 from the sprocket SP1 to the sprocket support body 28 during pedaling. The internal-spline driving surface 66 faces in the driving rotational direction D11. The internal-spline driving surface 66 faces the external-spline driving surface 48 of the bicycle hub assembly 12 in a state where the bicycle rear sprocket assembly 14A is mounted to the bicycle hub assembly 12. The internal-spline non-driving surface 68 is provided on a reverse side of the internal-spline driving surface 66 in the circumferential direction D1. The internal-spline non-driving surface 68 faces in the reverse rotational direction D12 not to transmit the driving rotational force F1 from the sprocket SP1 to the sprocket support body 28 during pedaling. The internal-spline non-driving surface 68 faces the external-spline non-driving surface 50 of the bicycle hub assembly 12 in a state where the bicycle rear sprocket assembly 14A is mounted to the bicycle hub assembly 12.

The at least ten internal spline teeth 64 respectively have circumferential maximum widths MW2. The internal spline teeth 64 respectively have circumferential maximum widths MW2. The circumferential maximum width MW2 is defined as a maximum width to receive a thrust force F3 applied to the internal spline tooth 64. The circumferential maximum width MW2 is defined as a straight distance based on the internal-spline driving surface 66.

The internal-spline driving surface 66 includes a radially outermost edge 66A and a radially innermost edge 66B. The internal-spline driving surface 66 extends from the radially outermost edge 66A to the radially innermost edge 66B. A second reference circle RC21 is defined on the radially outermost edge 66A and is centered at the rotational center axis A1. The second reference circle RC21 intersects with the internal-spline non-driving surface 68 at a reference point 68R. The circumferential maximum width MW2 extends straight from the radially innermost edge 66B to the reference point 68R in the circumferential direction D1.

The internal-spline non-driving surface 68 includes a radially outermost edge 68A and a radially innermost edge 68B. The internal-spline non-driving surface 68 extends from the radially outermost edge 68A to the radially innermost edge 68B. The reference point 68R is provided between the radially outermost edge 68A and the radially innermost edge 68B.

A total of the circumferential maximum widths MW2 is equal to or larger than 40 mm. The total of the circumferential maximum widths MW2 is equal to or larger than 45 mm. The total of the circumferential maximum widths MW2 is equal to or larger than 50 mm. In this embodiment, the total of the circumferential maximum widths MW2 is 50.8 mm. However, the total of the circumferential maximum widths MW2 is not limited to this embodiment.

Figure 26:
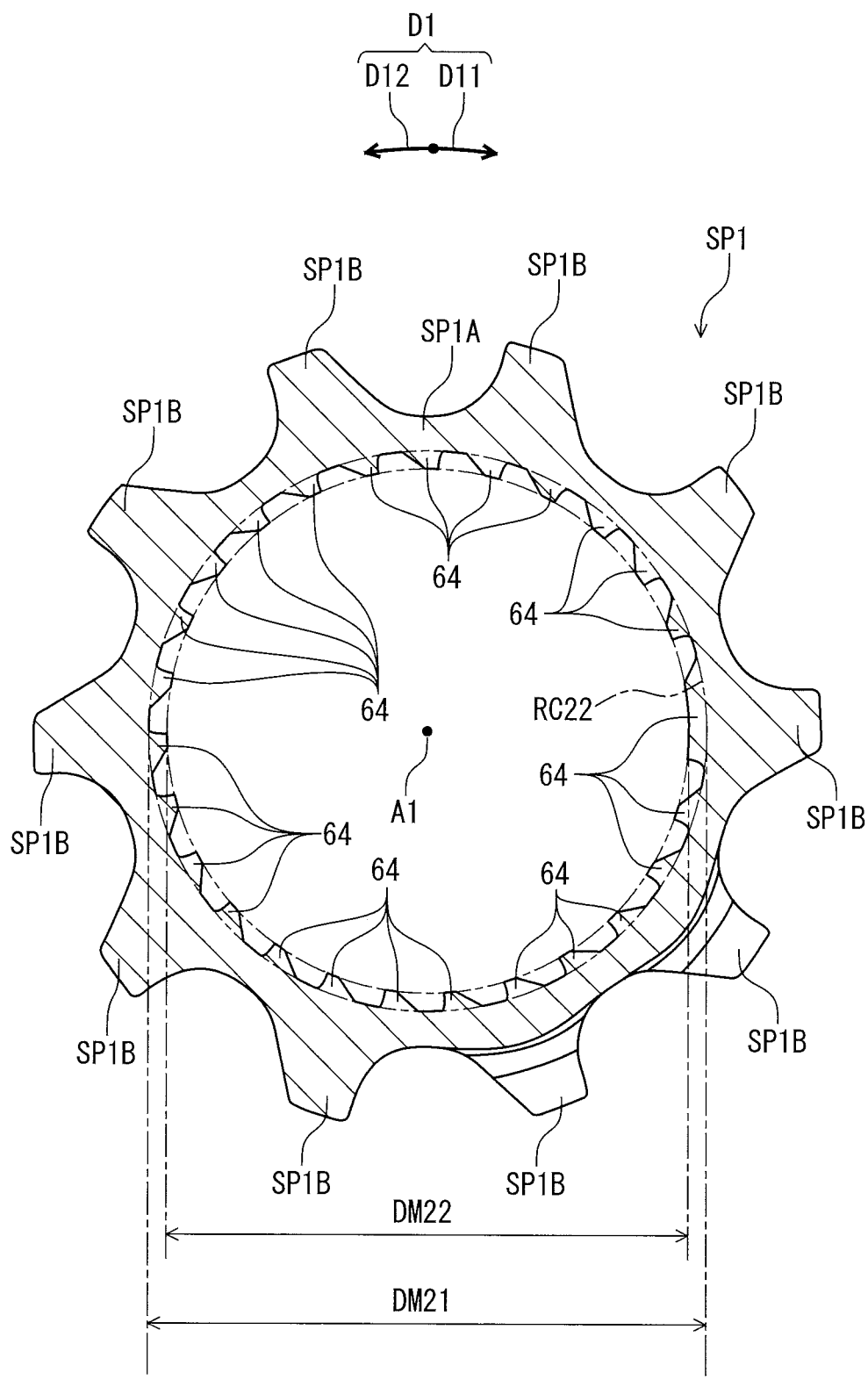
FIG. 26 is a cross-sectional view of the smallest sprocket illustrated in FIG. 21.

As seen in FIG. 26, the at least one internal spline tooth 64 has an internal-spline minor diameter DM21. The at least one internal spline tooth 64 has an internal-spline root circle RC22 having the internal-spline minor diameter DM21. However, the internal-spline root circle RC22 can have another diameter different from the internal-spline minor diameter DM21. The internal-spline minor diameter DM21 is equal to or smaller than 30 mm. The internal-spline minor diameter DM21 is equal to or larger than 25 mm. The internal-spline minor diameter DM21 is equal to or larger than 29 mm. In this embodiment, the internal-spline minor diameter DM21 is 29.8 mm. However, the internal-spline minor diameter DM21 is not limited to this embodiment and the above ranges.

The at least one internal spline tooth 64 has an internal-spline major diameter DM22 equal to or smaller than 28 mm. The internal-spline major diameter DM22 is equal to or larger than 25 mm. The internal-spline major diameter DM22 is equal to or larger than 27 mm. In this embodiment, the internal-spline major diameter DM22 is 27.7 mm. However, the internal-spline major diameter DM22 is not limited to this embodiment and the above ranges.

As seen in FIG. 25, the plurality of internal-spline driving surface 66 includes the radially outermost edge 66A and the radially innermost edge 66B. The plurality of internal-spline driving surfaces 66 each includes a radial length RL21 defined from the radially outermost edge 66A to the radially innermost edge 66B. A total of the radial lengths RL21 of the plurality of internal-spline driving surfaces 66 is equal to or larger than 7 mm. The total of the radial lengths RL21 is equal to or larger than 10 mm. The total of the radial lengths RL21 is equal to or larger than 15 mm. In this embodiment, the total of the radial lengths RL21 is 19.5 mm. However, the total of the radial lengths RL21 is not limited to this embodiment and the above ranges.

The plurality of internal spline tooth 64 has an additional radial length RL22. The additional radial lengths RL22 are respectively defined from the internal-spline root circle RC22 to radially innermost ends 64A of the plurality of internal spline teeth 64. A total of the additional radial lengths RL22 is equal to or larger than 12 mm. In this embodiment, the total of the additional radial lengths RL22 is 27.95 mm. However, the total of the additional radial lengths RL22 is not limited to this embodiment and the above ranges.

At least one of the internal spline tooth 64 has an asymmetric shape with respect to a circumferential tooth-tip center line CL2. The circumferential tooth-tip center line CL2 is a line connecting the rotational center axis A1 and a circumferential center point CP2 of the radially innermost end 64A of the internal spline tooth 64. However, at least one of the internal spline teeth 64 can have a symmetric shape with respect to the circumferential tooth-tip center line CL2. The at least one of the internal spline tooth 64 comprises the internal-spline driving surface 66 and the internal-spline non-driving surface 68.

The internal-spline driving surface 66 has a first internal-spline-surface angle AG21. The first internal-spline-surface angle AG21 is defined between the internal-spline driving surface 66 and a first radial line L21. The first radial line L21 extends from the rotational center axis A1 of the bicycle rear sprocket assembly 14A to the radially outermost edge 66A of the internal-spline driving surface 66. The first internal pitch angle PA21 or the second internal pitch angle PA22 is defined between the first radial lines L21 (see, e.g., FIG. 23).

The internal-spline non-driving surface 68 has a second internal-spline-surface angle AG22. The second internal-spline-surface angle AG22 is defined between the internal-spline non-driving surface 68 and a second radial line L22. The second radial line L22 extends from the rotational center axis A1 of the sprocket assembly to the radially outermost edge 68A of the internal-spline non-driving surface 68.

In this embodiment, the second internal-spline-surface angle AG22 is different from the first internal-spline-surface angle AG21. The first internal-spline-surface angle AG21 is smaller than the second internal-spline-surface angle AG22. However, the first internal-spline-surface angle AG21 can be equal to or larger than the second internal-spline-surface angle AG22.

The first internal-spline-surface angle AG21 ranges from 0 degree to 10 degrees. The second internal-spline-surface angle AG22 ranges from 0 degree to 60 degrees. In this embodiment, the first internal-spline-surface angle AG21 is 5 degrees. The second internal-spline-surface angle AG22 is 45 degrees. However, the first internal-spline-surface angle AG21 and the second internal-spline-surface angle AG22 are not limited to this embodiment and the above ranges.

Figure 27:
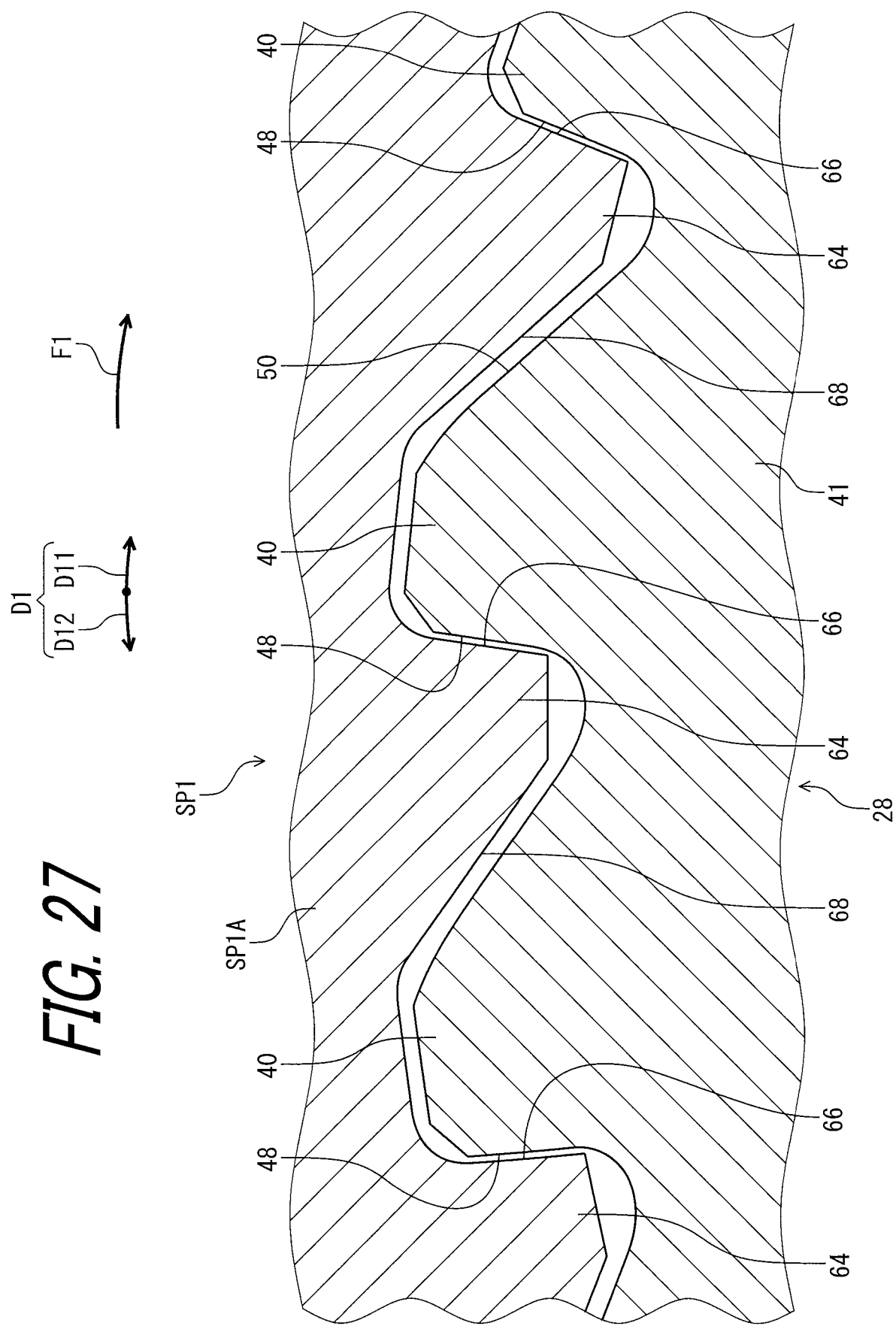
FIG. 27 is a cross-sectional view of the sprocket support body and the smallest sprocket of the bicycle drive train illustrated in FIG. 3.

As seen in FIG. 27, the internal spline teeth 64 mesh with the external spline teeth 40 to transmit the driving rotational force F1 from the sprocket SP1 to the sprocket support body 28. The internal-spline driving surface 66 is contactable with the external-spline driving surface 48 to transmit the driving rotational force F1 from the sprocket SP1 to the sprocket support body 28. The internal-spline non-driving surface 68 is spaced apart from the external-spline non-driving surface 50 in a state where the internal-spline driving surface 66 is in contact with the external-spline driving surface 48.

Figure 28:
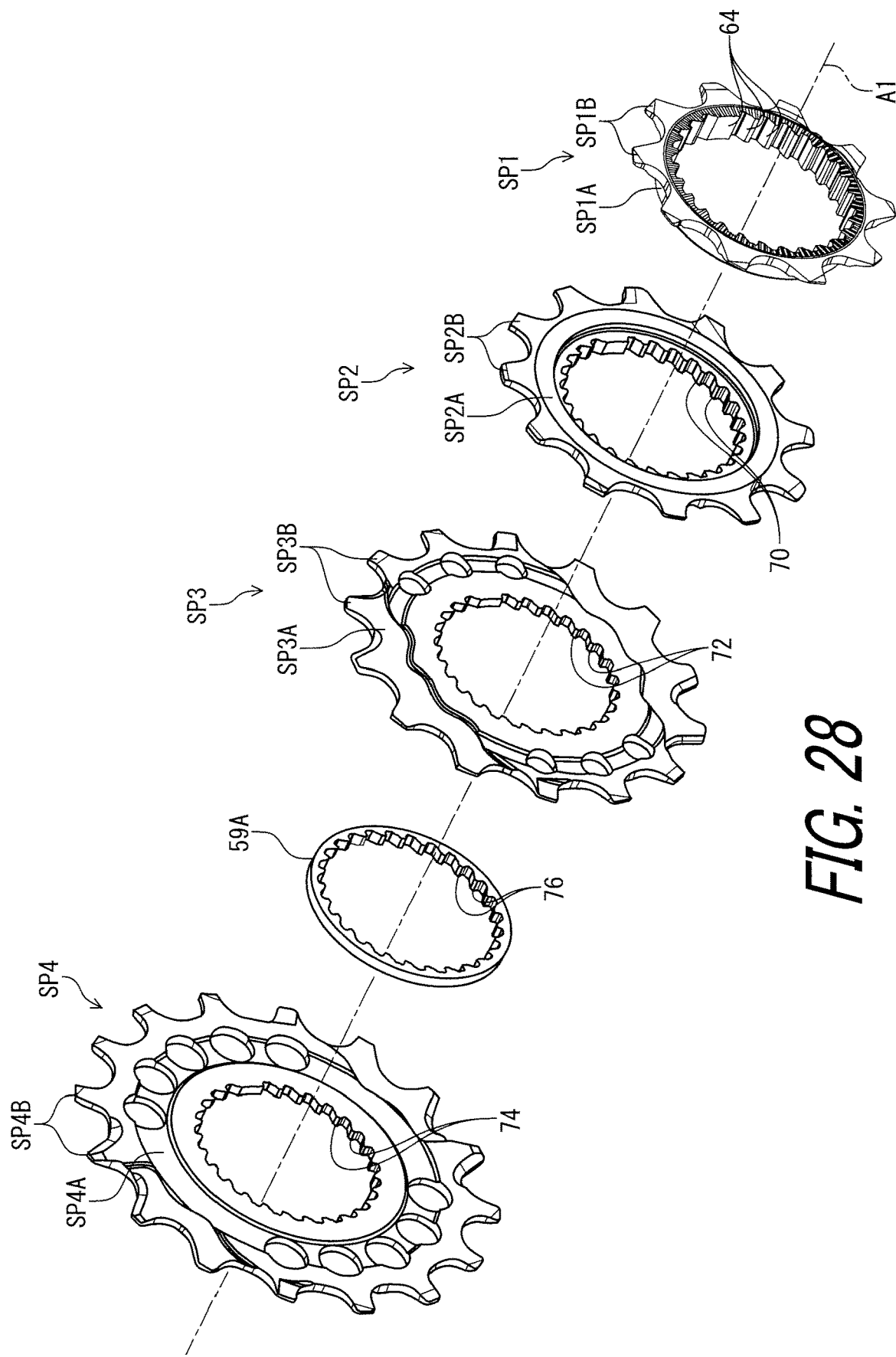
FIG. 28 is a partial exploded perspective view of the bicycle rear sprocket assembly illustrated in FIG. 14.
Figure 29:
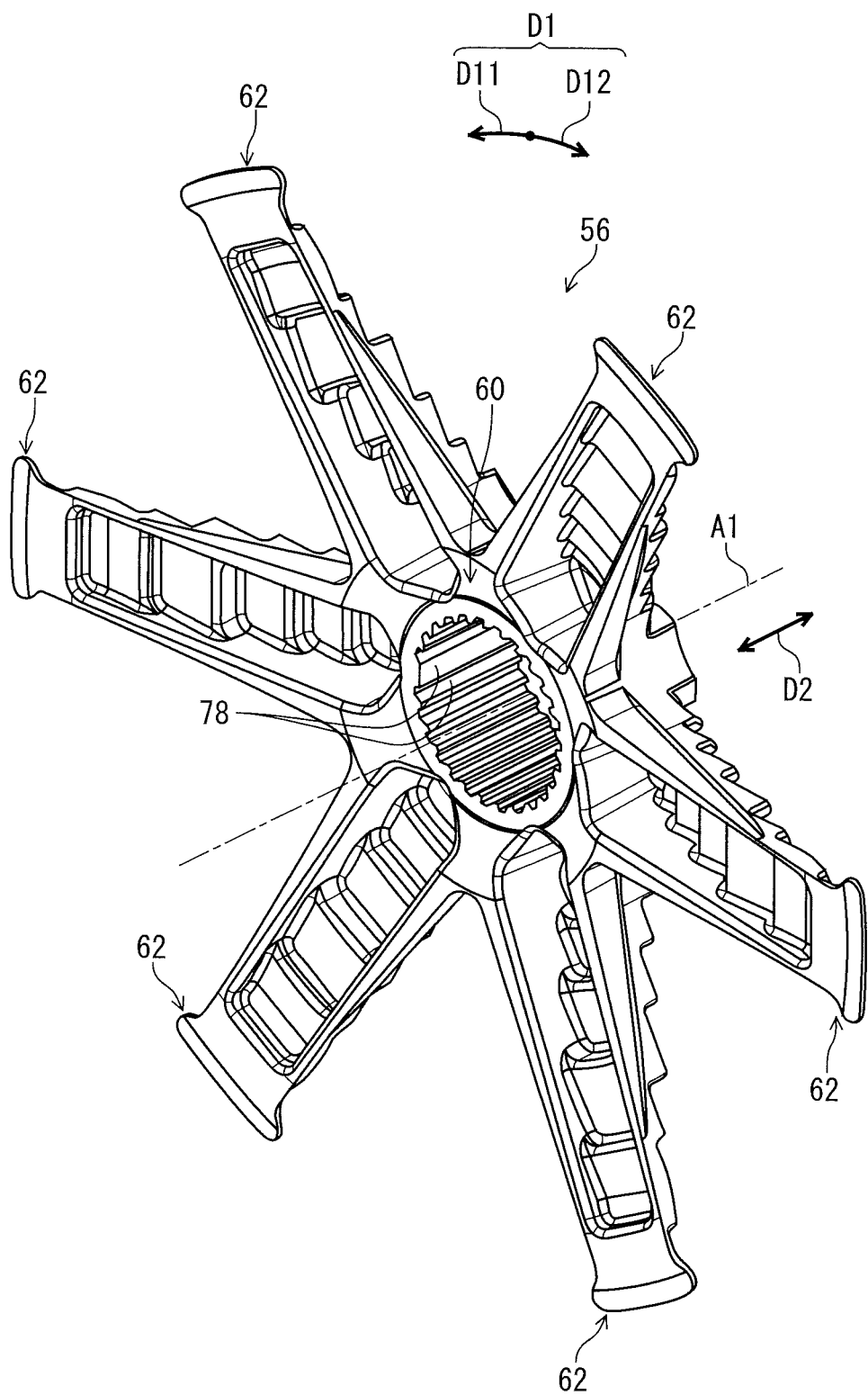
FIG. 29 is a perspective view of a sprocket support of the bicycle rear sprocket assembly illustrated in FIG. 14.

As seen in FIG. 28, the sprocket SP2 includes a plurality of internal spline teeth 70. The sprocket SP3 includes a plurality of internal spline teeth 72. The sprocket SP4 includes a plurality of internal spline teeth 74. The first ring 59A includes a plurality of internal spline teeth 76. As seen in FIG. 29, the hub engagement part 60 of the sprocket support 56 includes a plurality of internal spline teeth 78. The plurality of internal spline teeth 70 has substantially the same structure as that of the plurality of internal spline teeth 64. The plurality of internal spline teeth 72 has substantially the same structure as that of the plurality of internal spline teeth 64. The plurality of internal spline teeth 74 has substantially the same structure as that of the plurality of internal spline teeth 64. The plurality of internal spline teeth 76 has substantially the same structure as that of the plurality of internal spline teeth 64. The plurality of internal spline teeth 78 has substantially the same structure as that of the plurality of internal spline teeth 64. Thus, they will not be described in detail here for the sake of brevity.

Figure 30:
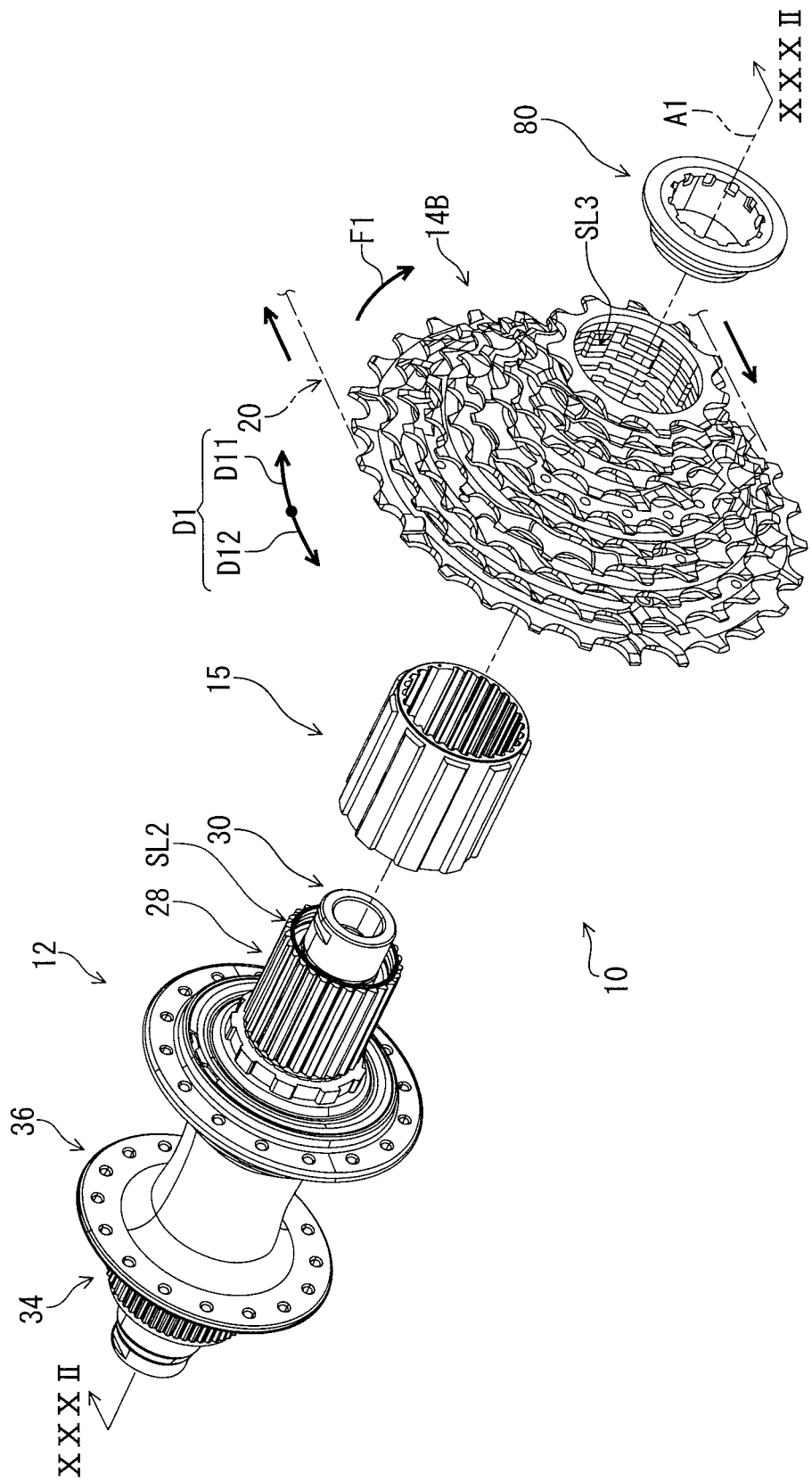
FIG. 30 is an exploded perspective view of the bicycle hub assembly, the bicycle rear sprocket assembly, and the bicycle rear sprocket adapter of the bicycle drive train illustrated in FIG. 1.

As seen in FIG. 30, the bicycle rear sprocket assembly 14B is mounted on the sprocket support body 28 using the bicycle rear sprocket adapter 15 to transmit the driving rotational force F1 between the sprocket support body 28 and the bicycle rear sprocket assembly 14B. The bicycle hub assembly 12 comprises a lock ring 80. The lock ring 80 is secured to the sprocket support body 28 to hold the bicycle rear sprocket assembly 14B relative to the sprocket support body 28 in the axial direction D2. As seen in FIG. 2, the lock ring 80 has a shape different from a shape of the lock ring 32. However, the lock ring 80 can have the same shape as that of the lock ring 32.

Figure 31:
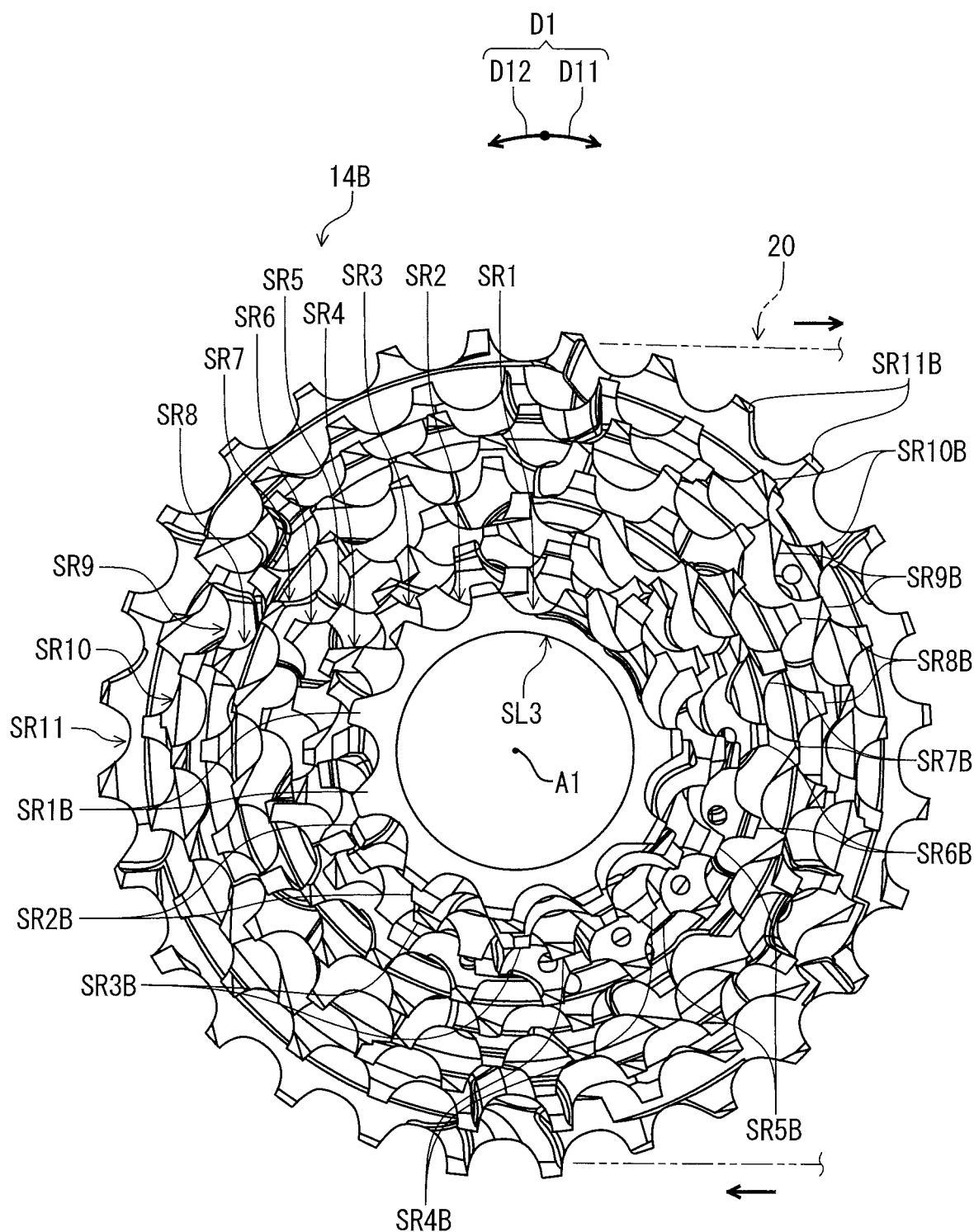
FIG. 31 is a side elevational view of the bicycle rear sprocket assembly of the bicycle drive train illustrated in FIG. 30.

As seen in FIG. 31, the bicycle rear sprocket assembly 14B comprises at least one sprocket. The at least one sprocket includes a smallest sprocket SR1 and a largest sprocket SR11. The smallest sprocket SR1 can also be referred to as a sprocket SR1. The largest sprocket SR11 can also be referred to as a sprocket SR11. In this embodiment, the at least one sprocket further includes sprockets SR2 to SR10. The sprocket SR1 corresponds to top gear. The sprocket SR11 corresponds to low gear. A total number of the sprockets of the bicycle rear sprocket assembly 14B is not limited to this embodiment.

The smallest sprocket SR1 includes at least one sprocket tooth SR1B. A total number of the at least one sprocket tooth SR1B of the smallest sprocket SR1 is 11. However, the total number of the at least one sprocket tooth SR1B of the smallest sprocket SR1 is not limited to this embodiment.

The largest sprocket SR11 includes at least one sprocket tooth SR11B. A total number of the at least one sprocket tooth SR11B of the largest sprocket SR11 is 28. However, the total number of the at least one sprocket tooth SR11B of the largest sprocket SR11 is not limited to this embodiment.

The sprocket SR2 includes at least one sprocket tooth SR2B. The sprocket SR3 includes at least one sprocket tooth SR3B. The sprocket SR4 includes at least one sprocket tooth SR4B. The sprocket SR5 includes at least one sprocket tooth SR5B. The sprocket SR6 includes at least one sprocket tooth SR6B. The sprocket SR7 includes at least one sprocket tooth SR7B. The sprocket SR8 includes at least one sprocket tooth SR8B. The sprocket SR9 includes at least one sprocket tooth SR9B. The sprocket SR10 includes at least one sprocket tooth SR10B. The sprocket SR11 includes at least one sprocket tooth SR11B.

A total number of the at least one sprocket tooth SR2B is 12. A total number of the at least one sprocket tooth SR3B is 13. A total number of the at least one sprocket tooth SR4B is 14. A total number of the at least one sprocket tooth SR5B is 15. A total number of the at least one sprocket tooth SR6B is 17. A total number of the at least one sprocket tooth SR7B is 19. A total number of the at least one sprocket tooth SR8B is 21. A total number of the at least one sprocket tooth SR9B is 23. A total number of the at least one sprocket tooth SR10B is 25. The total number of the sprocket teeth of each of the sprockets SR2 to SR10 is not limited to this embodiment.

Figure 32:
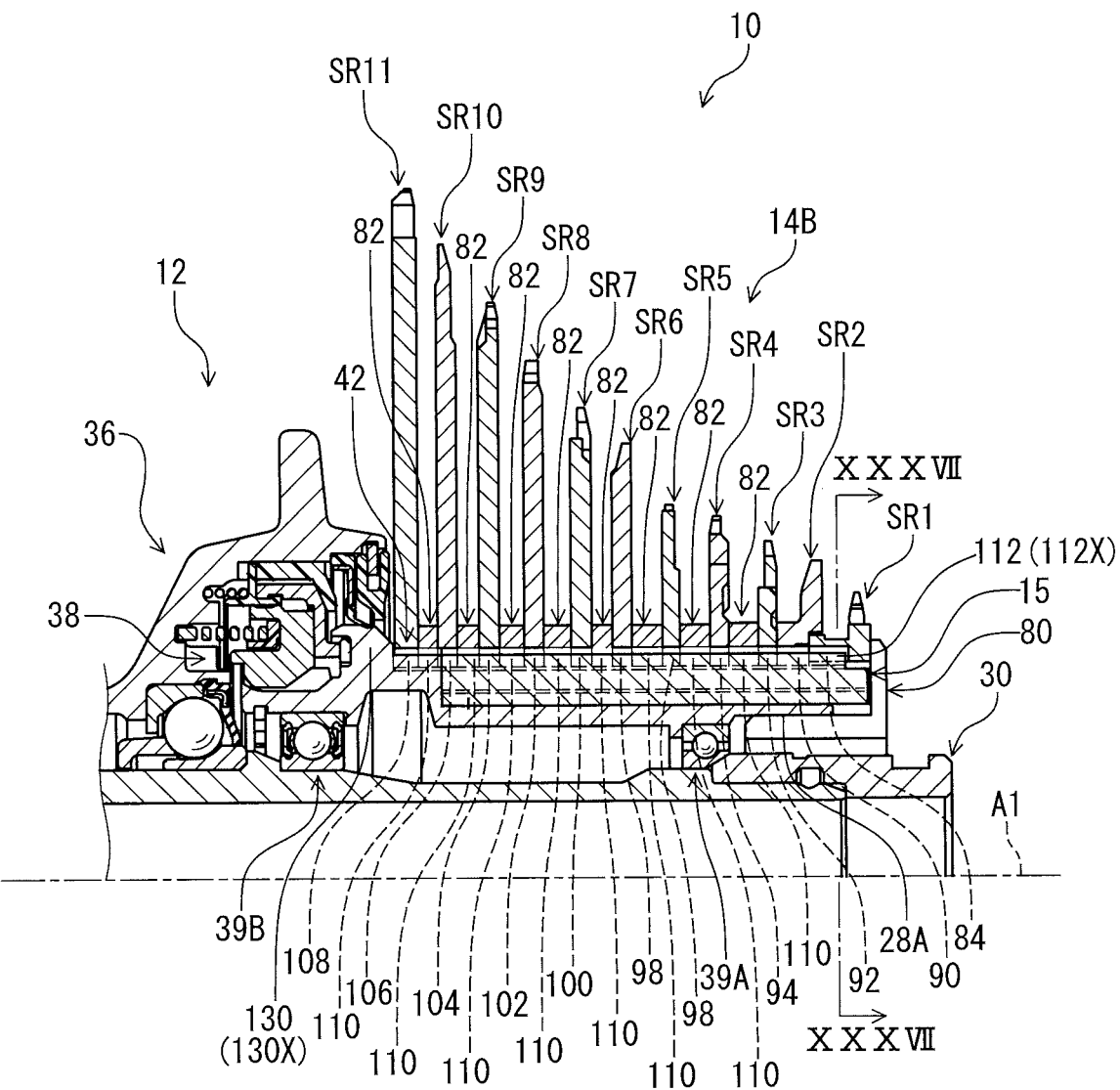
FIG. 32 is a cross-sectional view of the bicycle drive train taken along line XXXII-XXXII of FIG. 30.

As seen in FIG. 32, the sprockets SR1 to SR11 are separate members from each other. However, at least one of the sprockets SR1 to SR11 can be at least partly provided integrally with another of the sprockets SR1 to SR11. The bicycle rear sprocket assembly 14B comprises a plurality of spacers 82. For example, the sprockets SR1 to SR11 and the plurality of spacers 82 are attached to each other with an adhesive agent.

In this embodiment, each of the sprockets SR1 to SR11 is made of a metallic material such as aluminum, iron, or titanium. Each of the plurality of spacers 82 is made of a non-metallic material such as a resin material. However, at least one of the sprockets SR1 to SR11 can be at least partly made of a non-metallic material. At least one of the plurality of spacers 82 can be at least partly made of a metallic material such as aluminum, iron, or titanium.

Figure 33:
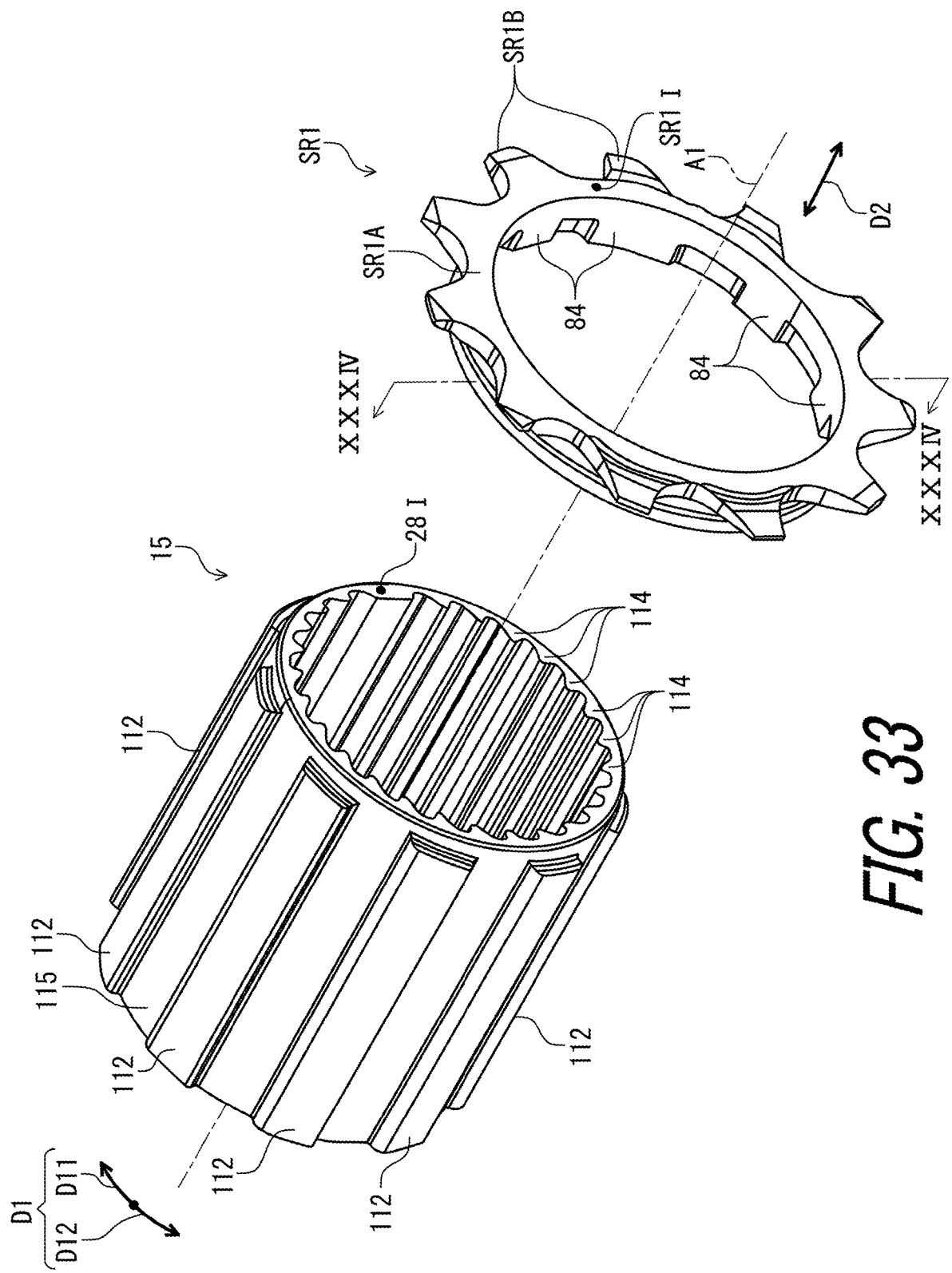
FIG. 33 is an exploded perspective view of the bicycle rear sprocket adapter and a sprocket of the bicycle rear sprocket assembly of the bicycle drive train illustrated in FIG. 30.

At least one of the sprockets SR1 to SR11 includes at least one internal spline tooth configured to engage with the bicycle rear sprocket adapter 15. In this embodiment, as seen in FIG. 33, the sprocket SR1 includes at least one internal spline tooth 84 configured to engage with the bicycle rear sprocket adapter 15. In this embodiment, the sprocket SR1 includes the internal spline teeth 84 configured to engage with the bicycle rear sprocket adapter 15. The sprocket SR1 includes a sprocket body SR1A having an annular shape. The sprocket teeth SR1B extend radially outwardly from the sprocket body SR1A. The internal spline teeth 84 extend radially inwardly from the sprocket body SR1A.

Figure 34:
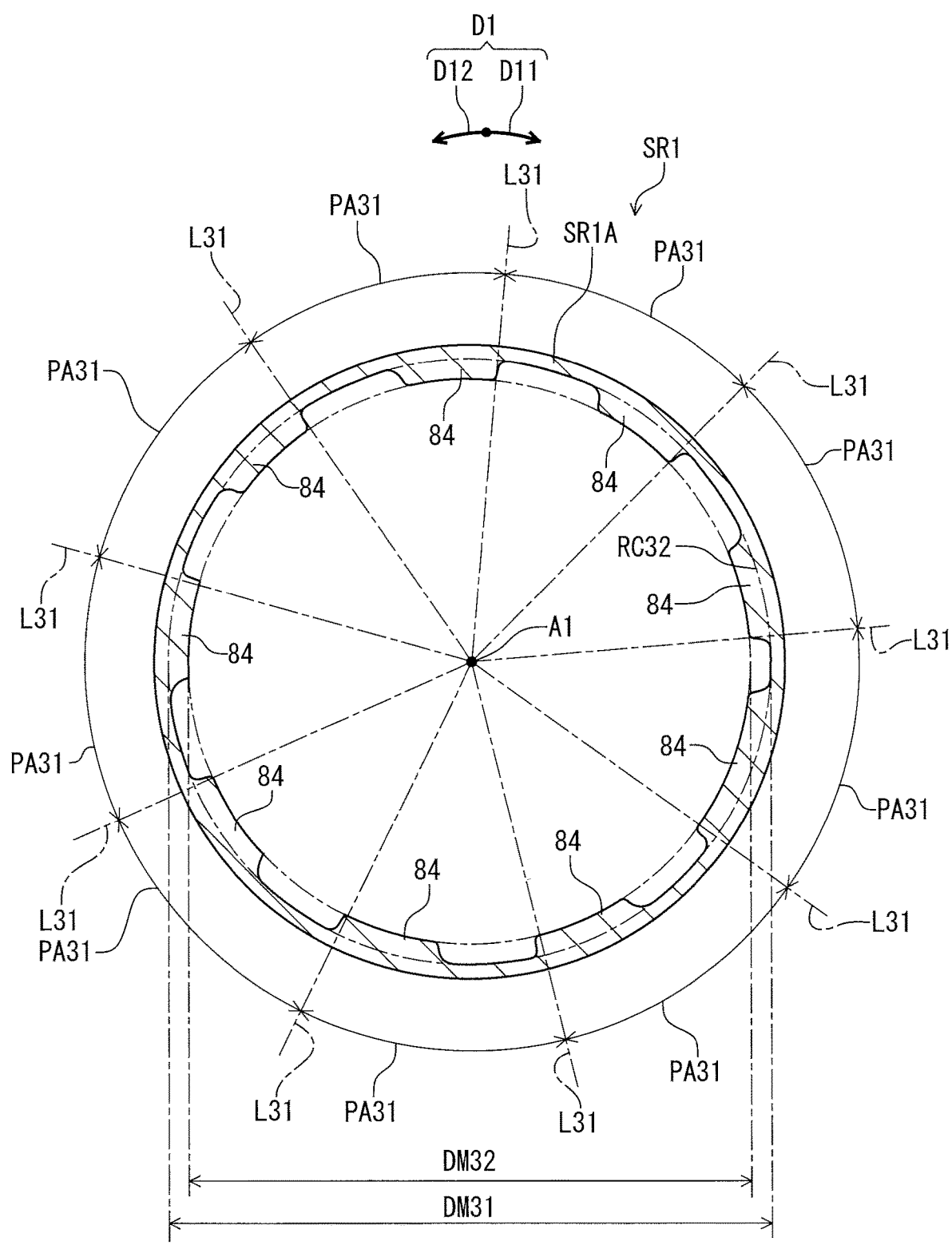
FIG. 34 is a cross-sectional view of the sprocket taken along line XXXIV-XXXIV of FIG. 33.

As seen in FIG. 34, a total number of the internal spline teeth 84 is equal to or smaller than nine. In this embodiment, the total number of the internal spline teeth 84 is nine. However, the total number of the internal spline teeth 84 is not limited to this embodiment and the above range.

The plurality of internal spline teeth 84 have an internal pitch angle PA31. The plurality of internal spline teeth 84 is circumferentially arranged at the internal pitch angle PA31 with respect to the rotational center axis A1 of the bicycle rear sprocket assembly 14B. However, at least one of the internal pitch angles PA31 can be different from another of the internal pitch angles PA31.

The internal pitch angle PA31 ranges from 30 degrees to 50 degrees. The internal pitch angle PA31 ranges from 35 degrees to 45 degrees. In this embodiment, the internal pitch angle PA31 is 40 degrees. However, the internal pitch angle PA31 is not limited to this embodiment and the above ranges.

Figure 35:
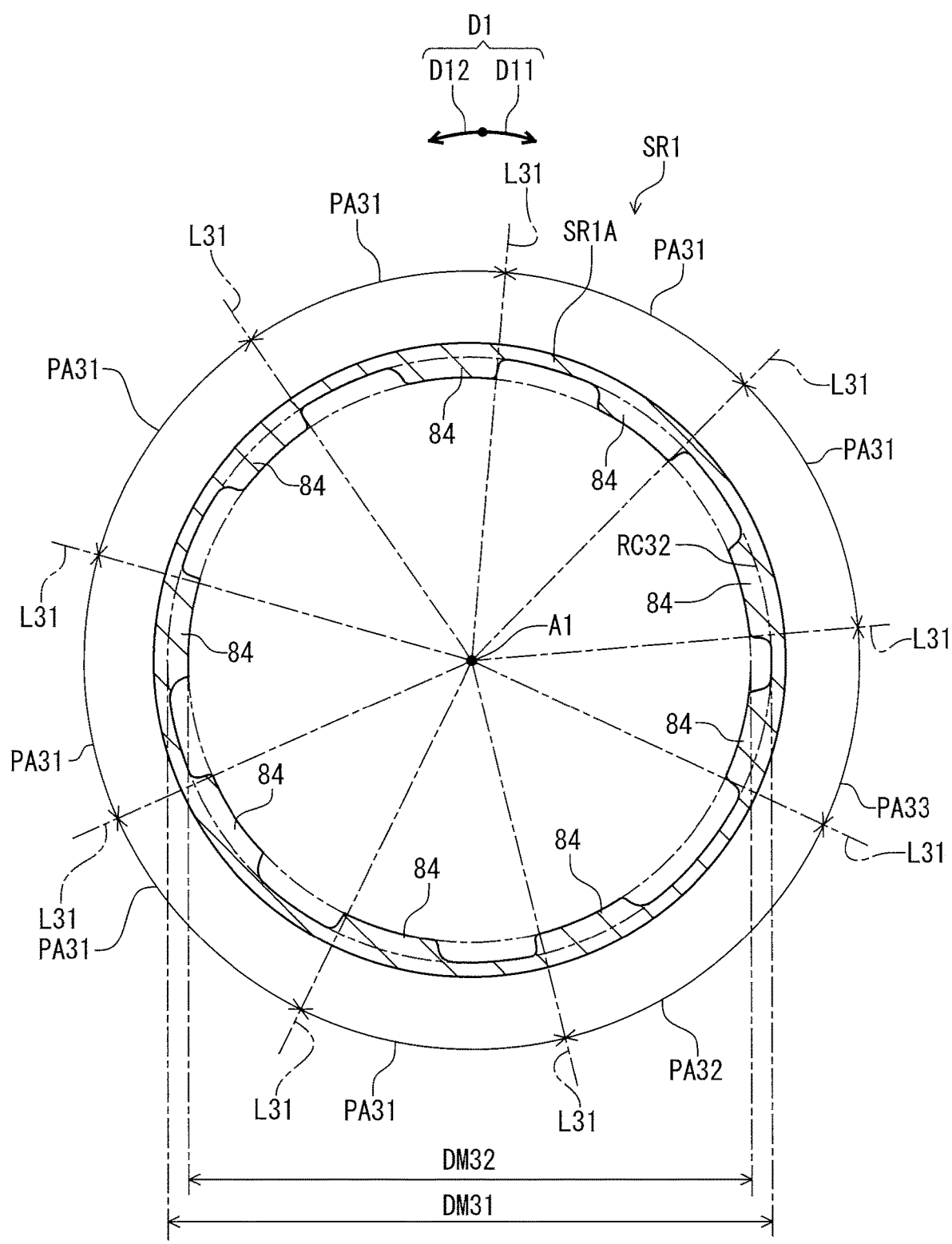
FIG. 35 is a cross-sectional view of the sprocket in accordance with a modification.

At least one of the internal spline teeth 84 has a first spline shape different from a second spline shape of another of the internal spline teeth 84. At least one of the internal spline teeth 84 has a first spline size different from a second spline size of another of the internal spline teeth 84. At least one of the internal spline teeth 84 has a cross-sectional shape different from a cross-sectional shape of another of the internal spline teeth 84. As seen in FIG. 35, however, the internal spline teeth 84 can have the same shape as each other. The internal spline teeth 84 can have the same size as each other. The internal spline teeth 84 can have the same cross-sectional shape as each other. In such a modification, two internal spline teeth of the plurality of internal spline teeth 84 are circumferentially arranged at an additional internal pitch angle PA32 with respect to the rotational center axis A1 of the bicycle rear sprocket assembly 14B. Furthermore, two internal spline teeth of the plurality of internal spline teeth 84 are circumferentially arranged at an additional internal pitch angle PA33 with respect to the rotational center axis A1 of the bicycle rear sprocket assembly 14B.

Figure 36:
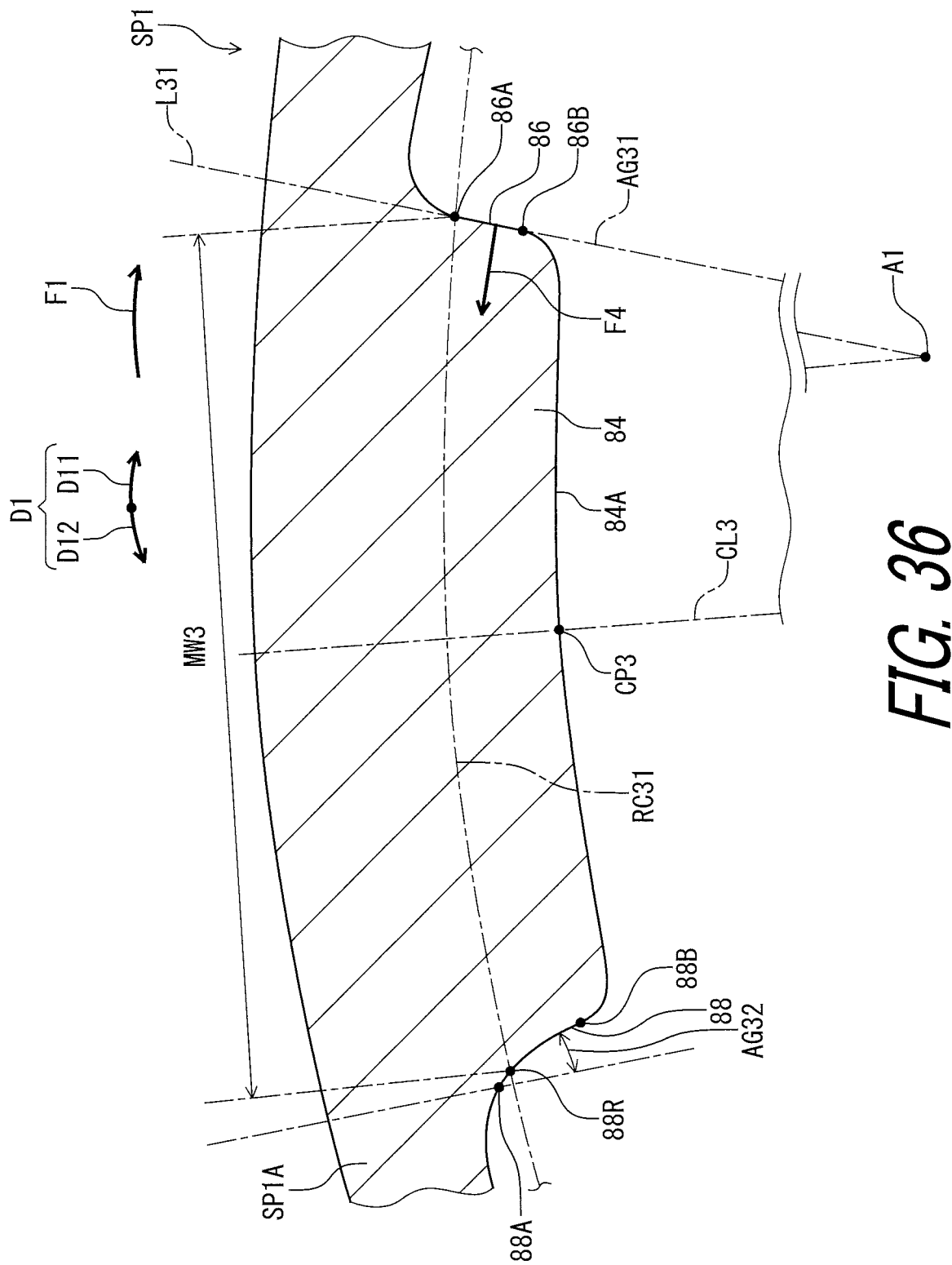
FIG. 36 is an enlarged cross-sectional view of the sprocket illustrated in FIG. 34.

As seen in FIG. 36, the internal spline tooth 84 comprises an internal-spline driving surface 86 and an internal-spline non-driving surface 88. The at least one internal spline tooth 84 includes a plurality of internal spline teeth 84. The plurality of internal spline teeth 84 includes a plurality of internal-spline driving surfaces 86 to transmit the driving rotational force F1 from the sprocket SR1 to the bicycle rear sprocket adapter 15 during pedaling. The plurality of internal spline teeth 84 includes a plurality of internal-spline non-driving surfaces 88. The internal-spline driving surface 86 is contactable with the bicycle rear sprocket adapter 15 to transmit the driving rotational force F1 from the sprocket SR1 to the bicycle rear sprocket adapter 15 during pedaling. The internal-spline driving surface 86 faces in the driving rotational direction D11. The internal-spline non-driving surface 88 is provided on a reverse side of the internal-spline driving surface 86 in the circumferential direction D1. The internal-spline non-driving surface 88 faces in the reverse rotational direction D12 not to transmit the driving rotational force F1 from the sprocket SR1 to the bicycle rear sprocket adapter 15 during pedaling.

As seen in FIG. 36, the internal spline teeth 84 respectively have circumferential maximum widths MW3. The internal spline teeth 84 respectively have circumferential maximum widths MW3. The circumferential maximum width MW3 is defined as a maximum width to receive a thrust force F4 applied to the internal spline tooth 84. The circumferential maximum width MW3 is defined as a straight distance based on the internal-spline driving surface 86.

The internal-spline driving surface 86 includes a radially outermost edge 86A and a radially innermost edge 86B. The internal-spline driving surface 86 extends from the radially outermost edge 86A to the radially innermost edge 86B. A reference circle RC31 is defined on the radially outermost edge 86A and is centered at the rotational center axis A1. The reference circle RC31 intersects with the internal-spline non-driving surface 88 at a reference point 88R. The circumferential maximum width MW3 extends straight from the radially innermost edge 86B to the reference point 88R in the circumferential direction D1.

The internal-spline non-driving surface 88 includes a radially outermost edge 88A and a radially innermost edge 88B. The internal-spline non-driving surface 88 extends from the radially outermost edge 88A to the radially innermost edge 88B. The reference point 88R is provided between the radially outermost edge 88A and the radially innermost edge 88B.

As seen in FIG. 34, the at least one internal spline tooth 84 has an internal-spline minor diameter DM31. The at least one internal spline tooth 84 has an internal-spline root circle RC32 having the internal-spline minor diameter DM31. However, the internal-spline root circle RC32 can have another diameter different from the internal-spline minor diameter DM31. The internal-spline minor diameter DM31 is equal to or smaller than 35 mm. The internal-spline minor diameter DM31 is equal to or larger than 34 mm. In this embodiment, the internal-spline minor diameter DM31 is 34.65 mm. However, the internal-spline minor diameter DM31 is not limited to this embodiment and the above ranges.

The at least one internal spline tooth 84 has an internal-spline major diameter DM32 equal to or smaller than 33 mm. The internal-spline major diameter DM32 is equal to or larger than 32 mm. In this embodiment, the internal-spline major diameter DM32 is 32.35 mm. However, the internal-spline major diameter DM32 is not limited to this embodiment and the above ranges.

As seen in FIG. 36, at least one of the internal spline tooth 84 has an asymmetric shape with respect to a circumferential tooth-tip center line CL3. The circumferential tooth-tip center line CL3 is a line connecting the rotational center axis A1 and a circumferential center point CP3 of radially innermost end 84A of the internal spline tooth 84. However, at least one of the internal spline teeth 84 can have a symmetric shape with respect to the circumferential tooth-tip center line CL3.

The internal-spline driving surface 86 has a first internal-spline-surface angle AG31. The first internal-spline-surface angle AG31 is defined between the internal-spline driving surface 86 and a first radial line L31. The first radial line L31 extends from the rotational center axis A1 of the bicycle rear sprocket assembly 14B to the radially outermost edge 86A of the internal-spline driving surface 86. The internal pitch angle PA31 is defined between the first radial lines L31 (see, e.g., FIG. 34).

The internal-spline non-driving surface 88 has a second internal-spline-surface angle AG32. The second internal-spline-surface angle AG32 is defined between the internal-spline non-driving surface 88 and a second radial line L32. The second radial line L32 extends from the rotational center axis A1 of the sprocket assembly to the radially outermost edge 88A of the internal-spline non-driving surface 88.

In this embodiment, the second internal-spline-surface angle AG32 is different from the first internal-spline-surface angle AG31. The first internal-spline-surface angle AG31 is smaller than the second internal-spline-surface angle AG32. However, the first internal-spline-surface angle AG31 can be equal to or larger than the second internal-spline-surface angle AG32.

The first internal-spline-surface angle AG31 ranges from 0 degree to 10 degrees. The second internal-spline-surface angle AG32 ranges from 0 degree to 10 degrees. In this embodiment, the first internal-spline-surface angle AG31 is 0 degree. The second internal-spline-surface angle AG32 is 5 degrees. However, the first internal-spline-surface angle AG31 and the second internal-spline-surface angle AG32 are not limited to this embodiment and the above ranges.

As seen in FIG. 32, the sprocket SR2 includes a plurality of internal spline teeth 90. The sprocket SR3 includes a plurality of internal spline teeth 92. The sprocket SR4 includes a plurality of internal spline teeth 94. The sprocket SR5 includes a plurality of internal spline teeth 96. The sprocket SR6 includes a plurality of internal spline teeth 98. The sprocket SR7 includes a plurality of internal spline teeth 100. The sprocket SR8 includes a plurality of internal spline teeth 102. The sprocket SR9 includes a plurality of internal spline teeth 104. The sprocket SR10 includes a plurality of internal spline teeth 106. The sprocket SR11 includes a plurality of internal spline teeth 108. The spacer 82 includes a plurality of internal spline teeth 110. The plurality of internal spline teeth 90 has substantially the same structure as that of the plurality of internal spline teeth 84. The plurality of internal spline teeth 92 has substantially the same structure as that of the plurality of internal spline teeth 84. The plurality of internal spline teeth 94 has substantially the same structure as that of the plurality of internal spline teeth 84. The plurality of internal spline teeth 96 has substantially the same structure as that of the plurality of internal spline teeth 84. The plurality of internal spline teeth 98 has substantially the same structure as that of the plurality of internal spline teeth 84. The plurality of internal spline teeth 100 has substantially the same structure as that of the plurality of internal spline teeth 84. The plurality of internal spline teeth 102 has substantially the same structure as that of the plurality of internal spline teeth 84. The plurality of internal spline teeth 104 has substantially the same structure as that of the plurality of internal spline teeth 84. The plurality of internal spline teeth 106 has substantially the same structure as that of the plurality of internal spline teeth 84. The plurality of internal spline teeth 108 has substantially the same structure as that of the plurality of internal spline teeth 84. The plurality of internal spline teeth 110 has substantially the same structure as that of the plurality of internal spline teeth 84. Thus, they will not be described in detail here for the sake of brevity.

Figure 37:
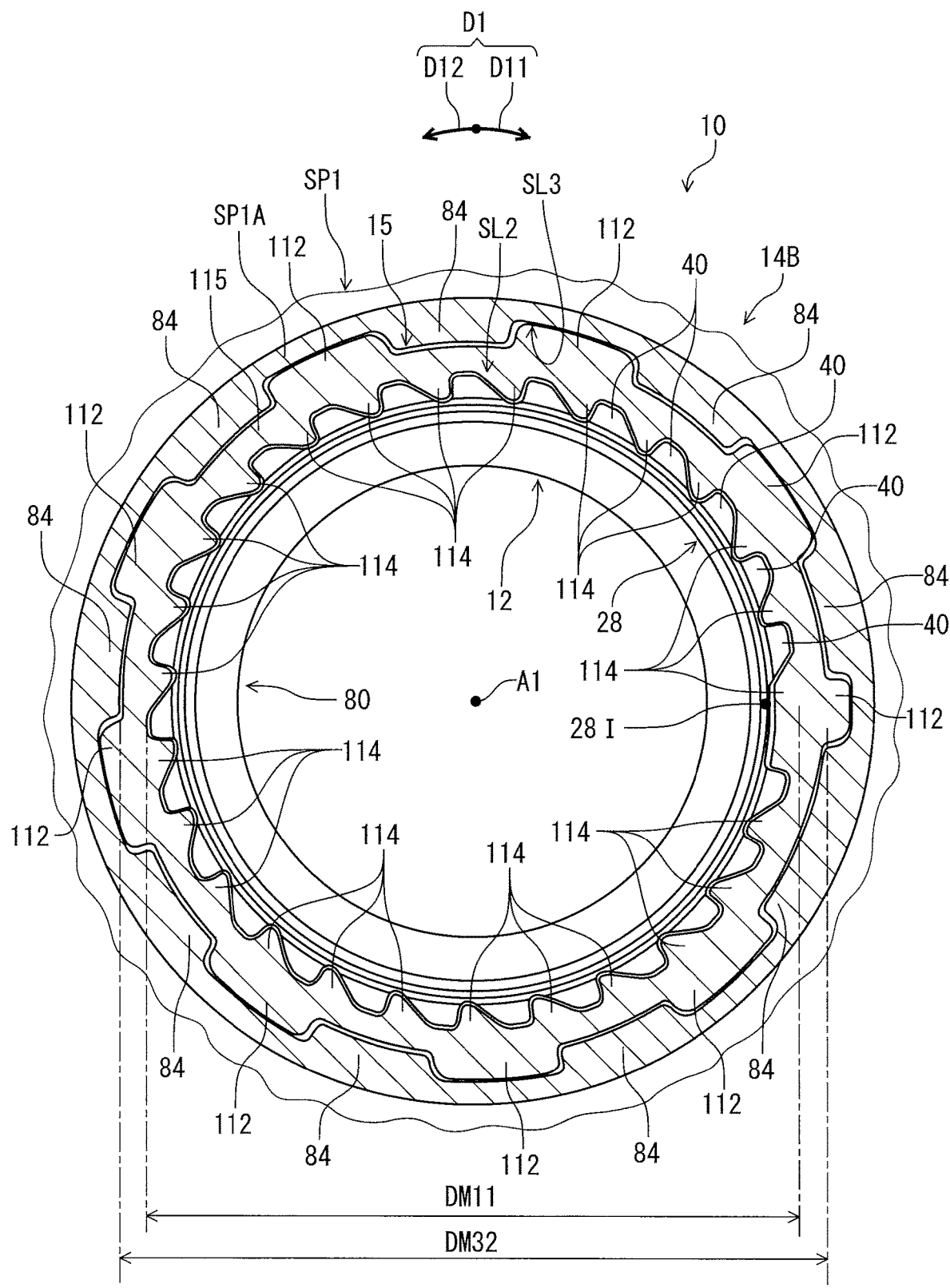
FIG. 37 is a cross-sectional view of the bicycle drive train taken along line XXXVII-XXXVII of FIG. 32.

As seen in FIG. 37, the internal spline SL3 of the bicycle rear sprocket assembly 14B has a cross-sectional shape which is not complementary to the cross-sectional shape of the external spline SL2 of the bicycle hub assembly 12. The internal-spline major diameter DM32 of the bicycle rear sprocket assembly 14B is larger than the external-spline major diameter DM11 of the sprocket support body 28 of the bicycle hub assembly 12. The bicycle rear sprocket adapter 15 is provided between the bicycle rear sprocket assembly 14B and the bicycle hub assembly 12. Specifically, the bicycle rear sprocket adapter 15 is provided between the bicycle rear sprocket assembly 14B and the sprocket support body 28.

Figure 38:
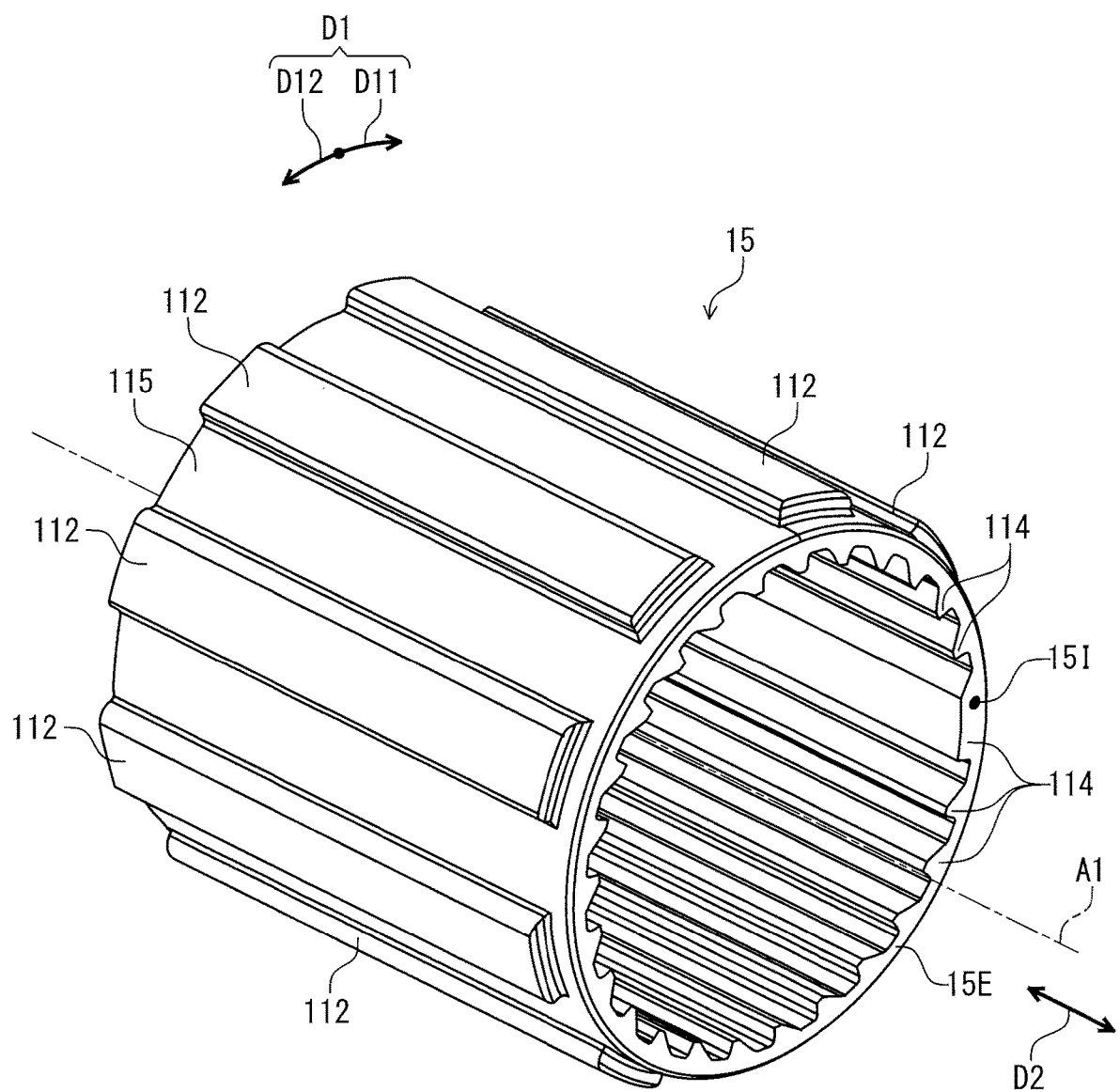
FIG. 38 is a perspective view of the bicycle rear sprocket adapter illustrated in FIG. 30.
Figure 39:
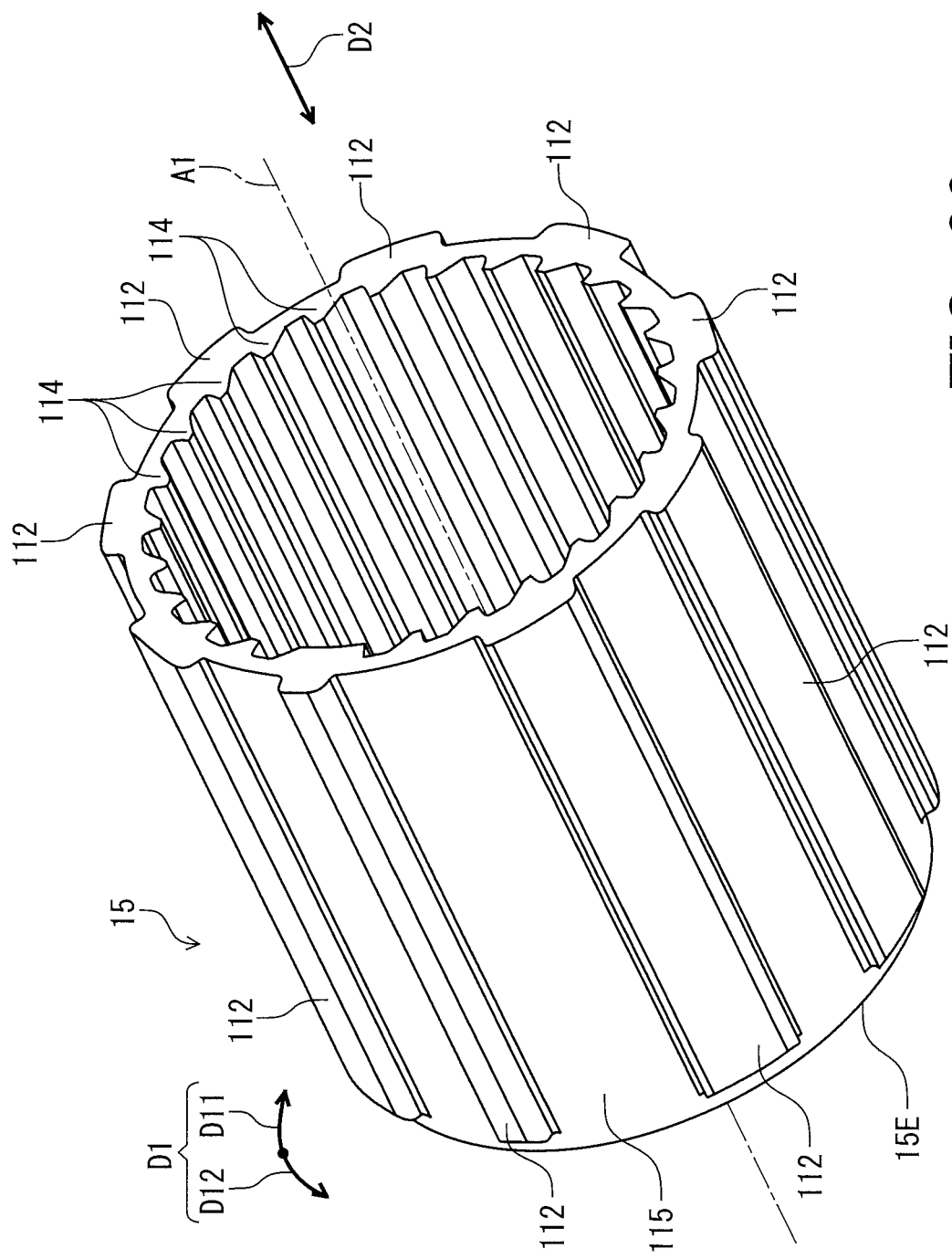
FIG. 39 is another perspective view of the bicycle rear sprocket adapter illustrated in FIG. 30.

As seen in FIGS. 38 and 39, the bicycle rear sprocket adapter 15 comprises a plurality of external spline teeth 112 and at least one internal spline tooth 114. The bicycle rear sprocket adapter 15 comprises the plurality of external spline teeth 112 and a plurality of internal spline teeth 114. Namely, the at least one internal spline tooth 114 includes a plurality of internal spline teeth 114. The plurality of internal spline teeth 114 is configured to engage with the bicycle hub assembly 12. The bicycle rear sprocket adapter 15 comprises an adapter body 115 having a tubular shape. The adapter body 115 extends along the rotational center axis A1. The plurality of external spline teeth 112 extends radially outwardly from the adapter body 115. The plurality of internal spline teeth 114 extends radially inwardly from the adapter body 115. As seen in FIG. 37, the plurality of external spline teeth 112 is configured to engage with the bicycle rear sprocket assembly 14B. At least one internal spline tooth 114 is configured to engage with the bicycle hub assembly 12.

Figure 40:
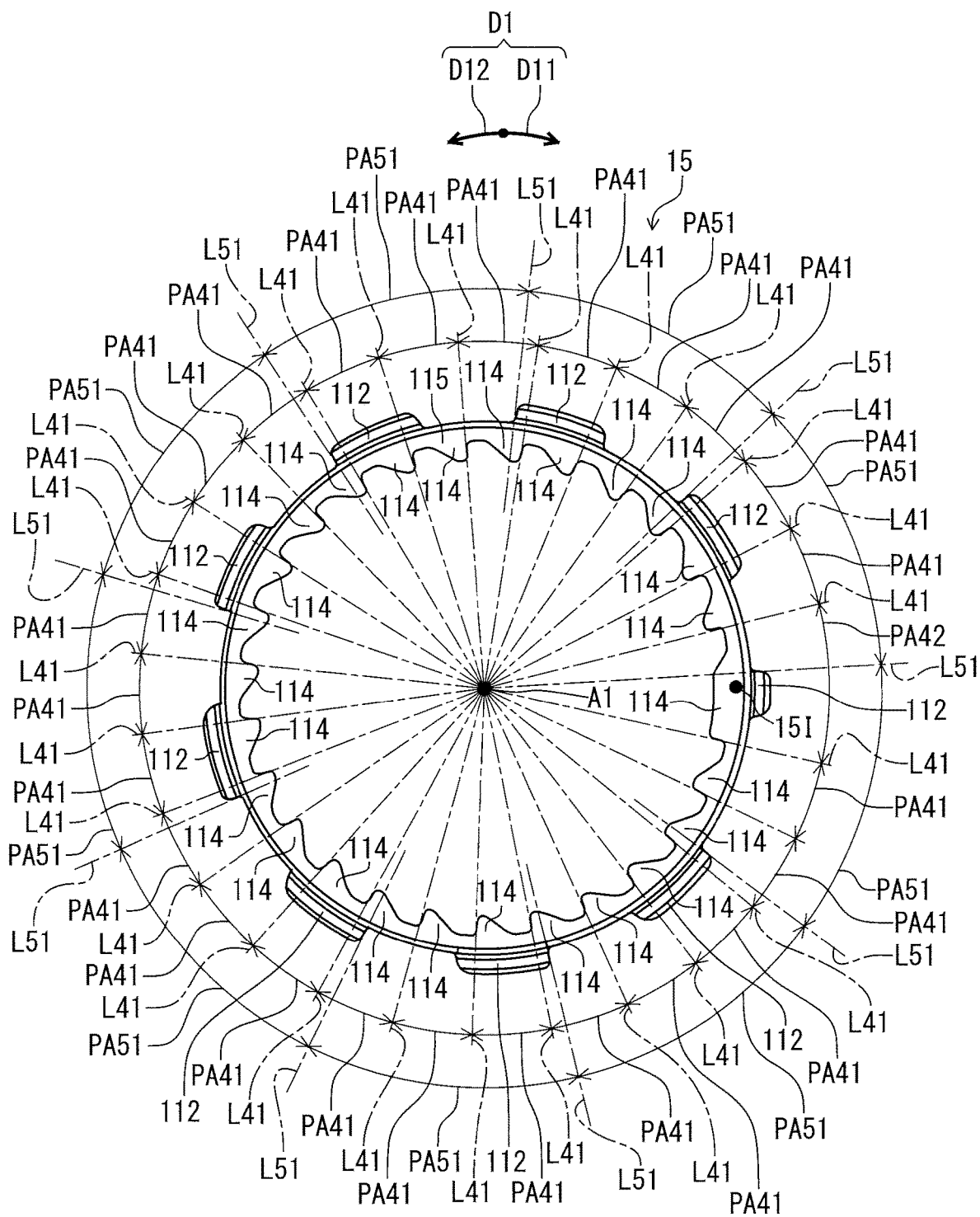
FIG. 40 is a side elevational view of the bicycle rear sprocket adapter illustrated in FIG. 30.

As seen in FIG. 40, a total number of the plurality of external spline teeth 112 is equal to the total number of the plurality of internal spline teeth 84 of the sprocket SR1. A total number of the plurality of external spline teeth 112 is equal to or smaller than nine. In this embodiment, the total number of the plurality of external spline teeth 112 is nine. However, the total number of the plurality of external spline teeth 112 is not limited to this embodiment and the above range.

A total number of the plurality of internal spline teeth 114 is equal to the total number of the plurality of external spline teeth 40 of the sprocket support body 28. The total number of the plurality of internal spline teeth 114 is equal to or larger than 20. The total number of the plurality of internal spline teeth 114 is equal to or larger than 25. In this embodiment, the total number of the plurality of internal spline teeth 114 is 26. However, the total number of the internal spline teeth 114 is not limited to this embodiment and the above ranges.

The plurality of internal spline teeth 114 has a first internal pitch angle PA41 and a second internal pitch angle PA42. At least two internal spline teeth of the plurality of internal spline teeth 114 are circumferentially arranged at the first internal pitch angle PA41 with respect to the rotational center axis A1 of the bicycle hub assembly 12. At least two internal spline teeth of the plurality of internal spline teeth 114 are circumferentially arranged at the second internal pitch angle PA42 with respect to the rotational center axis A1. The second internal pitch angle PA42 is different from the first internal pitch angle PA41. However, the second internal pitch angle PA42 can be substantially equal to the first internal pitch angle PA41.

In this embodiment, the internal spline teeth 114 are circumferentially arranged at the first internal pitch angle PA41 in the circumferential direction D1. Two internal spline teeth of the internal spline teeth 114 is arranged at the second internal pitch angle PA42 in the circumferential direction D1. However, at least two internal spline teeth of the internal spline teeth 114 can be arranged at another internal pitch angle in the circumferential direction D1.

The first internal pitch angle PA41 ranges from 10 degrees to 20 degrees. The first internal pitch angle PA41 ranges from 12 degrees to 15 degrees. The first internal pitch angle PA41 ranges from 13 degrees to 14 degrees. In this embodiment, the first internal pitch angle PA41 is 13.3 degrees. However, the first internal pitch angle PA41 is not limited to this embodiment and the above ranges.

The second internal pitch angle PA42 ranges from 5 degrees to 30 degrees. In this embodiment, the second internal pitch angle PA42 is 26 degrees. However, the second internal pitch angle PA42 is not limited to this embodiment and the above range.

Figure 41:
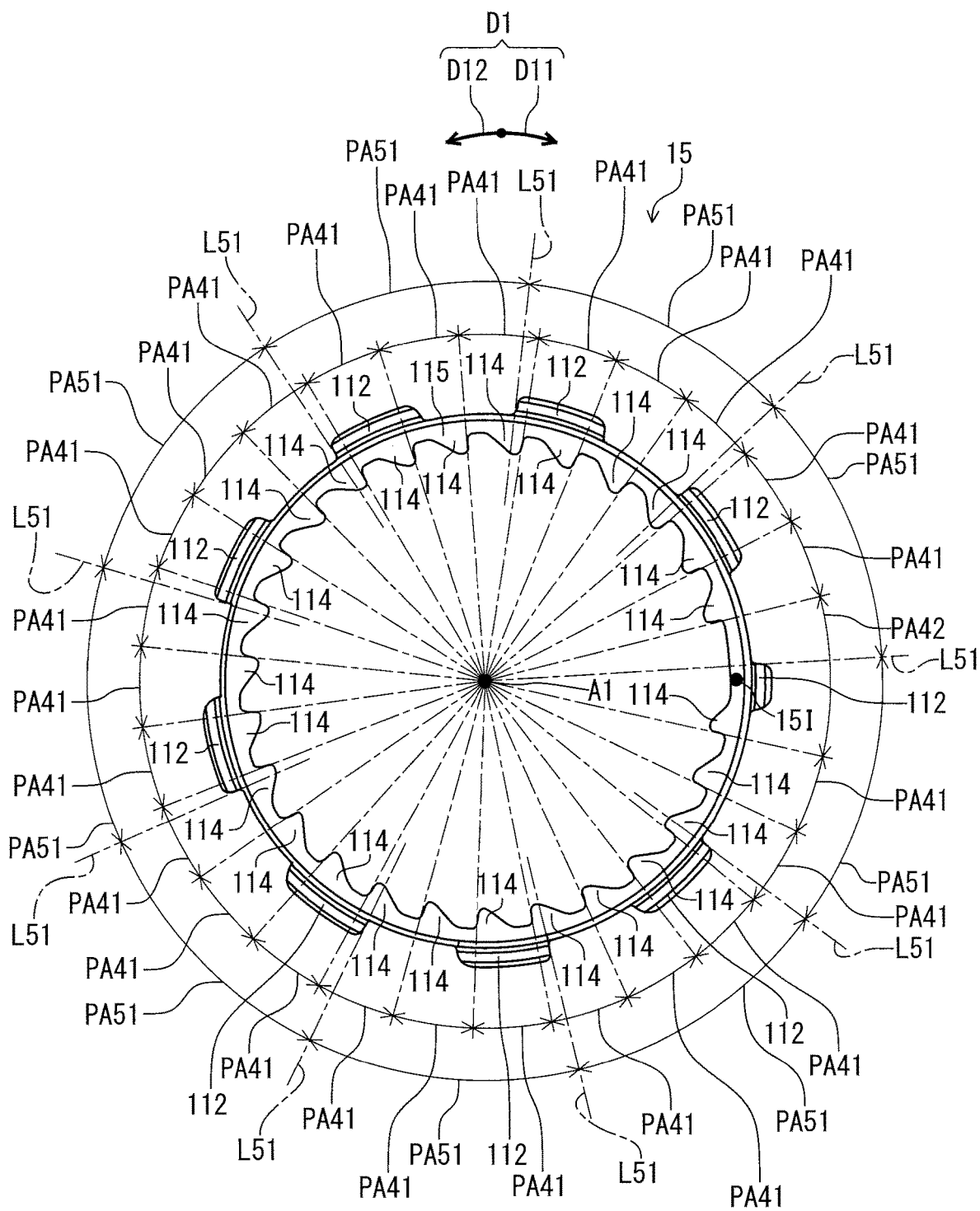
FIG. 41 is a side elevational view of the bicycle rear sprocket adapter in accordance with a modification.

As seen in FIG. 41, the internal spline teeth 114 have substantially the same shape as each other. The internal spline teeth 114 have substantially the same spline size as each other. The internal spline teeth 114 have substantially the same profile as each other when viewed along the rotational center axis A1. As seen in FIG. 40, however, at least one of the internal spline teeth 114 can have a first spline shape different from a second spline shape of another of the internal spline teeth 114. At least one of the internal spline teeth 114 can have a first spline size different from a second spline size of another of the internal spline teeth 114. At least one of the internal spline teeth 114 can have a profile different from a profile of another of the internal spline teeth 114 when viewed along the rotational center axis A1. In FIG. 40, one of the internal spline teeth 114 has a spline shape different from a spline shape of the other teeth of the internal spline teeth 114. One of the internal spline teeth 114 has a spline size different from a spline size of the other teeth of the internal spline teeth 114. One of the internal spline teeth 114 has a profile different from a profile of the other teeth of the internal spline teeth 114 when viewed along the rotational center axis A1.

Figure 42:
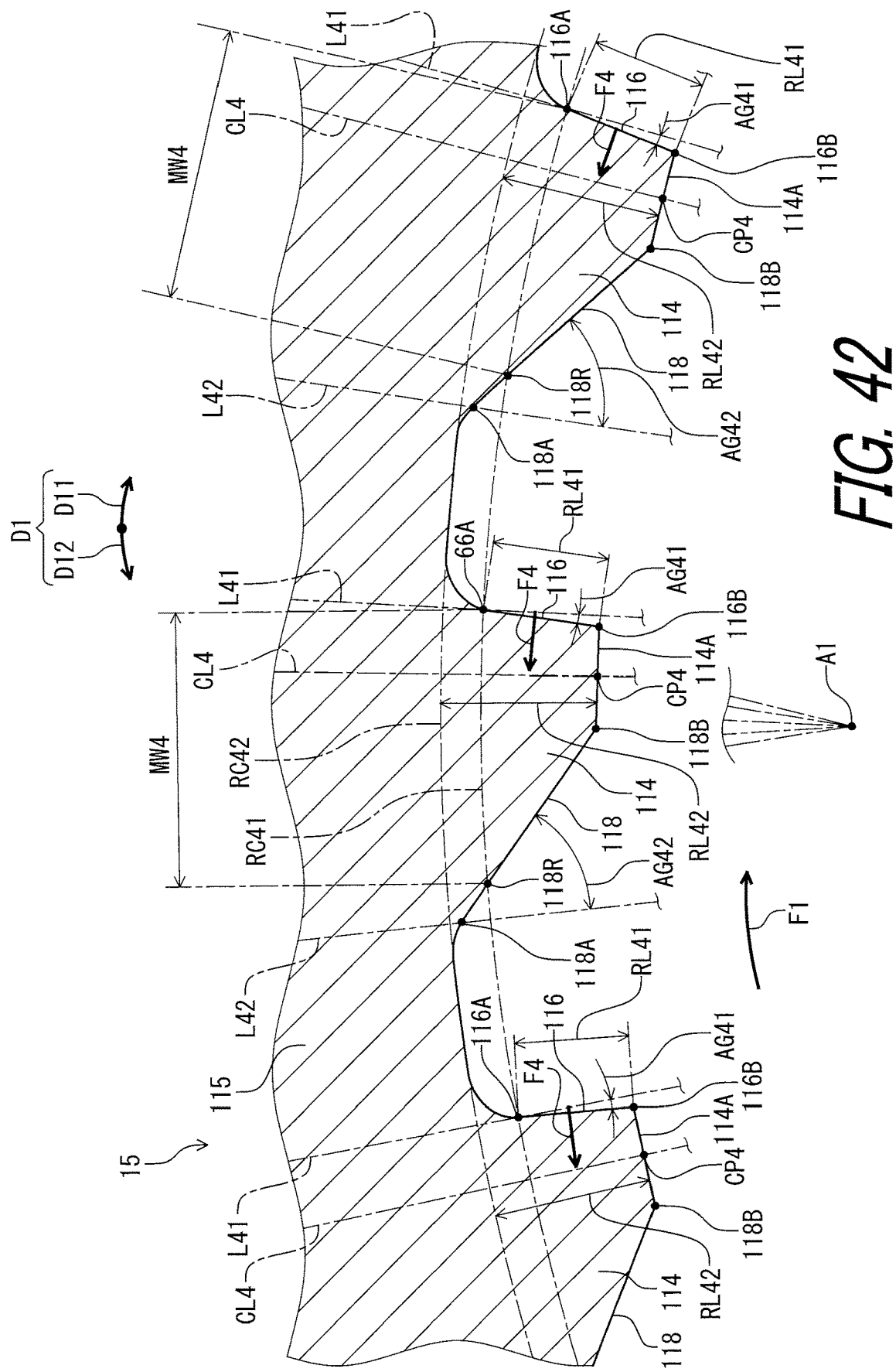
FIG. 42 is an enlarged cross-sectional view of the bicycle rear sprocket adapter illustrated in FIG. 30.

As seen in FIG. 42, the at least one internal spline tooth 114 comprises an internal-spline driving surface 116 and an internal-spline non-driving surface 118. The plurality of internal spline teeth 114 includes a plurality of internal-spline driving surfaces 116 to transmit the driving rotational force F1 to the bicycle hub assembly 12 (FIG. 30) during pedaling. The plurality of internal spline teeth 114 includes a plurality of internal-spline non-driving surfaces 118. The internal-spline driving surface 116 is contactable with the sprocket support body 28 to transmit the driving rotational force F1 from the sprocket SR1 to the sprocket support body 28 during pedaling. The internal-spline driving surface 116 faces in the driving rotational direction D11. The internal-spline non-driving surface 118 is provided on a reverse side of the internal-spline driving surface 116 in the circumferential direction D1. The internal-spline non-driving surface 118 faces in the reverse rotational direction D12 not to transmit the driving rotational force F1 from the sprocket SR1 to the sprocket support body 28 during pedaling.

The at least ten internal spline teeth 114 respectively have circumferential maximum widths MW4. The internal spline teeth 114 respectively have circumferential maximum widths MW4. The circumferential maximum width MW4 is defined as a maximum width to receive a thrust force F4 applied to the internal spline tooth 114. The circumferential maximum width MW4 is defined as a straight distance based on the internal-spline driving surface 116.

The plurality of internal-spline driving surfaces 116 each includes a radially outermost edge 116A and a radially innermost edge 116B. The internal-spline driving surface 116 extends from the radially outermost edge 116A to the radially innermost edge 116B. A second reference circle RC41 is defined on the radially outermost edge 116A and is centered at the rotational center axis A1. The second reference circle RC41 intersects with the internal-spline non-driving surface 118 at a reference point 118R. The circumferential maximum width MW4 extends straight from the radially innermost edge 116B to the reference point 118R in the circumferential direction D1.

The internal-spline non-driving surface 118 includes a radially outermost edge 118A and a radially innermost edge 118B. The internal-spline non-driving surface 118 extends from the radially outermost edge 118A to the radially innermost edge 118B. The reference point 118R is provided between the radially outermost edge 118A and the radially innermost edge 118B.

A total of the circumferential maximum widths MW4 is equal to or larger than 40 mm. The total of the circumferential maximum widths MW4 is equal to or larger than 45 mm. The total of the circumferential maximum widths MW4 is equal to or larger than 50 mm. In this embodiment, the total of the circumferential maximum widths MW4 is 50.8 mm. However, the total of the circumferential maximum widths MW4 is not limited to this embodiment.

Figure 43:
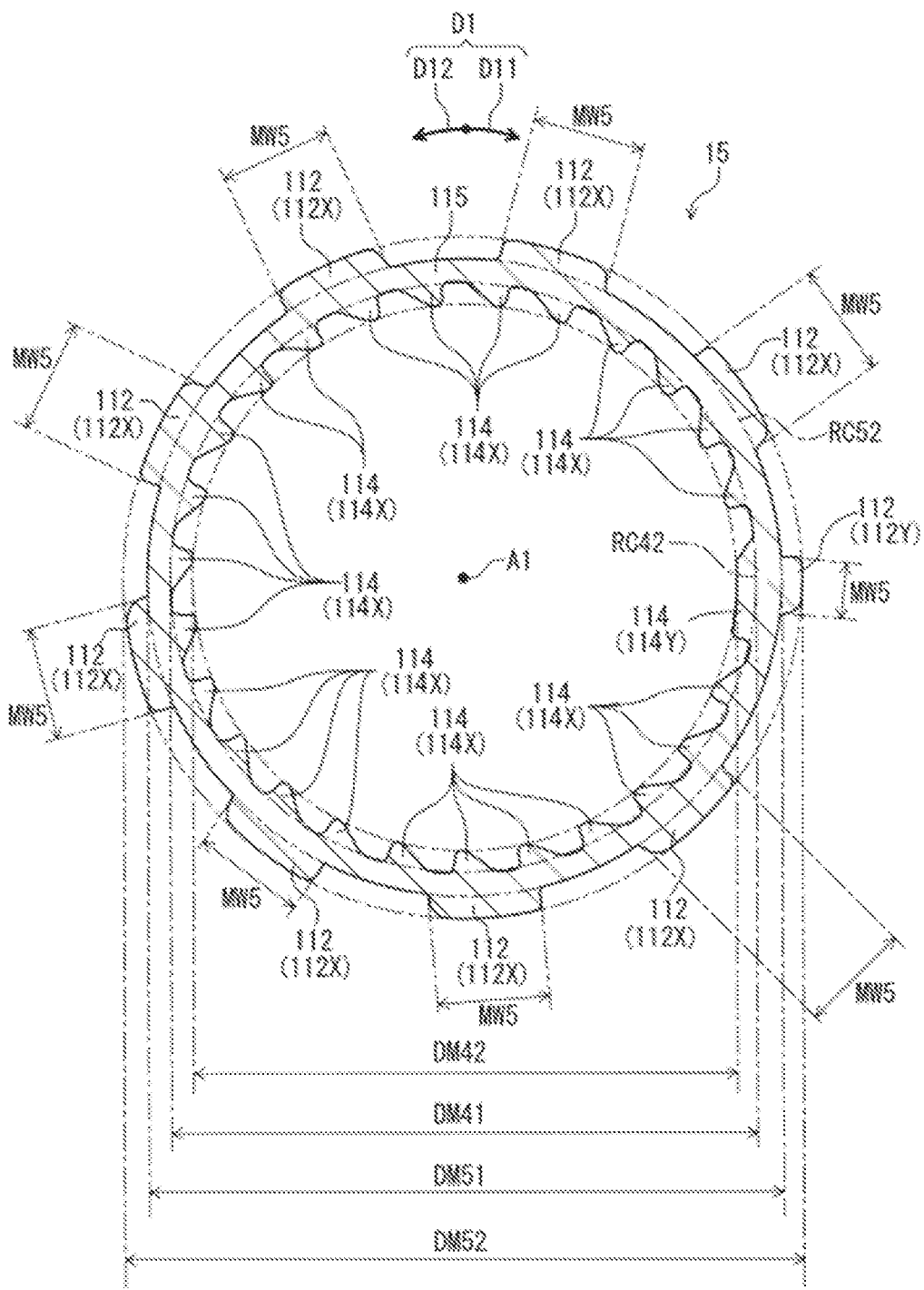
FIG. 43 is a cross-sectional view of the bicycle rear sprocket adapter illustrated in FIG. 30.

As seen in FIG. 43, the at least one internal spline tooth 114 has an internal-spline minor diameter DM41. The at least one internal spline tooth 114 has an internal-spline root circle RC42 having the internal-spline minor diameter DM41. However, the internal-spline root circle RC42 can have another diameter different from the internal-spline minor diameter DM41. The internal-spline minor diameter DM41 is equal to or smaller than 30 mm. The internal-spline minor diameter DM41 is equal to or larger than 25 mm. The internal-spline minor diameter DM41 is equal to or larger than 29 mm. In this embodiment, the internal-spline minor diameter DM41 is 29.8 mm. However, the internal-spline minor diameter DM41 is not limited to this embodiment and the above ranges.

The at least one internal spline tooth 114 has an internal-spline major diameter DM42 equal to or smaller than 28 mm. The internal-spline major diameter DM42 is equal to or larger than 25 mm. The internal-spline major diameter DM42 is equal to or larger than 27 mm. In this embodiment, the internal-spline major diameter DM42 is 27.7 mm. However, the internal-spline major diameter DM42 is not limited to this embodiment and the above ranges.

As seen in FIG. 42, the plurality of internal-spline driving surfaces 116 each includes a radial length RL41. The radial length RL41 is defined from the radially outermost edge 116A to the radially innermost edge 116B. A total of the radial lengths RL41 of the plurality of internal-spline driving surfaces 116 is equal to or larger than 7 mm. The total of the radial lengths RL41 is equal to or larger than 10 mm. The total of the radial lengths RL41 is equal to or larger than 15 mm. In this embodiment, the total of the radial lengths RL41 is 19.5 mm. However, the total of the radial lengths RL41 is not limited to this embodiment and the above ranges.

The plurality of internal spline teeth 114 has an additional radial length RL42. The additional radial lengths RL42 are respectively defined from the internal-spline root circle RC42 to radially innermost ends 114A of the plurality of internal spline teeth 114. A total of the additional radial lengths RL42 is equal to or larger than 12 mm. In this embodiment, the total of the additional radial lengths RL42 is 27.95 mm. However, the total of the additional radial lengths RL42 is not limited to this embodiment and the above ranges.

At least one of the internal spline tooth 114 has an asymmetric shape with respect to a circumferential tooth-tip center line CL4. The circumferential tooth-tip center line CL4 is a line connecting the rotational center axis A1 and a circumferential center point CP4 of the radially innermost end 114A of the internal spline tooth 114. However, at least one of the internal spline teeth 114 can have a symmetric shape with respect to the circumferential tooth-tip center line CL4. The at least one of the internal spline tooth 114 comprises the internal-spline driving surface 116 and the internal-spline non-driving surface 118.

The internal-spline driving surface 116 has a first internal-spline-surface angle AG41. The first internal-spline-surface angle AG41 is defined between the internal-spline driving surface 116 and a first radial line L41. The first radial line extends from the rotational center axis A1 of the bicycle rear sprocket adapter 15 to a radially outermost edge 116A of the internal-spline driving surface 116. The first internal pitch angle PA41 or the second internal pitch angle PA42 is defined between the first radial lines L41 (see, e.g., FIG. 40).

The internal-spline non-driving surface 118 has a second internal-spline-surface angle AG42. The second internal-spline-surface angle AG42 is defined between the internal-spline non-driving surface 118 and a second radial line L42. The second radial line extends from the rotational center axis A1 of the sprocket adapter to a radially outermost edge 118A of the internal-spline non-driving surface 118.

The second internal-spline-surface angle AG42 is different from the first internal-spline-surface angle AG41. The first internal-spline-surface angle AG41 is smaller than the second internal-spline-surface angle AG42. However, the first internal-spline-surface angle AG41 can be equal to or larger than the second internal-spline-surface angle AG42.

The first internal-spline-surface angle AG41 ranges from 0 degree to 10 degrees. The second internal-spline-surface angle AG42 ranges from 0 degree to 60 degrees. In this embodiment, the first internal-spline-surface angle AG41 is 5 degrees. The second internal-spline-surface angle AG42 is 45 degrees. However, the first internal-spline-surface angle AG41 and the second internal-spline-surface angle AG42 are not limited to this embodiment and the above ranges.

Figure 44:
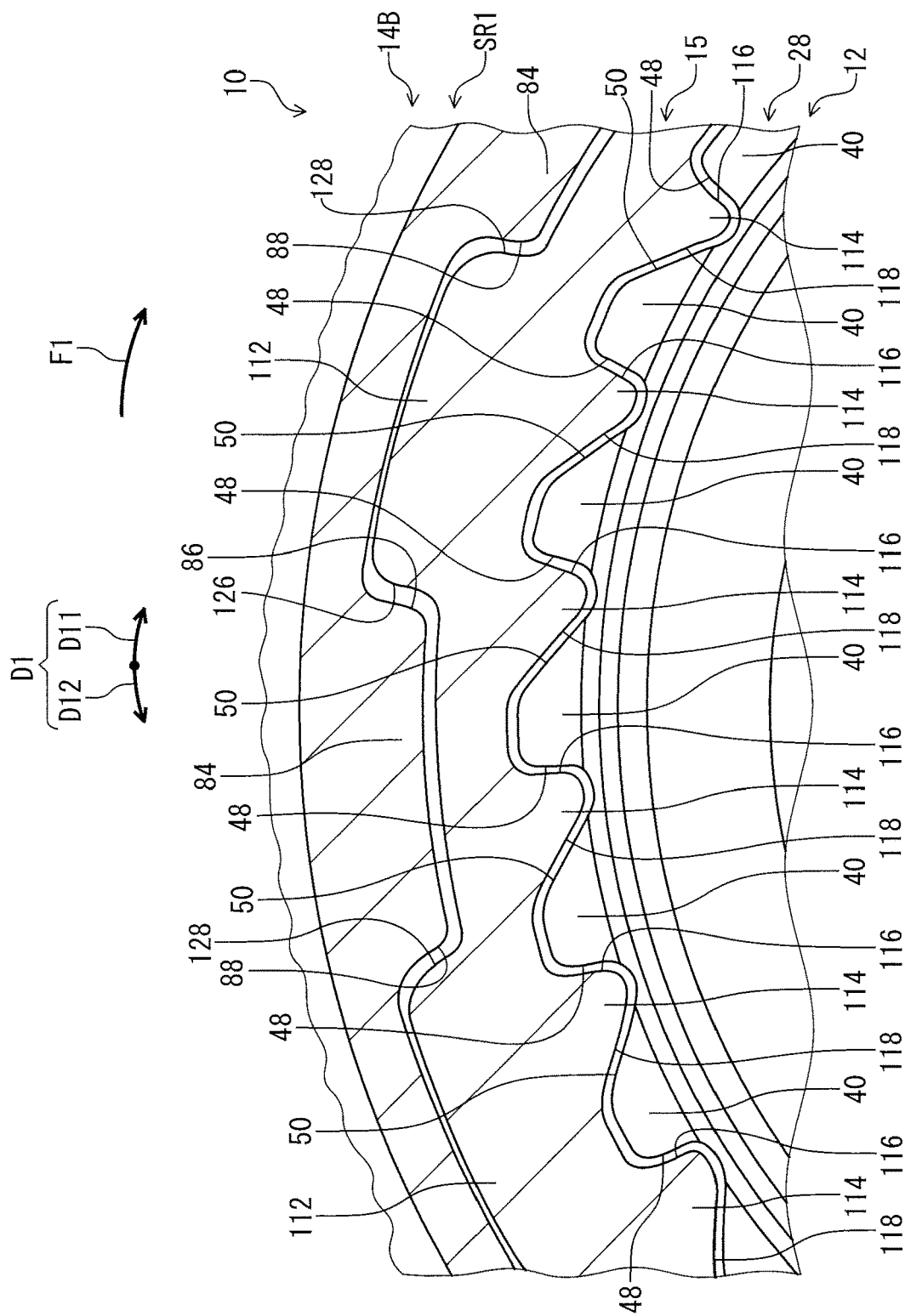
FIG. 44 is an enlarged cross-sectional view of the bicycle drive train illustrated in FIG. 30.

As seen in FIG. 44, the internal spline teeth 114 mesh with the external spline teeth 40 of the sprocket support body 28 to transmit the driving rotational force F1 from the bicycle rear sprocket adapter 15 to the sprocket support body 28. The internal-spline driving surface 116 is contactable with the external-spline driving surface 48 to transmit the driving rotational force F1 from the bicycle rear sprocket adapter 15 to the sprocket support body 28. The internal-spline non-driving surface 118 is spaced apart from the external-spline non-driving surface 50 in a state where the internal-spline driving surface 116 is in contact with the external-spline driving surface 48.

As seen in FIG. 40, the plurality of external spline teeth 112 has an external pitch angle PA51. The plurality of external spline teeth 112 is circumferentially arranged at the external pitch angle PA51 with respect to the rotational center axis A1 of the bicycle hub assembly 12. However, at least one of the external pitch angle PA51 can be different from another of the external pitch angle PA51.

The external pitch angle PA51 ranges from 30 degrees to 50 degrees. The external pitch angle PA51 ranges from 35 degrees to 45 degrees. In this embodiment, the external pitch angle PA51 is 40 degrees. However, the external pitch angle PA51 is not limited to this embodiment and the above ranges.

Figure 45:
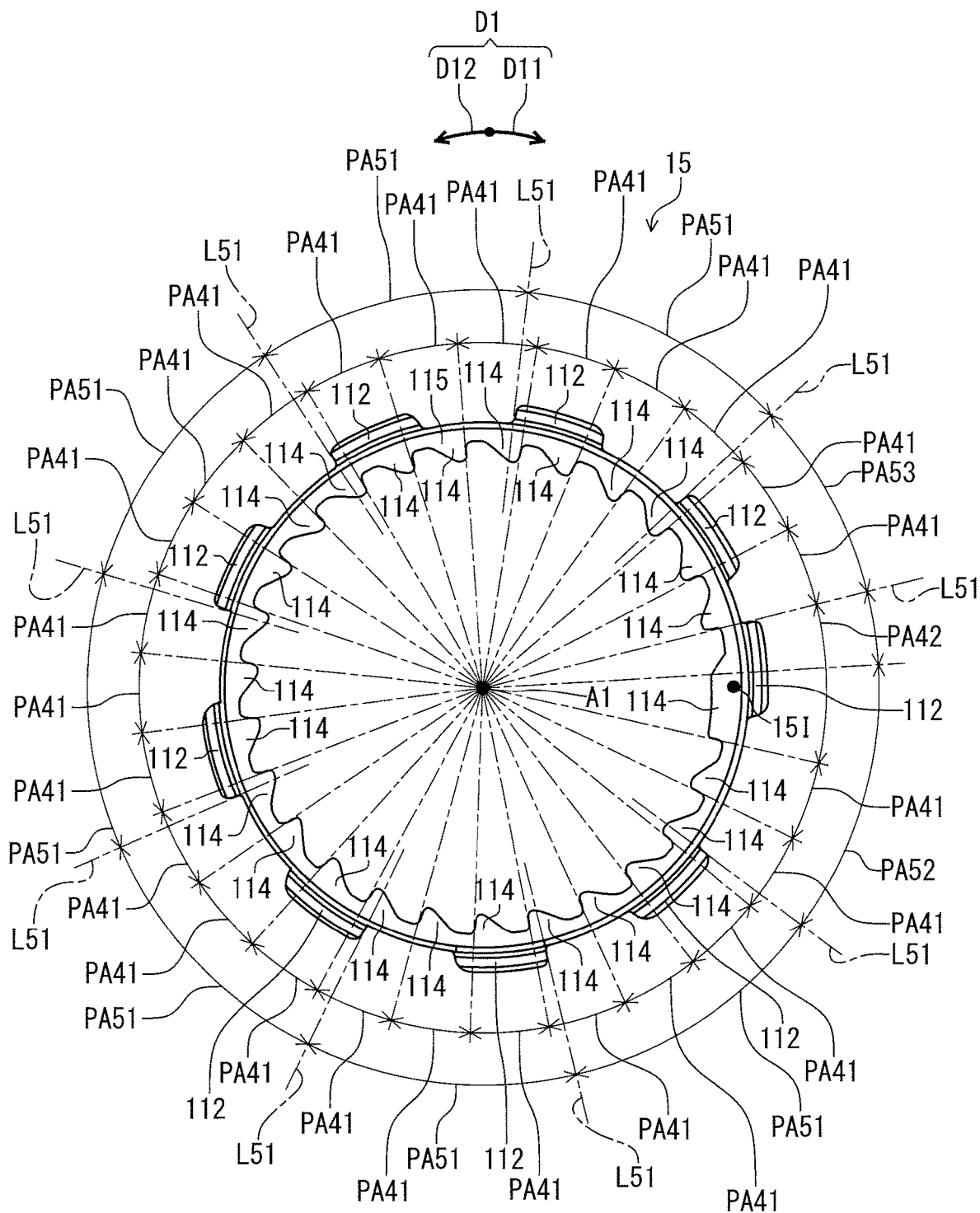
FIG. 45 is a cross-sectional view of the sprocket in accordance with a modification.

At least one of the external spline teeth 112 has a first spline shape different from a second spline shape of another of the external spline teeth 112. At least one of the external spline teeth 112 has a first spline size different from a second spline size of another of the external spline teeth 112. At least one of the external spline teeth 112 has a cross-sectional shape different from a cross-sectional shape of another of the external spline teeth 112. As seen in FIG. 45, however, the external spline teeth 112 can have the same shape as each other. The external spline teeth 112 can have the same size as each other. The external spline teeth 112 can have the same cross-sectional shape as each other. In such a modification, two spline teeth of the plurality of external spline teeth 112 are circumferentially arranged at an additional external pitch angle PA52 with respect to the rotational center axis A1 of the bicycle hub assembly 12. Two spline teeth of the plurality of external spline teeth 112 are circumferentially arranged at an additional external pitch angle PA53 with respect to the rotational center axis A1 of the bicycle hub assembly 12.

As seen in FIG. 37, the at least one external spline tooth 112 comprises an external-spline driving surface 126 and an external-spline non-driving surface 128. The at least one external spline tooth 112 includes a plurality of external spline teeth 112. The plurality of external spline teeth 112 includes a plurality of external-spline driving surfaces 126 to receive the driving rotational force F1 from the bicycle rear sprocket assembly 14B during pedaling. The plurality of external spline teeth 112 includes a plurality of external-spline non-driving surfaces 128. The external-spline driving surface 126 is contactable with the bicycle rear sprocket assembly 14B to receive the driving rotational force F1 from the bicycle rear sprocket assembly 14B during pedaling. The external-spline driving surface 126 faces in the driving rotational direction D11. The external-spline non-driving surface 128 is provided on a reverse side of the external-spline driving surface 126 in the circumferential direction D1. The external-spline non-driving surface 128 faces in the reverse rotational direction D12 not to receive the driving rotational force F1 from the bicycle rear sprocket assembly 14B during pedaling.

Figure 46:
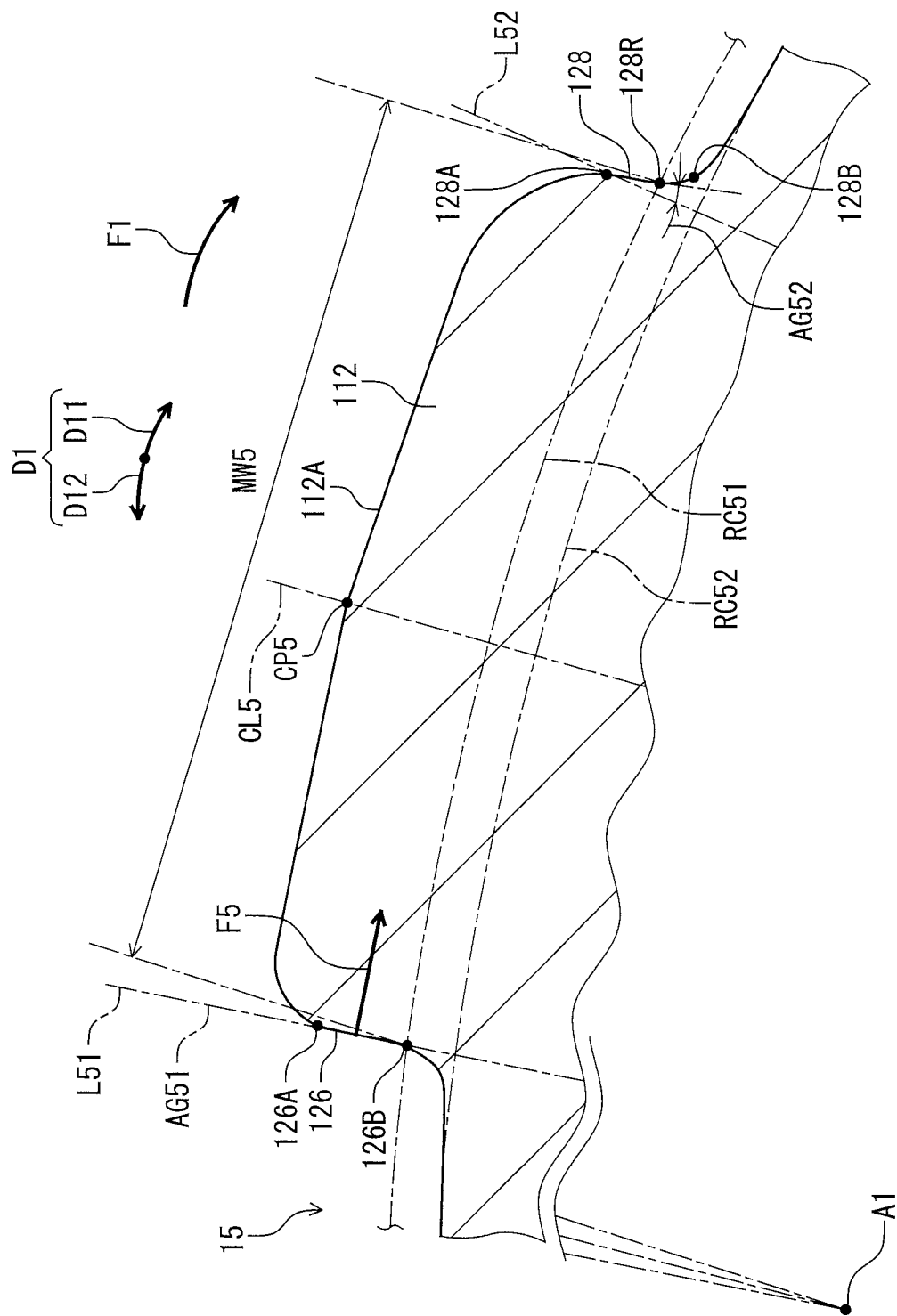
FIG. 46 is an enlarged cross-sectional view of the bicycle rear sprocket adapter illustrated in FIG. 30.

As seen in FIG. 46, the external spline teeth 112 respectively have circumferential maximum widths MW5. The external spline teeth 112 respectively have circumferential maximum widths MW5. The circumferential maximum width MW5 is defined as a maximum width to receive a thrust force F5 applied to the external spline tooth 112. The circumferential maximum width MW5 is defined as a straight distance based on the external-spline driving surface 126.

The external-spline driving surface 126 includes a radially outermost edge 126A and a radially innermost edge 126B. The external-spline driving surface 126 extends from the radially outermost edge 126A to the radially innermost edge 126B. A reference circle RC51 is defined on the radially outermost edge 126A and is centered at the rotational center axis A1. The reference circle RC51 intersects with the external-spline non-driving surface 128 at a reference point 128R. The circumferential maximum width MW5 extends straight from the radially innermost edge 126B to the reference point 128R in the circumferential direction D1.

The external-spline non-driving surface 128 includes a radially outermost edge 128A and a radially innermost edge 128B. The external-spline non-driving surface 128 extends from the radially outermost edge 128A to the radially innermost edge 128B. The reference point 128R is provided between the radially outermost edge 128A and the radially innermost edge 128B.

As seen in FIG. 43, the at least one external spline tooth 112 has an external-spline minor diameter DM51. The at least one external spline tooth 112 has an internal-spline root circle RC52 having the external-spline minor diameter DM51. However, the internal-spline root circle RC52 can have another diameter different from the external-spline minor diameter DM51. The external-spline minor diameter DM51 is equal to or smaller than 33 mm. The external-spline minor diameter DM51 is equal to or larger than 32 mm. In this embodiment, the external-spline minor diameter DM51 is 32.2 mm. However, the external-spline minor diameter DM51 is not limited to this embodiment and the above ranges.

At least one of the plurality of external spline teeth 112 has an external-spline major diameter DM52 larger than 34 mm and smaller than 35 mm. Preferably, the external-spline major diameter DM52 is 34.55 mm. However, the external-spline major diameter DM52 is not limited to this embodiment and the above ranges. The external-spline major diameter DM52 is substantially equal to the outer diameter DM13 (FIG. 12) of the larger-diameter part 42.

As seen in FIG. 46, at least one of the external spline tooth 112 has an asymmetric shape with respect to a circumferential tooth-tip center line CL5. The circumferential tooth-tip center line CL5 is a line connecting the rotational center axis A1 and a circumferential center point CP5 of radially innermost end 112A of the external spline tooth 112. However, at least one of the external spline teeth 112 can have a symmetric shape with respect to the circumferential toothtip center line CL5.

The external-spline driving surface 126 has a first internal-spline-surface angle AG51. The first internal-splinesurface angle AG51 is defined between the external-spline driving surface 126 and a first radial line L51. The first radial line L51 extends from the rotational center axis A1 of the bicycle rear sprocket assembly 14B to the radially outermost edge 126A of the external-spline driving surface 126. The external pitch angle PA51 is defined between the first radial lines L51 (see, e.g., FIG. 40).

The external-spline non-driving surface 128 has a second internal-spline-surface angle AG52. The second internalspline-surface angle AG52 is defined between the external-spline non-driving surface 128 and a second radial line L52. The second radial line L52 extends from the rotational center axis A1 of the sprocket assembly to the radially outermost edge 128A of the external-spline non-driving surface 128.

In this embodiment, the second internal-spline-surface angle AG52 is different from the first internal-spline-surface angle AG51. The first internal-spline-surface angle AG51 is smaller than the second internal-spline-surface angle AG52. However, the first internal-spline-surface angle AG51 can be equal to or larger than the second internal-spline-surface angle AG52.

The first internal-spline-surface angle AG51 ranges from 0 degree to 10 degrees. The second internal-spline-surface angle AG52 ranges from 0 degree to 10 degrees. In this embodiment, the first internal-spline-surface angle AG51 is 0 degree. The second internal-spline-surface angle AG52 is 5 degrees. However, the first internal-spline-surface angle AG51 and the second internal-spline-surface angle AG52 are not limited to this embodiment and the above ranges.

As seen in FIG. 43, the plurality of external spline teeth 112 of the bicycle rear sprocket adapter 15 includes a plurality of external spline teeth 112X and an external spline tooth 112Y. The external spline tooth 112X has the first spline shape different from the second spline shape of the external spline tooth 112Y. The circumferential maximum width MW5 of the external spline tooth 112Y is smaller than the circumferential maximum width MW5 of the external spline tooth 112X. As seen in FIG. 43, the plurality of internal spline teeth 114 of the bicycle rear sprocket adapter 15 includes a plurality of internal spline teeth 114X and an internal spline tooth 114Y. As seen in FIG. 43, the circumferential width of the internal spline tooth 114Y is different from the circumferential width of the internal spline teeth 114X. As seen in FIG. 43, the internal spline tooth 114Y has a circumferential width different from the circumferential width of the external spline tooth 112Y.

Figure 47:
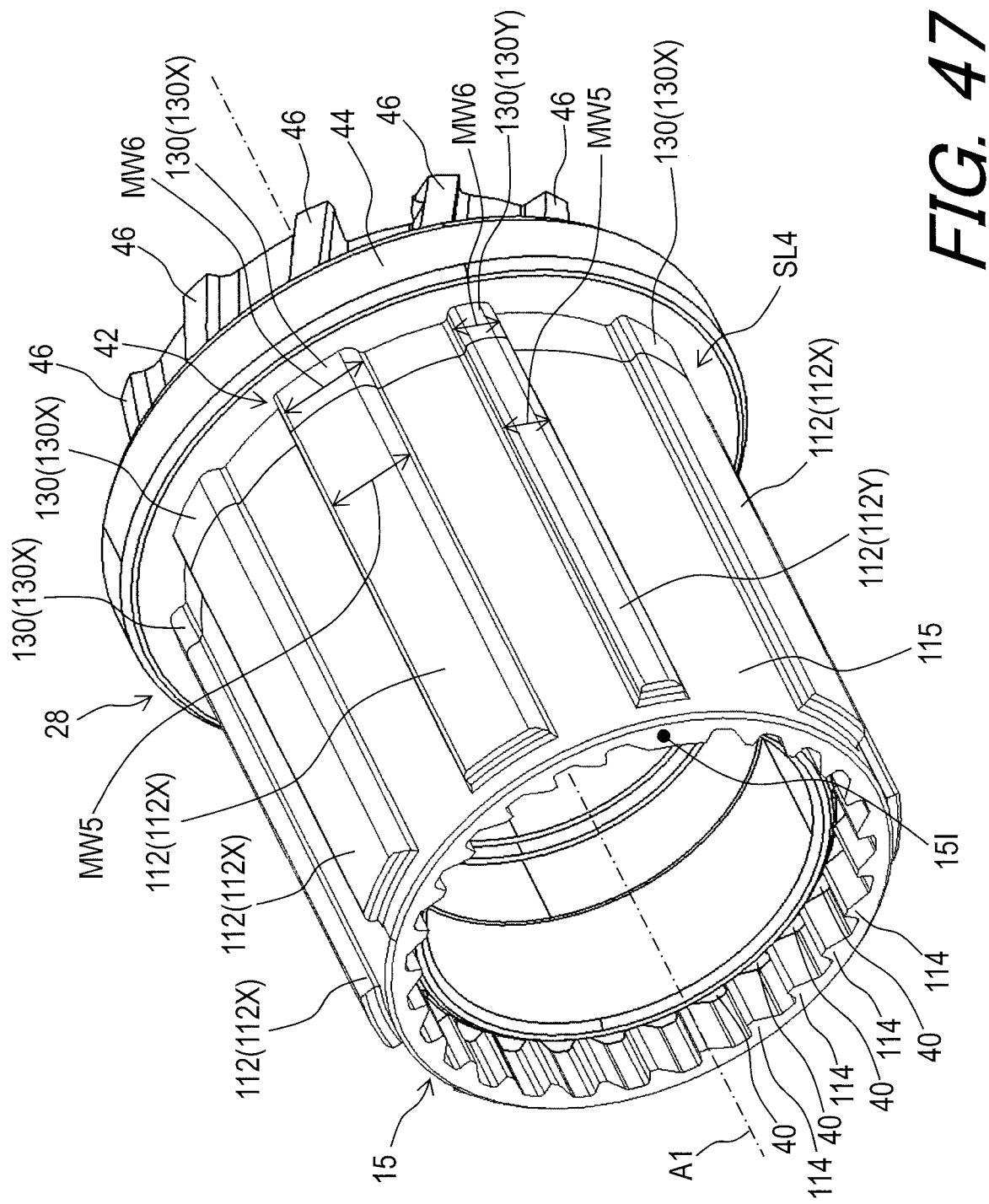
FIG. 47 is a perspective view of the sprocket support body and the bicycle rear sprocket adapter illustrated in FIG. 30.

As seen in FIG. 47, the large-diameter part 42 of the sprocket support body 28 includes a plurality of additional external spline teeth 130. The plurality of additional external spline teeth 130 defines the outer diameter DM13 (FIG. 12) of the larger-diameter part 42. The plurality of additional external spline teeth 130 includes a plurality of additional external spline teeth 130X and an additional external spline tooth 130Y. The additional external spline tooth 130X has a third spline shape different from a fourth spline shape of the additional external spline tooth 130Y. The third spline shape of the additional external spline tooth 130X is substantially identical to the first spline shape of the external spline tooth 112X. The fourth spline shape of the additional external spline tooth 130Y is substantially identical to the second spline shape of the external spline tooth 112Y. The additional external spline tooth 130X has a circumferential maximum width MW6 substantially equal to the circumferential maximum width MW5 of the external spline tooth 112X. The additional external spline tooth 130Y has a circumferential maximum width MW6 substantially equal to the circumferential maximum width MW5 of the external spline tooth 112Y The external spline teeth 112X and 112Y and the additional external spline teeth 130X and 130Y constitute an external spline SL4 engageable with the internal spline SL3 of the bicycle rear sprocket assembly 14B (FIG. 30). As seen in FIG. 32, the large-diameter part 42 (the additional external spline teeth 130X and 130Y) is engaged with the internal spline teeth 108 of the sprocket SR11 and the internal spline teeth 110 of the spacer 82. However, the additional external spline teeth 130X and 130Y can be omitted from the sprocket support body 28. In such an embodiment, the external spline teeth 112X and 112Y extend to the flange 44 of the sprocket support body 28 in a state where the bicycle rear sprocket adapter 15 is mounted on the sprocket support body 28.

As seen in FIGS. 41 and 43, the bicycle rear sprocket adapter 15 further comprises an indicator 151 to indicate a circumferential position of the bicycle rear sprocket adapter 15. The bicycle rear sprocket adapter 15 further comprises an axial end surface 15E (FIG. 38). The indicator 151 is provided on the axial end surface 15E. As seen in FIG. 40, the indicator 151 is provided in an area of the second internal pitch angle PA42 when viewed along the rotational center axis A1. In this embodiment, the indicator 151 includes a dot. However, the indicator 151 can include other shapes such as a triangle and a line. Further, the indicator 151 can be a separate member that is attached to the bicycle rear sprocket adapter 15 e.g. with a bonding structure such as an adhesive agent. The position of the indicator 151 is not limited to this embodiment.

As seen in FIGS. 9 and 10, the sprocket support body 28 includes a hub indicator 281 to indicate a circumferential position of the sprocket support body 28. The hub indicator 281 is provided at an axial end of the base support 41. The hub indicator 281 is provided in an area of the second external pitch angle PA12 when viewed along the rotational center axis A1. In this embodiment, the hub indicator 281 includes a dot. However, the hub indicator 281 can include other shapes such as a square, a triangle, and a line. Further, the hub indicator 281 can be a separate member that is attached to the sprocket support body 28 e.g. with a bonding structure such as an adhesive agent. The position of the hub indicator 281 is not limited to this embodiment.

As seen in FIGS. 23 and 24, the sprocket SP1 includes a sprocket indicator SP1I to indicate a circumferential position of the sprocket SP1. The sprocket indicator SP1I is provided at an axial end of the sprocket body SP1A. The sprocket indicator SP1I is provided in an area of the second internal pitch angle PA22 when viewed along the rotational center axis A1. In this embodiment, the sprocket indicator SP1I includes a dot. However, the sprocket indicator SP1I can include other shapes such as a square, a triangle, and a line. Further, the sprocket indicator SP1I can be a separate member that is attached to the sprocket SP1 e.g. with a bonding structure such as an adhesive agent. The position of the sprocket indicator SP1I is not limited to this embodiment. The sprocket indicator SP1I can be provided to any one of other sprockets SP2 to SP11. The sprocket indicator SP1I and the hub indicator 281 allow the sprocket support body 28 and the sprocket SP1 to be assembled easily.

Figure 48:
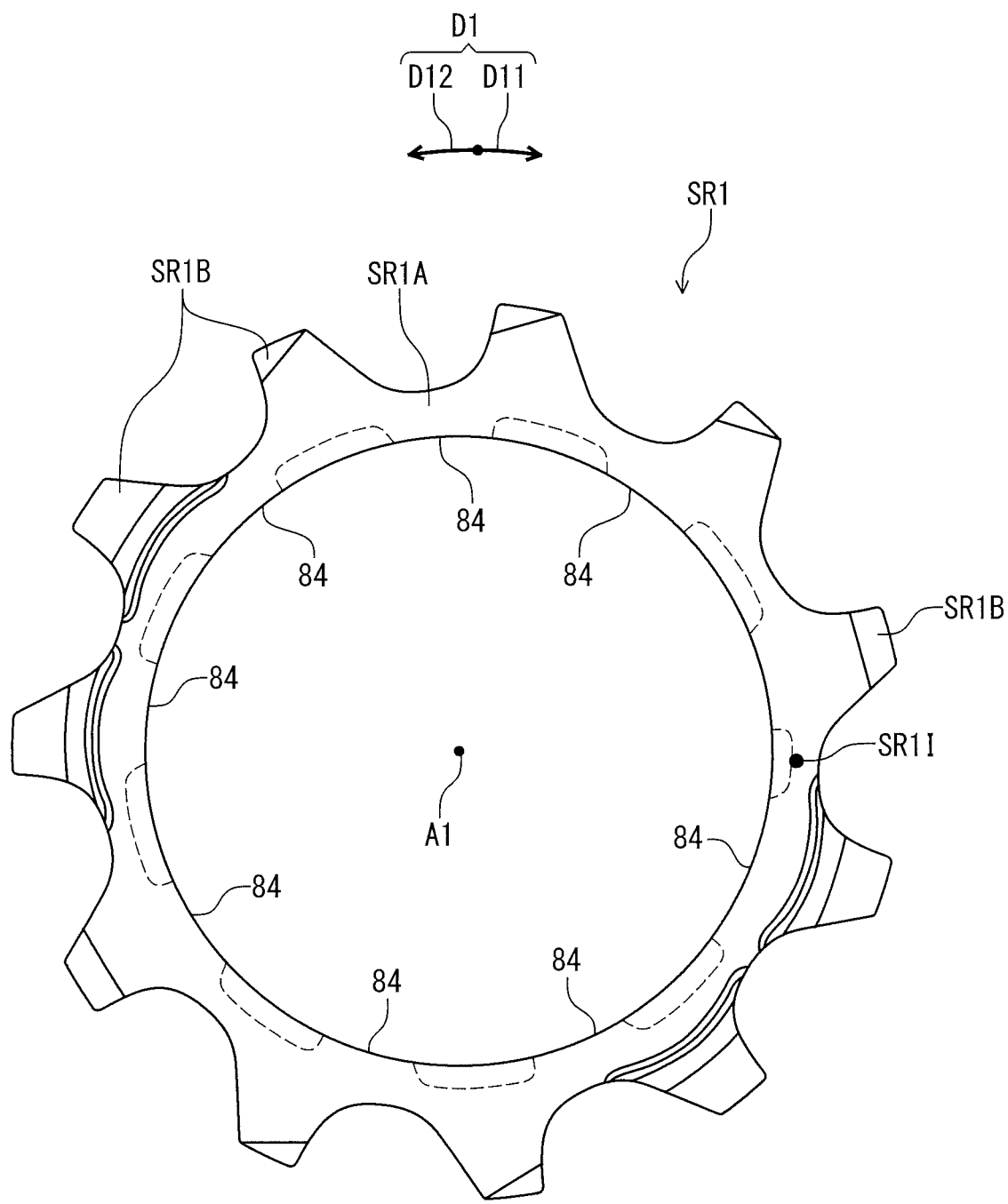
FIG. 48 is a side elevational view of the sprocket illustrated in FIG. 30.

As seen in FIG. 48, the sprocket SR1 includes a sprocket indicator SR1I to indicate a circumferential position of the sprocket SR1. The sprocket indicator SR1I is provided at an axial end of the sprocket body SR1A. In this embodiment, the sprocket indicator SR1I includes a dot. However, the sprocket indicator SR1I can include other shapes such as a square, a triangle, and a line. Further, the sprocket indicator SR1I can be a separate member that is attached to the sprocket SR1 e.g. with a bonding structure such as an adhesive agent. The position of the sprocket indicator SR1I is not limited to this embodiment. The sprocket indicator SR1I can be provided to any one of other sprockets SR2 to SR11.

Figure 49:
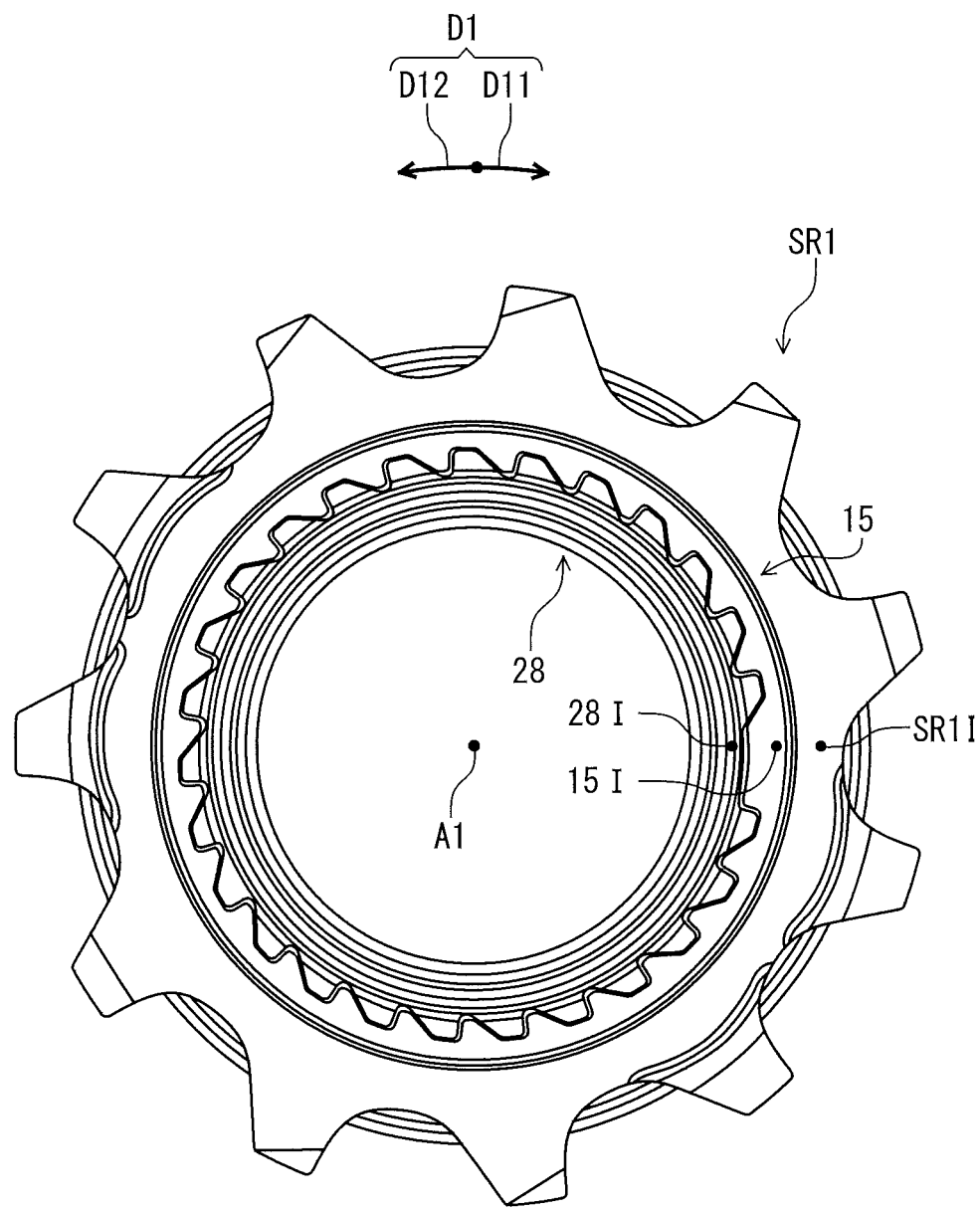
FIG. 49 is a side elevational view of the sprocket, the sprocket support body, and the bicycle rear sprocket adapter illustrated in FIG. 30.

As seen in FIG. 49, the indicator 151, the hub indicator 281, and the sprocket indicator SR1I allow the sprocket support body 28, the sprocket SR1, and the bicycle rear sprocket adapter 15 to be assembled easily.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket adapter comprising:
a plurality of external spline teeth configured to engage with a bicycle rear sprocket assembly; and
a plurality of internal spline teeth configured to engage with a bicycle hub assembly, the plurality of internal spline teeth each comprising an internal-spline driving surface to transmit a driving rotational force to the bicycle hub assembly during pedaling,
at least two internal-spline driving surfaces of the internal-spline driving surfaces of the plurality of internal spline teeth being circumferentially arranged at a first internal pitch angle with respect to a rotational center axis of the bicycle hub assembly, the first internal pitch angle ranging from 10 degrees to 20 degrees,
at least two internal-spline driving surfaces of the internal-spline driving surfaces of the plurality of internal spline teeth being circumferentially arranged at a second internal pitch angle with respect to the rotational center axis,
the second internal pitch angle being different from the first internal pitch angle,
the internal-spline driving surfaces each including
a radially outermost edge,
a radially innermost edge, and
a radial length defined from the radially outermost edge to the radially innermost edge,
a total of the radial lengths of the internal-spline driving surfaces being equal to or larger than 7 mm,
the plurality of external spline teeth includes
a plurality of first external spline teeth each having a first circumferential width defined in a circumferential direction with respect to the rotational center axis, and
a first additional external spline tooth having a first additional circumferential width defined in the circumferential direction, the first additional circumferential width being different from the first circumferential width,
the plurality of internal spline teeth includes
a plurality of first internal spline teeth each having a second circumferential width defined in the circumferential direction, and
a first additional internal spline tooth having a second additional circumferential width defined in the circumferential direction, the second additional circumferential width being different from the second circumferential width, and
the second additional circumferential width is different from the first additional circumferential width.

2. The bicycle rear sprocket adapter according to claim 1, wherein
the first internal pitch angle ranges from 12 degrees to 15 degrees.

3. The bicycle rear sprocket adapter according to claim 2, wherein
the first internal pitch angle ranges from 13 degrees to 14 degrees.

4. The bicycle rear sprocket adapter according to claim 1, further comprising
an indicator to indicate a circumferential position of the bicycle rear sprocket adapter.

5. The bicycle rear sprocket adapter according to claim 4, further comprising
an axial end surface, wherein
the indicator is provided on the axial end surface.

6. The bicycle rear sprocket adapter according to claim 1, wherein
a total number of the plurality of external spline teeth is equal to or smaller than nine.

7. The bicycle rear sprocket adapter according to claim 1, wherein
at least one of the plurality of external spline teeth having an external-spline major diameter larger than 34 mm and smaller than 35 mm.

8. The bicycle rear sprocket adapter according to claim 1, wherein
the plurality of external spline teeth is circumferentially arranged at an external pitch angle with respect to the rotational center axis.

9. A bicycle rear sprocket adapter comprising:
a plurality of external spline teeth configured to engage with a bicycle rear sprocket assembly; and
a plurality of internal spline teeth configured to engage with a bicycle hub assembly, the plurality of internal spline teeth having an internal-spline minor diameter equal to or smaller than 30 mm, the plurality of internal spline teeth each comprising an internal-spline driving surface to transmit a driving rotational force to the bicycle hub assembly during pedaling,
at least two internal-spline driving surfaces of the internal-spline driving surfaces of the plurality of internal spline teeth being circumferentially arranged at a first internal pitch angle with respect to a rotational center axis of the bicycle hub assembly,
at least two internal-spline driving surfaces of the internal-spline driving surfaces of the plurality of internal spline teeth being circumferentially arranged at a second internal pitch angle with respect to the rotational center axis,
the second internal pitch angle being different from the first internal pitch angle,
the internal-spline driving surfaces each including
a radially outermost edge,
a radially innermost edge, and
a radial length defined from the radially outermost edge to the radially innermost edge,
a total of the radial lengths of the internal-spline driving surfaces being equal to or larger than 7 mm,
the plurality of external spline teeth includes
a plurality of first external spline teeth each having a first circumferential width defined in a circumferential direction with respect to the rotational center axis, and
a first additional external spline tooth having a first additional circumferential width defined in the circumferential direction, the first additional circumferential width being different from the first circumferential width,
the plurality of internal spline teeth includes
a plurality of first internal spline teeth each having a second circumferential width defined in the circumferential direction, and
a first additional internal spline tooth having a second additional circumferential width defined in the circumferential direction, the second additional circumferential width being different from the second circumferential width, and
the second additional circumferential width is different from the first additional circumferential width.

10. The bicycle rear sprocket adapter according to claim 9, wherein
the internal-spline minor diameter is equal to or larger than 25 mm.

11. The bicycle rear sprocket adapter according to claim 10, wherein
the internal-spline minor diameter is equal to or larger than 29 mm.

12. The bicycle rear sprocket adapter according to claim 9, wherein
the plurality of internal spline teeth has an internal-spline major diameter equal to or smaller than 28 mm.

13. The bicycle rear sprocket adapter according to claim 12, wherein
the internal-spline major diameter is equal to or larger than 25 mm.

14. The bicycle rear sprocket adapter according to claim 13, wherein
the internal-spline major diameter is equal to or larger than 27 mm.

15. The bicycle rear sprocket adapter according to claim 9, wherein
the total of the radial lengths is equal to or larger than 10 mm.

16. The bicycle rear sprocket adapter according to claim 9, wherein
the total of the radial lengths is equal to or larger than 15 mm.

17. A bicycle rear sprocket adapter comprising:
a plurality of external spline teeth configured to engage with a bicycle rear sprocket assembly; and
a plurality of internal spline teeth configured to engage with a bicycle hub assembly, the plurality of internal spline teeth each comprising:
an internal-spline driving surface to transmit a driving rotational force to the bicycle hub assembly during pedaling, the internal-spline driving surface having a first internal-spline-surface angle defined between the internal-spline driving surface and a first radial line extending from a rotational center axis of the bicycle rear sprocket adapter to a radially outermost edge of the internal-spline driving surface; and
an internal-spline non-driving surface having a second internal-spline-surface angle defined between the internal-spline non-driving surface and a second radial line extending from the rotational center axis of the sprocket adapter to a radially outermost edge of the internal-spline non-driving surface, the second internal-spline-surface angle being different from the first internal-spline-surface angle,
at least two internal-spline driving surfaces of the internal-spline driving surfaces of the plurality of internal spline teeth being circumferentially arranged at a first internal pitch angle with respect to the rotational center axis,
at least two internal-spline driving surfaces of the internal-spline driving surfaces of the plurality of internal spline teeth being circumferentially arranged at a second internal pitch angle with respect to the rotational center axis,
the second internal pitch angle being different from the first internal pitch angle,
the internal-spline driving surfaces each including
a radially outermost edge,
a radially innermost edge, and
a radial length defined from the radially outermost edge to the radially innermost edge,
a total of the radial lengths of the internal-spline driving surfaces being equal to or larger than 7 mm,
the plurality of external spline teeth includes
a plurality of first external spline teeth each having a first circumferential width defined in a circumferential direction with respect to the rotational center axis, and
a first additional external spline tooth having a first additional circumferential width defined in the circumferential direction, the first additional circumferential width being different from the first circumferential width,
the plurality of internal spline teeth includes
a plurality of first internal spline teeth each having a second circumferential width defined in the circumferential direction, and a first additional internal spline tooth having a second additional circumferential width defined in the circumferential direction, the second additional circumferential width being different from the second circumferential width, and the second additional circumferential width is different from the first additional circumferential width.

18. The bicycle rear sprocket adapter according to claim 17, wherein the first internal-spline-surface angle is smaller than the second internal-spline-surface angle.

19. The bicycle rear sprocket adapter according to claim 17, wherein the first internal-spline-surface angle ranges from 0 degree to 10 degrees.

20. The bicycle rear sprocket adapter according to claim 17, wherein the second internal-spline-surface angle ranges from 0 degree to 60 degrees.

* * * * *